(12) United States Patent
Choi et al.

(10) Patent No.: US 11,729,748 B2
(45) Date of Patent: Aug. 15, 2023

(54) METHOD, APPARATUS AND SYSTEM FOR TRANSMITTING AND RECEIVING CONTROL CHANNEL OF WIRELESS COMMUNICATION SYSTEM

(71) Applicant: WILUS INSTITUTE OF STANDARDS AND TECHNOLOGY INC., Gyeonggi-do (KR)

(72) Inventors: Kyungjun Choi, Seoul (KR); Minseok Noh, Seoul (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

(21) Appl. No.: 16/581,554

(22) Filed: Sep. 24, 2019

(65) Prior Publication Data

US 2020/0092880 A1 Mar. 19, 2020

Related U.S. Application Data

(63) Continuation of application No. PCT/KR2018/003561, filed on Mar. 26, 2018.

(30) Foreign Application Priority Data

Mar. 24, 2017 (KR) ........................ 10-2017-0037977
Apr. 7, 2017 (KR) ........................ 10-2017-0045528
(Continued)

(51) Int. Cl.
*H04W 72/0446* (2023.01)
*H04W 72/04* (2023.01)

(52) U.S. Cl.
CPC ..... *H04W 72/0446* (2013.01); *H04W 72/042* (2013.01)

(58) Field of Classification Search
CPC ........... H04W 72/0446; H04W 72/042; H04W 56/0015; H04W 56/00; H04W 72/1205;
(Continued)

(56) References Cited

U.S. PATENT DOCUMENTS

2014/0293844 A1 10/2014 Meng
2015/0237459 A1 8/2015 Webb et al.
(Continued)

FOREIGN PATENT DOCUMENTS

CN 105191175 12/2015
JP 2019-528633 10/2019
(Continued)

OTHER PUBLICATIONS

Office Action dated Feb. 20, 2020 for Korean Patent Application No. 10-2019-7019314 and its English translation provided by Applicant's foreign counsel.
(Continued)

*Primary Examiner* — Chi H Pham
*Assistant Examiner* — Raul Rivas
(74) *Attorney, Agent, or Firm* — Ladas & Parry, LLP

(57) ABSTRACT

The present invention relates to a wireless communication system. In particular, the present invention relates to a method including: receiving configuration information on a periodic signal through a higher layer signal, wherein a transmission/reception position of the periodic signal is configured to a first set of symbols within each slot which is set periodically; monitoring a PDCCH associated with a slot configuration of a first slot in order to receive slot configuration information for the first slot in which the transmission/reception position of the periodic signal is present; and performing a process for transmitting/receiving the periodic signal in the first slot, wherein when the first set of symbols within the first slot is designated as a flexible symbol by a (Continued)

higher layer, a transmission/reception of the periodic signal in the first slot is selectively performed according to a detection result of the PDCCH, and wherein the flexible symbol means a symbol whose purpose can be re-designated to DL, UL or flexible according to the slot configuration information of the PDCCH, and an apparatus therefor.

25 Claims, 20 Drawing Sheets

(30) Foreign Application Priority Data

| | | |
|---|---|---|
| May 5, 2017 | (KR) | 10-2017-0057103 |
| Sep. 29, 2017 | (KR) | 10-2017-0127243 |
| Oct. 13, 2017 | (KR) | 10-2017-0133163 |

(58) Field of Classification Search
CPC ......... H04W 72/1263; H04W 72/1278; H04W 72/1289; H04L 5/0053; H04L 5/1469; H04L 5/0094; H04L 27/26; H04L 5/0007; H04L 27/2602; H04J 3/1694; H04B 7/2643

See application file for complete search history.

(56) References Cited

U.S. PATENT DOCUMENTS

| | | | |
|---|---|---|---|
| 2015/0245246 A1 | 8/2015 | Golitschek Edler von Elbwart | |
| 2018/0053227 A1 | 2/2018 | Camhi et al. | |
| 2018/0149269 A1 | 5/2018 | Schneider et al. | |
| 2018/0309513 A1 | 10/2018 | Kim et al. | |
| 2018/0367289 A1 | 12/2018 | Kim et al. | |
| 2019/0349904 A1* | 11/2019 | Kwak | H04W 72/042 |

FOREIGN PATENT DOCUMENTS

| | | |
|---|---|---|
| KR | 10-2015-0110650 | 10/2015 |
| WO | 2018/026216 | 2/2018 |
| WO | 2018/097680 | 5/2018 |
| WO | 2018/158924 | 9/2018 |
| WO | 2018/174692 | 9/2018 |
| WO | 2018/175768 | 9/2018 |
| WO | 2018/222001 | 12/2018 |
| WO | 2019/029302 | 2/2019 |
| WO | 2019/083341 | 5/2019 |

OTHER PUBLICATIONS

3GPP TS 36.331 v14.1.0 (Dec. 2016): 3$^{rd}$ Generation Partnership Project: Technical Specification Group Radio Access Network; Evolved Universal Terrestrial Radio Access (E-ULTRA); Radio Resource Control (RRC); Protocol specification (Release 14), 3GPP Server release date (Dec. 28, 2016).
Office Action dated Oct. 2, 2019 for Korean Patent Application No. 10-2019-7019314 and its English translation provided by Applicant's foreign counsel.
NTT DOCOMO, Inc. "Views on common PDCCH", Doc. for: Discussion and Decision; Agenda item: 8.1.3.1.2, 3GPP TSG RAN WG1 Meeting #88, Athens, Greece Feb. 13-17, 2017, R1-1702807, pp. 1-5.
NTT DOCOMO, Inc. "Mechanisms for dynamic TDD", Doc. for: Discussion and Decision; Agenda item: 8.1.6.1, 3GPP TSG RAN WG1 Meeting #86bis, Lisbon, Portugal Oct. 10-14, 2017, R1-1610085, pp. 1-5.
ZTE, ZTE Microelectronics: "Discussion on dynamic TDD operations", Doc. For: Discussion and decision; Agenda item: 7.1.6.2; 3GPP TSG WG1 Meeting #87, Reno, USA Nov. 14-18, 2016, R1-1612158, pp. 1-3.

International Preliminary Report on Patentability (Chapter I) for PCT/KR2018/003561 dated Sep. 24, 2019 and its English translation from WIPO.
International Search Report for PCT/KR2018/003561 dated Jul. 12, 2018 and its English translation from WIPO (now published as WO 2018/174692).
Written Opinion of the International Searching Authority for PCT/KR2018/003561 dated Jul. 12, 2018 and its English translation from WIPO (now published as WO 2018/174692).
ZTE et al. "Overview of Duplexing and Cross-link Interference Mitigation". R1-1701613, 3GPP TSG RAN WG1 Meeting #88, Athens, Greece, Feb. 6, 2017, pp. 1-12.
Office Action dated Jul. 16, 2020 for Chinese Patent Application No. 201880029109.4 and its English translation provided by Applicant's foreign counsel.
Office Action dated Aug. 5, 2020 for Korean Patent Application No. 10-2019-7019314 and its English translation provided by Applicant's foreign counsel.
Office Action dated Sep. 7, 2020 for Japanese Patent Application No. 2019-552503 and its English translation provided by Applicant's foreign counsel.
Office Action dated Sep. 21, 2020 for Korean Patent Application No. 10-2019-7019314 and its English translation provided by Applicant's foreign counsel.
3GPP TSG RAN WG1 Meeting NR#3, R1-1715981, Nagoya, Japan, Sep. 18-25, 2017: "On UE-Group Common PDCCH", pp. 1-4.
3GPP TSG-RAN WG1#88bis, R1-1705604, Spokane, WA, USA, Apr. 3-7, 2017: "Contents of group common PDCCH", pp. 1-6.
3GPP TSG RAN WG1 Meeting #89, R1-1707635, Hangzhou, China, May 15-19, 2017: "Discussion on UE behavior for the group common PDCCH", pp. 1-6.
3GPP TSG-RAN WG1 Meeting #87ah-NR, R1-1700766, Spokane, WA, USA, Jan. 16-20, 2017: "On CSI-RS design", pp. 1-8.
3GPP TSG RAN WG1 Meeting #86bis, R1-1608805, Lisbon, Portugal, Oct. 10-14, 2016: "Discussion on flexible/dynamic TDD", pp. 1-5.
Office Action dated Sep. 6, 2021 for Japanese Patent Application No. 2019-552503 and its English translation provided by Applicant's foreign counsel.
Office Action dated Sep. 23, 2021 for Chinese Patent Application No. 201880029109.4 and its English translation provided by Applicant's foreign counsel.
NTT DOCOMO, Inc. "Remaining issues on group-common PDCCH", 3GPP TSG RAN WG1 Meeting NR#3, R1-1716096, Nagoya, Japan, Sep. 12, 2017, pp. 1-10.
Qualcomm, "Offline discussion on GC-PDCCH for SFI", 3GPPP TSG RAN WG1 Meeting NR#3, R1-1716883, Nagoya, Japan, Sep. 21, 2017, pp. 1-13.
Vivo, "Design of group-common PDCCH", 3GPP TSG RAN WG1 NR Adhoc#3, R1-1715631, Nagoya, Japan, Sep. 11, 2017, pp. 1-9.
MediaTek Inc., "Design of GC PDCCH", 3GPP TSG RAN WG1 Meeting AH_NR#3, R1-1716200, Nagoya, Japan, Sep. 12, 2017, pp. 1-6.
Nokia, Alcatel-Lucent Shanghai Bell, "On common PDCCH for NR", 3GPP TSG-RAN WG1 Meeting #88, R1-1703311, Athens, Greece, Feb. 13-17, 2017, pp. 1-5.
Office Action dated Dec. 21, 2021 for Korean Patent Application No. 10-2021-7010844 and its English translation provided by Applicant's foreign counsel.
Samsung: "Common Control Signaling", R1-1609130, 3GPP TSG RAN WG1 #86bis, Lisbon, Portugal, Oct. 10-14, 2016, pp. 1-2.
Ericsson: "On dynamic TDD", R1-1609628, TSG-RAN WG1 #86bis, Lisbon, Portugal, Oct. 10-14, 2016, pp. 1-2.
Office Action dated Jun. 22, 2022 for Korean Patent Application No. 10-2021-7010844 and its English translation provided by Applicant's foreign counsel.
Office Action dated Jul. 11, 2022 for Japanese Patent Application No. 2019-552503 and its English translation provided by Applicant's foreign counsel.
Office Action dated Dec. 22, 2020 for Indian Patent Application No. 201927039320.

(56) References Cited

OTHER PUBLICATIONS

Notice of Allowance dated Jan. 8, 2021 for Korean Patent Application No. 10-2019-7019314 and its English translation provided by Applicant's foreign counsel.
Office Action dated Mar. 22, 2021 for Chinese Patent Application No. 201880029109.4 and its English translation provided by Applicant's foreign counsel.
Office Action dated Jun. 25, 2021 for Korean Patent Application No. 10-2021-7010844 and its English translation provided by Applicant's foreign counsel.
WILUS Inc.: "Consideration on Fallback Operation for Scheduled UEs", 3GPP TSG RAN WG1 Meeting #88bis, R1-1705848, Spokane, USA, Apr. 3-7, 2017, pp. 1-4.
WILUS Inc.: "UE Procedure for group common PDCCH for NR", 3GPP TSG RAN WG1 Meeting #89, R1-1708975, Hangzhou, P.R. China, May 15-19, 2017, pp. 1-5.
WILUS Inc.: "Discussion on UE behavior for group-common PDCCH for NR", 3GPP TSG RAN WG1 Meeting#90, R1-1714389, Prague, Czech Republic, Aug. 21-25, 2017, pp. 1-7.
WILUS Inc.: "Remaining issues on group-common PDCCH for NR", 3GPP TSG RAN WG1 Meeting 90bis, R1-1718276, Prague, CZ, Oct. 9-13, 2017, pp. 1-7.
WILUS Inc.: "Remaining issues on group-common PDCCH for NR", 3GPP TSG RAN WG1 Meeting 91, R1-1720874, Reno, USA, Nov. 27-Dec. 1, 2017, pp. 1-4.
WILUS Inc.: "Remaining issues on group-common PDCCH for NR", 3GPP TSG RAN WG1 Meeting #92, R1-1802934, Athens, Greece, Feb. 26-Mar. 2, 2018, pp. 1-3.
WILUS Inc.: "Remaining issues on group-common PDCCH for NR", 3GPP TSG RAN WG1 Meeting #92bis, R1-1805240, Sanya, China, Apr. 16-20, 2018, pp. 1-3.
Office Action dated Oct. 20, 2022 for Korean Patent Application No. 10-2021-7010844 and its English translation provided by Applicant's foreign counsel.
Extended European Search Report dated Dec. 19, 2022 for European Patent Application No. 22189410.8.
3GPP TR 38.802 V1.2.0 (Feb. 2017): "3rd Generation Partnership Project; Technical Specification Group Radio Access Network; Study on New Radio (NR) Access Technology; Physical Layer Aspects (Release 14)", 3GPP Standard; Technical Report; 3GPP TR 38.302, 3rd Generation Partnership Project (3GPP), Mobile Competence Centre; 650, Route des Lucioles, F-06921 Sophia-Antipolis Cedex; France, vol. RAN WG1, No. V1.2.0, Mar. 1, 2017, XP051290352, pp. 1-83.
Extended European Search Report dated Dec. 21, 2022 for European Patent Application No. 22189415.7.
Ericsson: "Summary of offline discussion on group common PDCCH—part 2", TSG-RAN WG1 BR AdHoc, 1-1701521, Spokane, WA, USA, Jan. 16-20, 2017, pp. 1-1.
Office Action dated Jan. 25, 2023 for Korean Patent Application No. 10-2022-7033100 and its English translation provided by the Applicant's foreign counsel.
Samsung: "Signaling of Slot Structure", 3GPP TSG RAN WG1 #86bis, R1-1609127, Lisbon, Portugal, Oct. 10-14, 2016, pp. 1-3.
Office Action dated May 29, 2023 for Japanese Patent Application No. 2019-552503 and its English translation provided by Applicant's foreign counsel.

* cited by examiner

METHOD, APPARATUS AND SYSTEM FOR TRANSMITTING AND RECEIVING CONTROL CHANNEL OF WIRELESS COMMUNICATION SYSTEM

TECHNICAL FIELD

The present invention relates to a wireless communication system, and more particularly, to a method and apparatus for transmitting and receiving control channels in a wireless communication system supporting time division multiple access.

BACKGROUND ART

The 3rd generation partnership project new radio (3GPP NR) system improves the spectral efficiency of the network, enabling operators to provide more data and voice services over a given bandwidth. As a result, the 3GPP NR system is designed to meet the demands for high-speed data and media transmissions in addition to supporting large volumes of voice. The advantages of the NR system are supports of high processing amount, low latency, frequency division duplex (FDD) and time division duplex (TDD) on the same platform, improved end user experience, and a simple architecture with low operating costs.

For more efficient data processing, a Dynamic TDD of the NR system may use a method of varying the number of orthogonal frequency division multiplexing (OFDM) symbols that can be used for uplink/downlink according to data traffic directions of users of a cell. For example, the base station may allocate a plurality of downlink OFDM symbols to a slot (or subframe) when a downlink traffic of the cell is larger than an uplink traffic. The information on the slot configuration should be transmitted to the terminals.

DISCLOSURE

Technical Problem

An object of the present invention is to provide a method for informing a terminal of information on a slot configuration, a communication method according to the slot configuration, and an apparatus therefor.

Technical objects desired to be achieved in the present invention are not limited to the aforementioned objects, and other technical objects not described above will be clearly understood by those skilled in the art from the following disclosure.

Technical Solution

A first aspect of the present invention provides a method for determining a reception of a downlink signal by a user equipment in a wireless communication system, the method including: receiving configuration information on a periodic signal through a higher layer signal, wherein a reception position of the periodic signal is configured to a first set of symbols within each slot which is set periodically; monitoring a physical downlink control channel (PDCCH) associated with a slot configuration of a first slot in order to receive slot configuration information for the first slot in which the reception position of the periodic signal is present; and performing a process for receiving the periodic signal in the first slot, wherein when the first set of symbols within the first slot is designated as a flexible symbol by a higher layer, a reception of the periodic signal in the first slot is selectively performed according to a detection result of the PDCCH, and wherein the flexible symbol means a symbol whose purpose can be re-designated to downlink (DL), uplink (UL) or flexible according to the slot configuration information of the PDCCH.

A second aspect of the present invention provides a user equipment used for a wireless communication system, the user equipment including: a communication module; and a processor, wherein the processor receives configuration information on a periodic signal through a higher layer signal, wherein a reception position of the periodic signal is configured to a first set of symbols within each slot which is set periodically, monitors a physical downlink control channel (PDCCH) associated with a slot configuration of a first slot in order to receive slot configuration information for the first slot in which the reception position of the periodic signal is present, and performs a process for receiving the periodic signal in the first slot, wherein when the first set of symbols within the first slot is designated as a flexible symbol by a higher layer, a reception of the periodic signal in the first slot is selectively performed according to a detection result of the PDCCH, and wherein the flexible symbol means a symbol whose purpose can be re-designated to downlink (DL), uplink (UL) or flexible according to the slot configuration information of the PDCCH.

In the first and second aspects, the periodic signal may include a channel status information reference signal (CSI-RS).

In the first and second aspects, the PDCCH may include a group common (GC)-PDCCH having a slot configuration for the first slot, and when the first set of symbols within the first slot is designated as a flexible symbol by the higher layer and the GC-PDCCH is not detected, the reception of the periodic signal in the first slot may be skipped.

In the first and second aspects, the PDCCH may include a group common (GC)-PDCCH having slot configuration information for the first slot, and when the first set of symbols within the first slot is designated as a flexible symbol by the higher layer and the slot configuration information detected from the GC-PDCCH indicates the first set of symbols as flexible, the reception of the periodic signal in the first slot may be skipped.

In the first and second aspects, the reception of the periodic signal in the first slot may be performed only when the slot configuration information detected from the GC-PDCCH indicates the first set of symbols as a DL symbol.

In the first and second aspects, the PDCCH may include a user specific (US)-PDCCH having downlink scheduling information, and when the first set of symbols within the first slot is designated as a flexible symbol by the higher layer and a DL signal is scheduled for the first set of symbols by the US-PDCCH, the reception of the periodic signal in the first slot may be performed.

A third aspect of the present invention provides a method for determining a transmission of an uplink signal by a user equipment in a wireless communication system, the method including: receiving configuration information on a periodic signal through a higher layer signal, wherein a transmission position of the periodic signal is configured to a first set of symbols within each slot which is set periodically; monitoring a physical downlink control channel (PDCCH) associated with a slot configuration of a first slot in order to receive slot configuration information for the first slot in which the transmission position of the periodic signal is present; and performing a process for transmitting the periodic signal in the first slot, wherein when the first set of symbols within the first slot is designated as a flexible symbol by a higher layer, a transmission of the periodic signal in the first slot is selectively performed according to a detection result of the PDCCH, and wherein the flexible symbol means a symbol whose purpose can be re-designated to downlink (DL), uplink (UL) or flexible according to the slot configuration information of the PDCCH.

A fourth aspect of the present invention provides a user equipment used for a wireless communication system, the user equipment including: a communication module; and a processor, wherein the processor receives configuration information on a periodic signal through a higher layer signal, wherein a transmission position of the periodic signal is configured to a first set of symbols within each slot which is set periodically, monitors a physical downlink control channel (PDCCH) associated with a slot configuration of a first slot in order to receive slot configuration information for the first slot in which the transmission position of the periodic signal is present, and performs a process for transmitting the periodic signal in the first slot, wherein when the first set of symbols within the first slot is designated as a flexible symbol by a higher layer, a transmission of the periodic signal in the first slot is selectively performed according to a detection result of the PDCCH, and wherein the flexible symbol means a symbol whose purpose can be re-designated to downlink (DL), uplink (UL) or flexible according to the slot configuration information of the PDCCH.

In the third and fourth aspects, the periodic signal may include a sounding reference signal (SRS).

In the third and fourth aspects, the PDCCH may include a group common (GC)-PDCCH having a slot configuration for the first slot, and when the first set of symbols within the first slot is designated as a flexible symbol by the higher layer and the GC-PDCCH is not detected, the transmission of the periodic signal in the first slot may be skipped.

In the third and fourth aspects, the PDCCH may include a group common (GC)-PDCCH having slot configuration information for the first slot, and when the first set of symbols within the first slot is designated as a flexible symbol by the higher layer and the slot configuration information detected from the GC-PDCCH indicates the first set of symbols as flexible, the transmission of the periodic signal in the first slot may be skipped.

In the third and fourth aspects, the transmission of the periodic signal in the first slot may be performed only when the slot configuration information detected from the GC-PDCCH indicates the first set of symbols as a DL symbol.

In the third and fourth aspects, the PDCCH may include a user specific (US)-PDCCH having uplink scheduling information, and when the first set of symbols within the first slot is designated as a flexible symbol by the higher layer and a DL signal is scheduled for the first set of symbols by the US-PDCCH, the transmission of the periodic signal in the first slot may be performed.

Advantageous Effects

According to exemplary embodiments of the present invention, information on the slot configuration can be efficiently informed to the terminal, and the signals can be efficiently transmitted and received between the base station and the terminal according to the slot configuration.

Effects to be acquired in the present invention are not limited to the aforementioned effects, and other effects not described above will be clearly understood by those skilled in the art from the following disclosure.

DESCRIPTION OF DRAWINGS

FIG. 5($b$) is a diagram illustrating CCE aggregation of PDCCH and multiplexing of PDCCH.

DETAILED DESCRIPTION OF THE INVENTION

Figure 1:
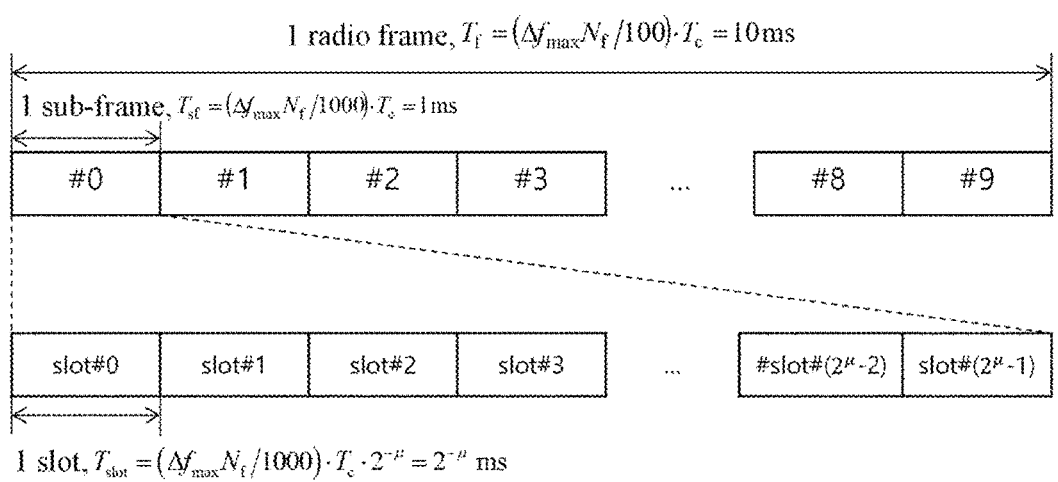
FIG. 1 illustrates an example of a wireless frame structure used in a wireless communication system.

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). $3^{rd}$ generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present invention is not limited thereto.

Unless otherwise specified in this specification, a base station may refer to a next generation node B (gNB) as defined in 3GPP NR. Furthermore, unless otherwise specified, a terminal may refer to a user equipment (UE).

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f/100)*T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz, and $\mu$ can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu-1$ may be respectively allocated to $2^\mu$ slots within one subframe. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe number), and a slot number (or a slot index).

Figure 2:
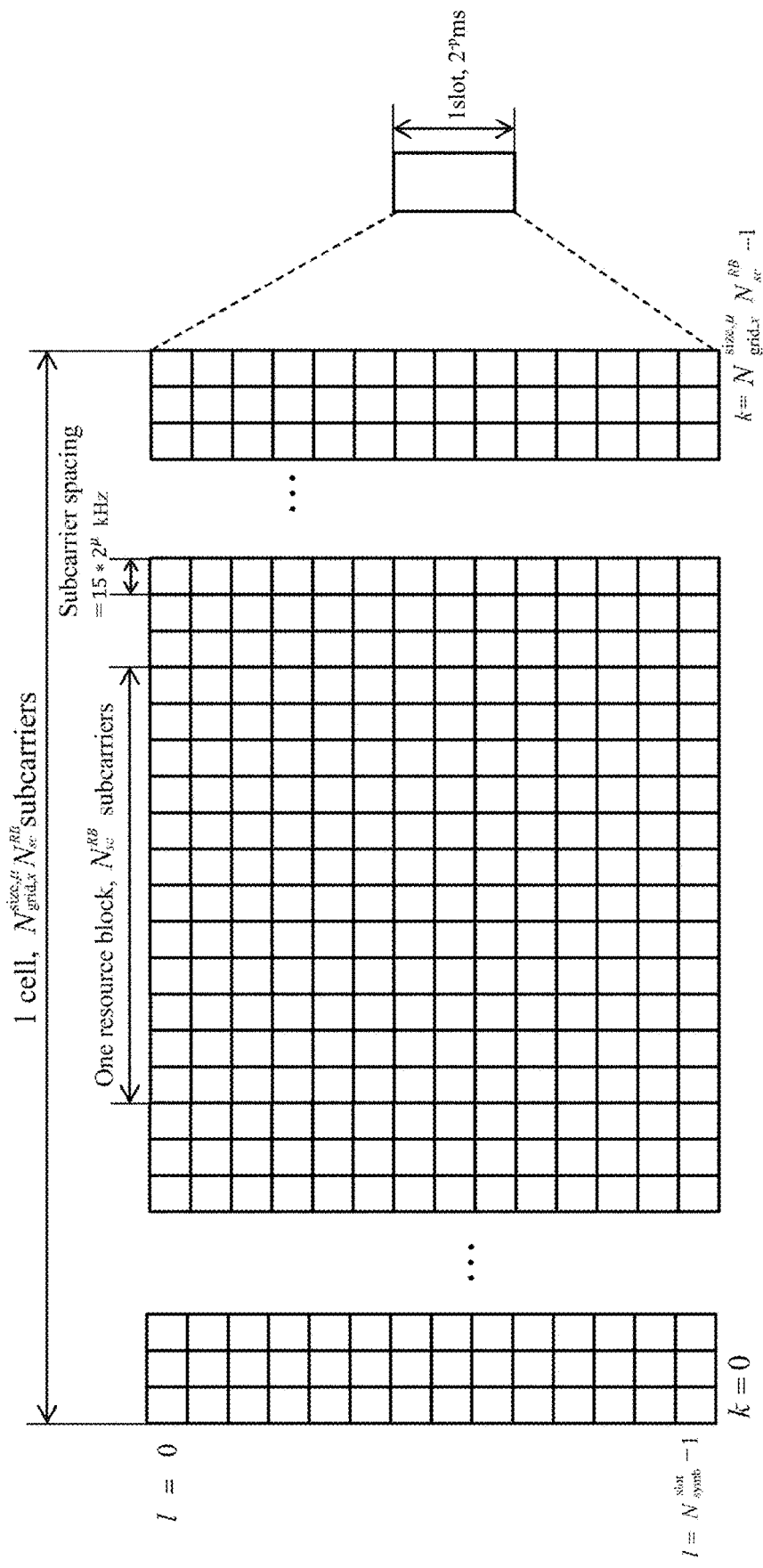
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of OFDM symbols in a time domain and includes a plurality of resource blocks (RBs) in a frequency domain. An OFDM symbol also means one symbol duration. Unless otherwise specified, an OFDM symbol may be simply referred to as a symbol. Referring to FIG. 2, a signal transmitted in each slot may be represented by a resource grid consisting of $N^{size,\mu}_{grid,x}*N^{RB}_{sc}$ subcarriers, and $N^{slot}_{symb}$ OFDM symbols. Here, x=DL for the downlink resource grid, and x=UL for the uplink resource grid. $N^{size,\mu}_{grid,x}$ denotes the number of resource blocks (downlink or uplink according to x) according to a subcarrier spacing configuration $\mu$, and $N^{slot}_{symb}$ denotes the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spreading OFDM (DFT-s-OFDM) symbol according to a multiple access scheme. The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP may only be used at 60 kHz subcarrier spacing. In FIG. 2, for convenience of description, one slot includes 14 OFDM symbols by way of example, but embodiments of the present invention may be applied in a similar manner to a slot having a different number of OFDM symbols. Referring to FIG. 2, each OFDM symbol includes $N^{size,\mu}_{grid,x} * N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

An RB may be defined by $N^{slot}_{symb}$ (e.g., 14) consecutive OFDM symbols in the time domain and may be defined by $N^{RB}_{sc}$ (e.g., 12) consecutive subcarriers in the frequency domain. As a reference, a resource including one OFDM symbol and one subcarrier may be referred to as a resource element (RE) or a tone. Therefore, one RB may include $N^{slot}_{symb} * N^{RB}_{sc}$ resource elements. Each resource element in the resource grid may be uniquely defined by a pair of indexes (k, l) in one slot. k may be an index numbered from 0 to $N^{size,\mu}_{grid,x} * N^{RB}_{sc} - 1$ in the frequency domain, and l may be an index numbered from 0 to $N^{slot}_{symb} - 1$ in the time domain.

On the other hand, one RB may be mapped to one physical resource block (PRB) and one virtual resource block (VRB). The PRB may be defined by $N^{slot}_{symb}$ (e.g., 14) consecutive OFDM symbols in the time domain. Further, the PRB may be defined by $N^{RB}_{sc}$ (e.g., 12) consecutive subcarriers in the frequency domain. Therefore, one PRB may include $N^{RB}_{sc} * N^{slot}_{symb}$ resource elements.

In order for the user equipment to receive a signal from the base station or to transmit a signal to the base station, the time/frequency synchronization of the user equipment may be synchronized with the time/frequency synchronization of the base station. This is because the base station and the user equipment need to be synchronized, so that user equipment can determine the time and frequency parameters required for demodulating the DL signal and transmitting the UL signal at the correct time.

Figure 3:
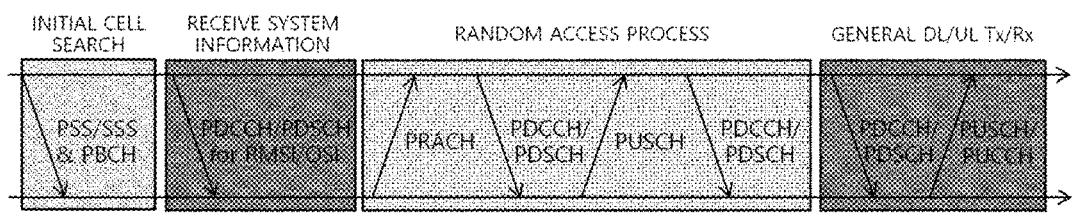
FIG. 3 is a diagram illustrating a physical channel used in a 3GPP system and a general signal transmission method using the physical channel.

FIG. 3 is a diagram for explaining a physical channel used in a 3GPP system (e.g., NR) and a general signal transmission method using the physical channel. When the power of the user equipment is turned on or the user equipment enters a new cell, the user equipment performs an initial cell search (S301). Specifically, the user equipment may synchronize with the base station in the initial cell search. For this, the user equipment may receive a Primary Synchronization Signal (PSS) and a Secondary Synchronization Signal (SSS) from a base station, synchronize with the base station, and obtain information such as a cell ID. Thereafter, the user equipment may receive the physical broadcast channel from the base station and obtain the in-cell broadcast information. Upon completion of the initial cell search, the user equipment receives a Physical Downlink Control Channel (PDCCH) and a Physical Downlink Shared Channel (PDSCH) according to information carried in the PDCCH, so that the user equipment can obtain more specific system information than the system information obtained through the initial cell search (S302). When the user equipment initially accesses the base station or does not have radio resources for signal transmission, the user equipment may perform a random access procedure on the base station (S303 to S306). For this, the user equipment may transmit a specific sequence as a preamble through a Physical Random Access Channel (PRACH) (S303 and S305) and receive a response message for the preamble on the PDCCH and the corresponding PDSCH from the base station (S304 and S306). In case of the contention-based RACH, a contention resolution procedure may be additionally performed. After the above-described procedure, the user equipment receives PDCCH/PDSCH (S307) and transmits a Physical Uplink Shared Channel (PUSCH)/Physical Uplink Control Channel (PUCCH) (S308) as a general phase/DL signal transmission procedure. In particular, the user equipment may receive DL Control Information (DCI) through the PDCCH. The DCI may include control information such as resource allocation information for the user equipment. Also, the format of the DCI may vary depending on the intended use of the DCI. The control information that the user equipment transmits to or receives from the base station through the UL includes a DL/UL ACK/NACK signal, a Channel Quality Indicator (CQI), a Precoding Matrix Index (PMI), a Rank Indicator (RI). In the 3GPP NR system, the user equipment may transmit control information such as HARQ-ACK and CSI described above through the PUSCH and/or PUCCH.

Figure 4:
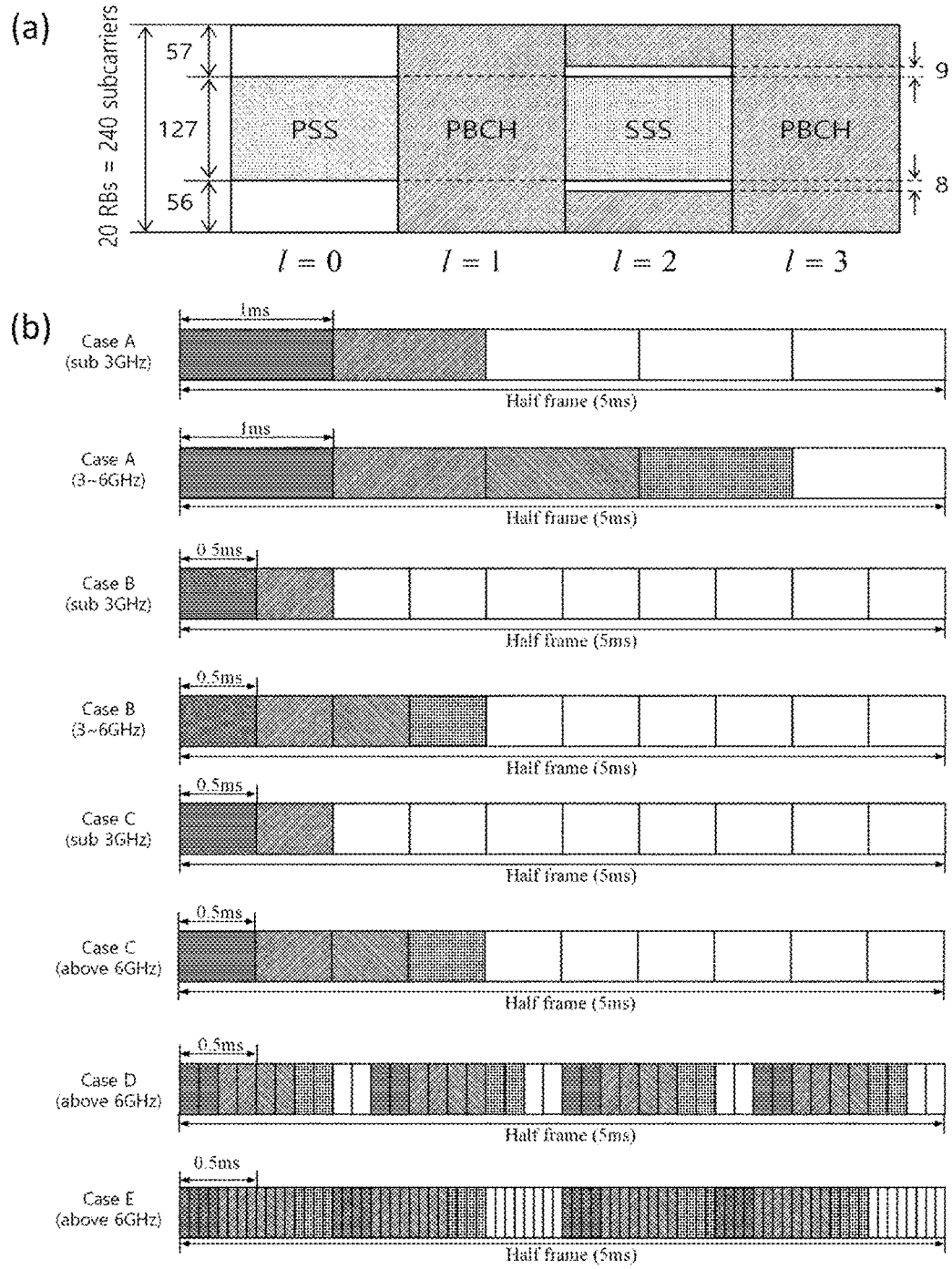
FIG. 4 illustrates an SS/PBCH block for initial cell access in a 3GPP NR system.

FIG. 4 illustrates an SS/PBCH block for initial cell access in a 3GPP NR system.

When the power of the user equipment is turned on and the user equipment tries to access a new cell, the user equipment may obtain time and frequency synchronization with the cell and perform an initial cell search procedure. The user equipment can detect the physical cell identity $N^{cell}_{ID}$ of the cell in the initial cell search procedure. For this, the user equipment may receive a synchronization signal, for example, a PSS and an SSS from a base station and synchronize with the base station. In this case, the user equipment may obtain information such as a cell identity (ID). Referring to FIG. 4(a), a synchronization signal will be described in more detail. The synchronization signal may be divided into PSS and SSS. The PSS may be used to obtain time domain synchronization and/or frequency domain synchronization, such as OFDM symbol synchronization and slot synchronization. The SSS may be used to obtain frame synchronization and cell group ID. Referring to FIG. 4(a) and Table 1, the SS/PBCH block consists of 20 RBs (=240 subcarriers) in the frequency axis, and consists of 4 OFDM symbols in the time axis. Here, in the SS/PBCH block, PSS in the first OFDM symbol and SSS in the third OFDM symbol are transmitted in 56, 57, . . . , 182 subcarriers. Here, the lowest subcarrier index of the SS/PBCH block is numbered from 0. In the first OFDM symbol in which the PSS is transmitted, the base station does not transmit a signal in the remaining subcarriers, that is, 0, 1, . . . , 55, 183, 184, . . . , 239 subcarriers. In the third OFDM symbol in which the SSS is transmitted, the base station does not transmit a signal in 48, 49, . . . , 55, 183, 184, . . . , 191 subcarriers. In the SS/PBCH block, the base station transmits the PBCH signal through the remaining RE except the above signal.

TABLE 1

| Channel or signal | OFDM symbol number l relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, |

TABLE 1-continued

| Channel or signal | OFDM symbol number l relative to the start of an SS/PBCH block | Subcarrier number k relative to the start of an SS/PBCH block |
|---|---|---|
| PBCH | 1, 3 | 184, ..., 191<br>0, 1, ..., 239 |
| | 2 | 0, 1, ..., 47,<br>192, 193, ..., 239 |
| DM-RS for PBCH | 1, 3 | 0 + v, 4 + v, 8 + v, ..., 236 + v |
| | 2 | 0 + v, 4 + v, 8 + v, ..., 44 + v<br>192 + v, 196 + v, ..., 236 + v |

The SS may represent a total of 1008 unique physical layer cell IDs through a combination of 3 PSSs and 336 SSs. Specifically, the physical layer cell ID is grouped into 336 physical-layer cell-identifier groups, where each group includes 3 unique identifiers such that each physical-layer cell ID is part of only one physical-layer cell-identifier group. Therefore, the physical layer cell identifier $N^{cell}_{ID}=3N^{(1)}_{ID}+N^{(2)}_{ID}$ may be defined by a number $N^{(1)}_{ID}$ ranging from 0 to 335 indicating a physical-layer cell-identifier group and a number $N^{(2)}_{ID}$ ranging from 0 to 2 indicating a physical-layer identifier in the physical-layer cell-identifier group. The user equipment may detect the PSS and identify one of the three unique physical-layer identifiers. In addition, the user equipment may detect the SSS and identify one of the 336 physical layer cell IDs associated with the physical-layer identifier. The PSS signal is as follows.

$$d_{PSS}(n)=1-2x(m)$$

$$m=(n+43N_{ID}^{(2)}) \bmod 127$$

$$0 \leq n < 127$$

Here $x(i+7)=(x(i+4)+x(i)) \bmod 2$ and $[x(6)x(5)x(4)x(3)x(2)x(1)x(0)]=[1\ 1\ 1\ 0\ 1\ 1\ 0]$. SSS is as follows.

$$d_{SSS}(n) = [1 - 2x_0((n + m_0) \bmod 127)][1 - 2x_1((n + m_1) \bmod 127)]$$

$$m_0 = 15\left\lfloor \frac{N_{ID}^{(1)}}{112} \right\rfloor + 5N_{ID}^{(2)}$$

$$m_1 = N_{ID}^{(1)} \bmod 112$$

$$0 \leq n < 127$$

Here, $\begin{aligned} x_0(i+7) &= (x_0(i+4) + x_0(i)) \bmod 2 \\ x_1(i+7) &= (x_1(i+1) + x_1(i)) \bmod 2 \end{aligned}$ and $[x_0(6)\ x_0(5)\ x_0(4)\ x_0(3)\ x_0(2)\ x_0(1)\ x_0(0)] = [0\ 0\ 0\ 0\ 0\ 0\ 1]$ $[x_1(6)\ x_1(5)\ x_1(4)\ x_1(3)\ x_1(2)\ x_1(1)\ x_1(0)] = [0\ 0\ 0\ 0\ 0\ 0\ 1]$.

A wireless frame with a 10 ms duration may be divided into two half frames with a duration of 5 ms. Referring to FIG. 4(b), a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is {2, 8}+14*n symbols. In this case, n=0, 1 at a carrier frequency of 3 GHz or less. At frequencies below 6 GHz above 3 GHz, n=0, 1, 2, or 3. In the case B, the subcarrier spacing is 30 kHz and the starting time point of the SS/PBCH block is {4, 8, 16, 20}+28*n. In this case, n=0, 1 at a carrier frequency of 3 GHz or less. At frequencies below 6 GHz above 3 GHz, n=0 or 1. In the case C, the subcarrier spacing is 30 kHz and the starting time point of the SS/PBCH block is {2, 8}+14*n. In this case, n=0 or 1 at a carrier frequency of 3 GHz or less. At frequencies below 6 GHz above 3 GHz, n=0, 1, 2, or 3. In the case D, the subcarrier spacing is 120 kHz and the starting time point of the SS/PBCH block is {4, 8, 16, 20}+28*n. In this case, at a carrier frequency of 6 GHz or more, n=0, 1, 2, 3, 5, 6, 7, 8, 10, 11, 12, 13, 15, 16, 17, or 18. In the case E, the subcarrier spacing is 240 kHz and the starting time point of the SS/PBCH block is {8, 12, 16, 20, 32, 36, 40, 44}+56*n. In this case, at a carrier frequency of 6 GHz or more, n=0, 1, 2, 3, 5, 6, 7, or 8.

Figure 5A:
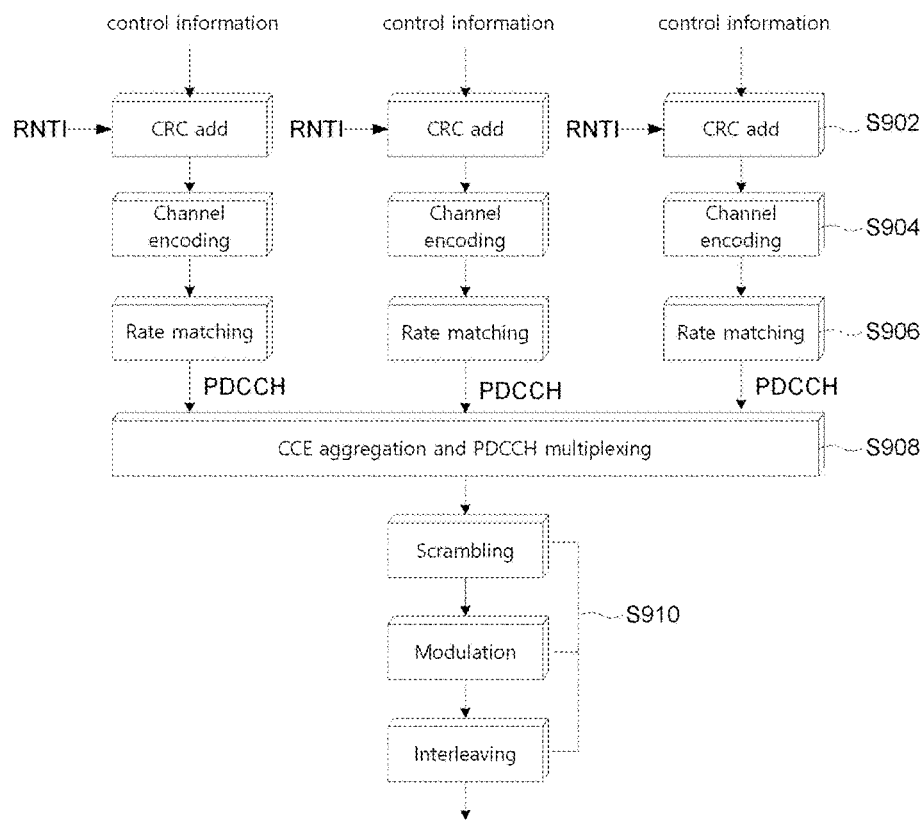
FIG. 5($a$) is a diagram of a procedure for transmitting control information in a 3GPP NR system.
Figure 5B:
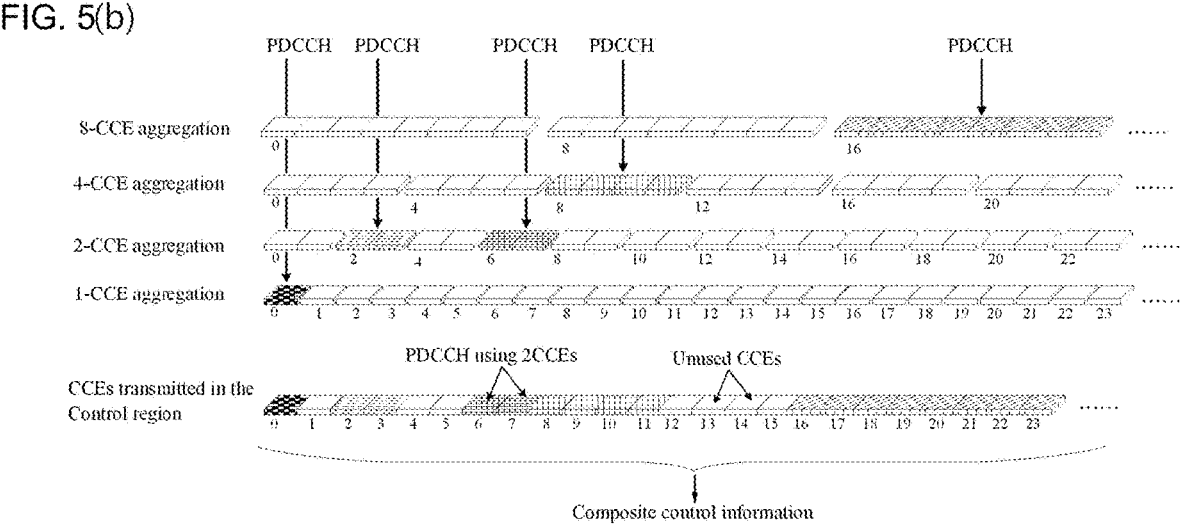

FIG. 5 relates to a procedure for transmission of control information and control channel in a 3GPP NR system. Referring to FIG. 5(a), the base station may add a cyclic redundancy check (CRC) masked with a radio network temporary identifier (RNTI) (e.g., an XOR operation) to control information (e.g., Downlink Control Information, DCI) (S502). The base station may scramble the CRC with an RNTI value determined according to the purpose/target of each control information. The common RNTI used by one or more terminals may include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of cell temporary RNTI (C-RNTI) and semi-persistent scheduling (SPS C-RNTI). Thereafter, the base station may perform rate-matching according to the amount of resource(s) used for PDCCH transmission (S506) after performing channel coding (e.g., polar coding) (S504). Subsequently, the base station may multiplex DCI(s) based on a control channel element (CCE) based PDCCH structure (S508), apply additional processes (e.g., scrambling, modulation (e.g., QPSK), and interleaving) (S910) for the multiplexed DCI(s), and thereafter, map it to a resource to be transmitted. The CCE is a basic resource unit for the PDCCH, and one CCE may consist of a plurality (e.g., six) resource element groups (REGs). One REG may consist of a plurality of (e.g., 12) REs. The number of CCEs used for one PDCCH may be defined as an aggregation level. In 3GPP NR system, 1, 2, 4, 8 or 16 can be used. FIG. 5(b) is a diagram illustrating the CCE aggregation level and the PDCCH multiplexing. In this case, the type of the CCE aggregation level used for one PDCCH and the CCE(s) transmitted in the control region accordingly are described.

Figure 6:
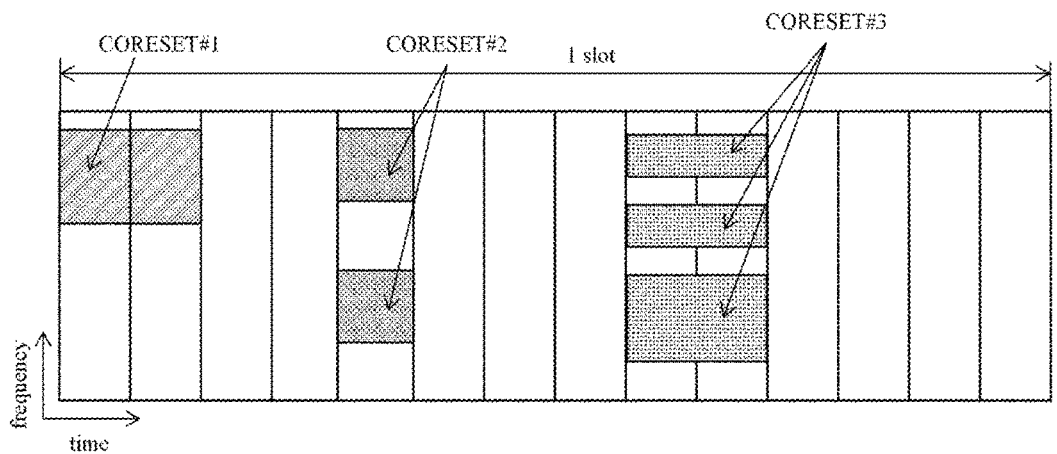
FIG. 6 is a diagram illustrating a control resource set (CORESET) in which a physical downlink control channel (PDCCH) can be transmitted in a 3GPP NR system.

FIG. 6 is a diagram illustrating a control resource set (CORESET) in which a physical downlink control channel (PDCCH) in a 3GPP NR system may be transmitted.

CORESET is a time-frequency resource in which PDCCH, that is, a control signal of a user equipment, is transmitted. Referring to FIG. 6, the user equipment may decode the PDCCH mapped in the CORESET by receiving only time-frequency resources defined by CORESET, instead of attempting to decode the PDCCH by receiving all the frequency bands. The base station may configure one or more CORESETs for each cell to the user equipment. CORESET may be configured with up to three consecutive symbols on the time axis. In addition, CORESET may be configured continuously or discontinuously in 6 PRBs units on the frequency axis. In the embodiment of FIG. 5, CORESET #1 is configured with consecutive PRBs, and CORESET #2 and CORESET #3 are configured with discontinuous PRBs. CORESET may be located in any symbol in the slot. For example, CORESET #1 in FIG. 5 starts at the first symbol of the slot, CORESET #2 starts at the fifth symbol of the slot, and CORESET #9 starts at the ninth symbol of the slot.

Figure 7:
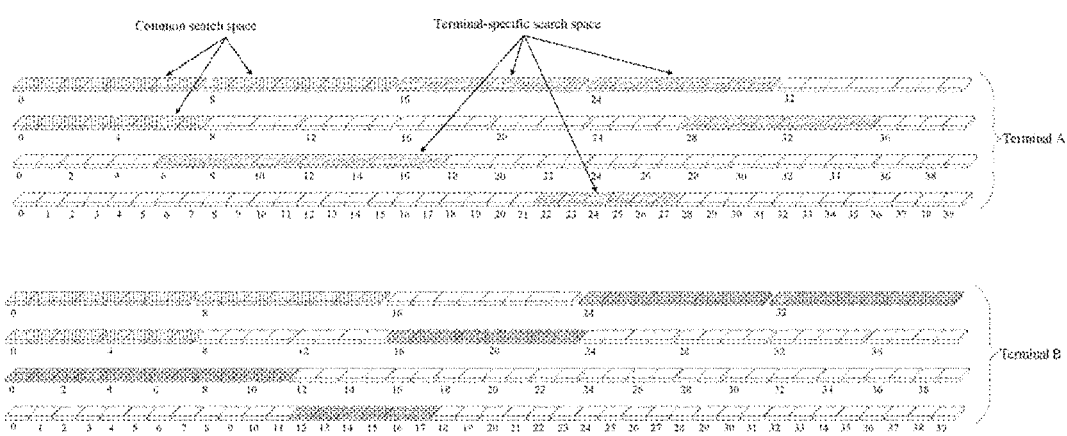
FIG. 7 is a diagram illustrating CCE aggregation search space allocation for a common search space and a UE specific (or terminal specific) search space.

FIG. 7 is a diagram for setting a PDCCH search space in the 3GPP NR system. In order to transmit the PDCCH to the user equipment, each CORESET may have at least one search space. In the present invention, the search space is all the time-frequency resource combinations (hereinafter, a set of PDCCH candidates) through which the PDCCH of the user equipment may be transmitted. The search space may include a common search space that the user equipment of the 3GPP NR must commonly perform a search and a Terminal-specific or UE-specific search space that a specific user equipment must perform a search. In the common search space, it is set to monitor the PDCCH that all the user equipments in the cell belonging to the same base station are commonly set to search. Furthermore, in the UE-specific search space, each user equipment may be set to monitor the PDCCH allocated to each user equipment in different search space positions according to the user equipment. The corresponding UE-specific search space may be partially overlapped with the search space of other user equipments due to the limited control region to which the PDCCH can be allocated. Monitoring the PDCCH includes blind decoding PDCCH candidates in the search space. The case where the blind decoding is successful may be expressed that the PDCCH is (successfully) detected/received. Furthermore, the case where the blind decoding has failed may be expressed that the PDCCH is not successfully detected/received.

For convenience of explanation, a PDCCH scrambled with a group common (GC) RNTI (or common control RNTI, CC-RNTI) already known to transmit UL scheduling information or DL scheduling information to one or more user equipments is referred to as a (UE) group common (GC) PDCCH or a common PDCCH. In addition, a PDCCH scrambled with a UE-specific RNTI that a specific user equipment already knows to transmit UL scheduling information or DL scheduling information to one specific user equipment is referred to as a UE-specific (US) PDCCH.

The PDCCH signals each user equipment or user equipment group of at least one of information related to resource allocation (i.e., DL grant) of a paging channel (PCH) and a downlink-shared channel (DL-SCH), information related to resource allocation (i.e., UL grant) of UL-SCH, and HARQ information. The base station can transmit a PCH transport block and a downlink-shared channel (DL-SCH) transmission channel through a PDSCH. The base station may transmit data excluding specific control information or specific service data through the PDSCH. In addition, the user equipment may receive data excluding specific control information or specific service data through the PDSCH.

The base station may include, in the PDCCH, information on to which user equipment (one or more user equipments) PDSCH data is transmitted and how the PDSCH data is to be received and decoded by the corresponding user equipment, and transmit the PDCCH. For example, it is assumed that a specific PDCCH is CRC masked with an RNTI called "A", and information on data transmitted using a radio resource (e.g., frequency location) called "B" and a DCI format called "C", that is, transmission format information (e.g., transport block size, modulation scheme, coding information, etc.) is transmitted through a specific subframe. In this case, the user equipment in the cell monitors the PDCCH using the RNTI information the user equipment has, and when there is more than one user equipment with an "A" RNTI, the corresponding user equipment receives the PDCCH and receives the PDSCH indicated by "B" and "C" through the information of the received PDCCH.

Table 2 shows the physical uplink control channel (PUCCH) used in the wireless communication system.

TABLE 2

| PUCCH format | Length in OFDM symbols | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

The PUCCH may be used to transmit the following control information.

Scheduling Request (SR): Information used to request a UL UL-SCH resource.

HARQ-ACK: A response to the PDCCH (which indicates DL SPS release) and/or a response to a DL data packet on the PDSCH. It indicates whether PDCCH or PDSCH has been successfully received. The HARQ-ACK response includes positive ACK (simply ACK), negative ACK (hereinafter NACK), Discontinuous Transmission (DTX), or NACK/DTX. Here, the term HARQ-ACK is interchangeably used with HARQ ACK/NACK and ACK/NACK. In general, ACK may be represented by 1 and NACK may be represented by 0.

Channel State Information (CSI): This is feedback information on the DL channel. It is generated by the user equipment based on the CSI-reference signal (RS) transmitted by the base station. Multiple Input Multiple Output (MIMO)-related feedback information includes a Rank Indicator (RI) and a Precoding Matrix Indicator (PMI). CSI may be divided into CSI part 1 and CSI part 2 according to the information indicated by CSI.

In the 3GPP NR system, five PUCCH formats may be used to support various service scenarios and various channel environments and frame structures.

PUCCH format 0 is a format may deliver 1-bit or 2-bit HARQ-ACK information. PUCCH format 0 may be transmitted through one OFDM symbol or two OFDM symbols on the time axis and one PRB on the frequency axis. When PUCCH format 0 is transmitted in two OFDM symbols, the same sequence to the two symbols may be transmitted through different PRBs. Through this, the user equipment can obtain a frequency diversity gain. More specifically, the user equipment may determine a value $m_{cs}$ of a cyclic shift according to $M_{bit}$ bits UCI ($M_{bit}$=1 or 2), and map a sequence obtained by cyclic-shifting a base sequence having a length of 12 to a predetermined value $m_{cs}$ to 12 REs of one PRB of one OFDM symbol and transmit it. In a case where the number of cyclic shifts usable by the user equipment is 12 and $M_{bit}$=1, when the user equipment transmits UCI 0 and UCI 1, the user equipment may arranges the difference value of the two cyclic shifts to 6. In addition, when $M_{bit}$=2 and the user equipment transmits UCI 00, UCI 01, UCI 11, UCI 10, the user equipment can arrange the difference of four cyclic shift values to 3.

PUCCH format 1 may deliver 1-bit or 2-bit HARQ-ACK information. PUCCH format 1 may be transmitted through consecutive OFDM symbols on the time axis and one PRB on the frequency axis. Here, the number of OFDM symbols occupied by PUCCH format 1 may be one of 4, 5, 6, 7, 8, 9, 10, 11, 12, 13, and 14. More specifically, $M_{bit}$=1 UCI may be BPSK-modulated. The user equipment generates a complex valued symbol d(0) by quadrature phase shift keying (QPSK) modulation of $M_{bit}$=2 UCI and multiplies the generated d(0) by a sequence of length 12 to obtain a signal. The user equipment transmits the obtained signal by spreading the even-numbered OFDM symbol to which PUCCH format 1 is allocated through the time axis orthogonal cover code (OCC). PUCCH format 1 determines the maximum number of different user equipments multiplexed in the same PRB according to the length of the OCC to be used. In the odd-numbered OFDM symbols of PUCCH format 1, demodulation RS (DMRS) is spread with OCC and mapped.

PUCCH format 2 may deliver Uplink Control Information (UCI) exceeding 2 bits. PUCCH format 2 may be transmitted through one 01-DM symbol or two 01-DM symbols on the time axis and one PRB on the frequency axis. When PUCCH format 2 is transmitted in two OFDM symbols, the same sequence to the two different OFDM symbols may be transmitted through different PRBs. Through this, the user equipment can obtain a frequency diversity gain. More specifically, $M_{bit}$ bits UCI ($M_{bit}$>2) is bit-level scrambled, QPSK-modulated, and mapped to the PRB(s) of the OFDM symbol. Here, the number of PRBs may be any one of 1, 2, . . . , 16.

PUCCH format 3 or PUCCH format 4 may deliver a UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4, 5, 6, 7, 8, 9, 10, 11, 12, 13, and 14. Specifically, the user equipment modulates $M_{bit}$ bits UCI ($M_{bit}$>2) with π/2-binary phase shift keying (BPSK) or QPSK to generate a complex valued symbol d(0), . . . , d(Msymb−1). The user equipment may not apply block-wise spreading to PUCCH format 3. However, the user equipment may apply block-wise spreading to one RB (12 subcarriers) using a length-12 PreDFT-OCC so that PUCCH format 4 can have two or four multiplexing capacities. The user equipment performs transmit precoding (or DFT-precoding) on the spread signal and mapping it to each RE to transmit the spread signal.

In this case, the number of PRBs occupied by PUCCH format 2, PUCCH format 3, or PUCCH format 4 may be determined according to the length and maximum code rate of the UCI transmitted by the user equipment. When the user equipment uses PUCCH format 2, the user equipment can transmit HARQ-ACK information and CSI information together through the PUCCH. When the number of PRBs that the user equipment can transmit is greater than the maximum number of PRBs that PUCCH format 2, or PUCCH format 3, or PUCCH format 4 is capable of using, the user equipment may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the PRB to be frequency hopped may be configured with the RRC signal. When PUCCH format 1, or PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs is required to start at an OFDM symbol of the same position in each slot, and have the same length. When one OFDM symbol among OFDM symbols of a slot in which the user equipment is required to transmit a PUCCH is indicated as a DL symbol by an RRC signal, the user equipment may not transmit the PUCCH in a corresponding slot and delay the transmission of the PUCCH to the next slot to transmit the PUCCH.

In the 3GPP NR system, a user equipment can perform transmission/reception using a bandwidth less than or equal to the bandwidth of a carrier (or cell). For this, the user equipment may be configured with a Bandwidth part (BWP) consisting of a continuous bandwidth which is a part of the bandwidth of the carrier. A user equipment operating according to TDD or operating in an unpaired spectrum may be configured with up to four DL/UL BWP pairs in one carrier (or cell). In addition, the user equipment may activate one DL/UL BWP pair. A user equipment operating according to FDD or operating in paired spectrum can receive up to four DL BWPs on a DL carrier (or cell) and up to four UL BWPs on a UL carrier (or cell). The user equipment may activate one DL BWP and one UL BWP for each carrier (or cell). The user equipment may or may not perform reception or transmission in a time-frequency resource other than the activated BWP. The activated BWP may be referred to as an active BWP.

The base station may indicate using the downlink control information (DCI) that the user equipment switch from one BWP to another BWP. Switching from one BWP to another BWP by the user equipment may indicate that the user equipment deactivates the BWP used by the user equipment and activates the new BWP. In a carrier (or cell) operating in TDD, the base station may include a Bandwidth part indicator (BPI) indicating the BWP to be activated in the DCI scheduling PDSCH or PUSCH to change the DL/UL BWP pair of the user equipment. The user equipment may receive the DCI scheduling the PDSCH or PUSCH and may identify the DL/UL BWP pair activated based on the BPI. For a DL carrier (or cell) operating as an FDD, the base station may include a BPI indicating the BWP to be activated in the DCI scheduling PDSCH to change the DL BWP of the user equipment. For a UL carrier (or cell) operating as an FDD, the base station may include a BPI indicating the BWP to be activated in the DCI scheduling PUSCH to change the UL BWP of the user equipment.

Hereinafter, a carrier aggregation technique will be described. FIG. 6 is a conceptual diagram illustrating carrier aggregation.

Carrier aggregation is a method in which the user equipment uses a plurality of frequency blocks or cells (in the logical sense) including UL resources (or component carriers) and/or DL resources (or component carriers) as one large logical frequency band in order for a wireless communication system to use a wider frequency band. Hereinafter, for convenience of description, the term "component carrier" is used.

Figure 8:
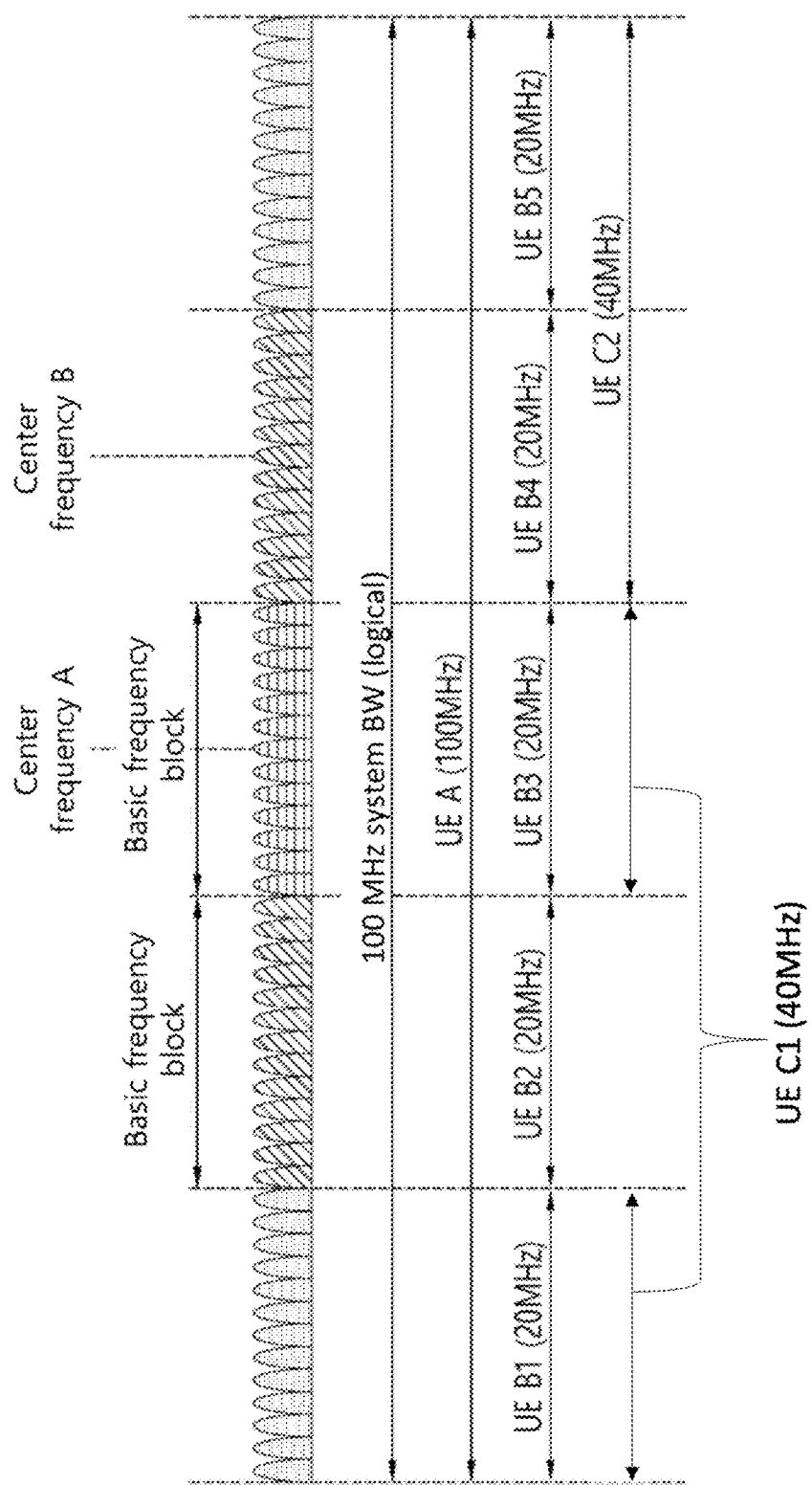
FIG. 8 is a conceptual diagram illustrating carrier aggregation.

Referring to FIG. 8, as an example of a 3GPP NR system, a total system bandwidth includes up to 16 ∂component carriers, and each component carrier may be capable of having a bandwidth up to 400 MHz. A component carrier may include one or more physically contiguous subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center carrier may be used in a physically adjacent component carrier. Assuming that all the component carriers are physically adjacent in the embodiment of FIG. 8, the center carrier A may be used in all the component carriers. Further, assuming that the respective component carriers are not physically adjacent to each other, the center carrier A and the center carrier B may be used in each of the component carriers.

When the total system band is extended by carrier aggregation, the frequency band used for communication with each user equipment may be defined in units of a component carrier. The user equipment A can use 100 MHz, which is the total system band, and performs communication using all five component carriers. The user equipments B1 to B5 can use only 20 MHz bandwidth and perform communication using one component carrier. The user equipments $C_1$ and $C_2$ can use a 40 MHz bandwidth and perform communication using two component carriers, respectively. The two component carriers may be logically/physically adjacent or non-adjacent. The user equipment $C_1$ represents the case of using two non-adjacent component carriers, and user equipment $C_2$ represents the case of using two adjacent component carriers.

Figure 9:
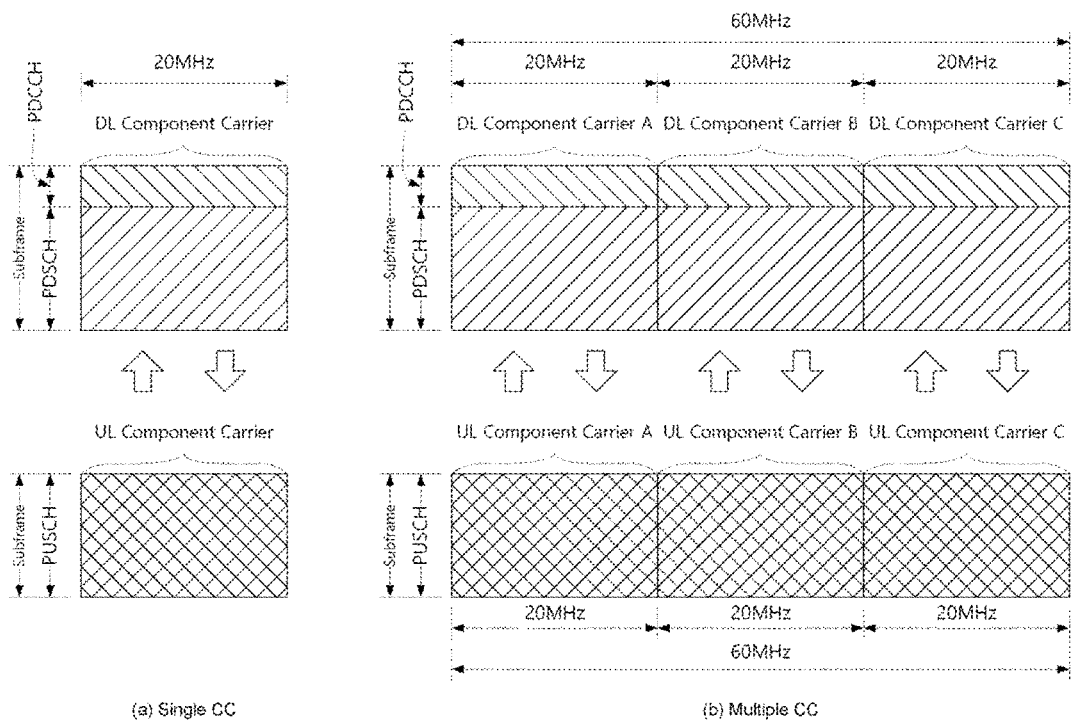
FIG. 9 is a diagram for describing single carrier communication and multicarrier communication.

FIG. 9 is a diagram for explaining single carrier communication and multi-carrier communication. Particularly, FIG. 7(a) shows a single carrier subframe structure and FIG. 7(b) shows a multi-carrier subframe structure.

Referring to FIG. 9(a), a general wireless communication system performs data transmission or reception (in a frequency division duplex (FDD) mode) through one DL band and one UL band corresponding thereto. In another specific embodiment, a wireless communication system may divide a wireless frame into a UL time unit and a DL time unit in a time domain, and perform data transmission or reception (in a time division duplex (TDD) mode) through the UL/DL time unit. Referring to FIG. 9(b), three 20 MHz CCs may be aggregated into UL and DL, respectively, so that a bandwidth of 60 MHz may be supported. Each CC may be adjacent or non-adjacent to one another in the frequency domain. FIG. 9(b) shows a case where the bandwidth of the UL CC and the bandwidth of the DL CC are the same and symmetric, but the bandwidth of each CC may be determined independently. In addition, asymmetric carrier aggregation with different number of UL CCs and DL CCs is possible. A DL/UL CC that is limited to a specific user equipment through RRC may be referred to as a configured serving UL/DL CC at a specific user equipment.

The base station may be used to communicate with the user equipment by activating some or all of the serving CCs configured in the user equipment, or by deactivating some CCs. The base station can change the CC to be activated/deactivated, and change the number of CCs to be activated/deactivated. If the base station allocates a CC available for the user equipment to a cell-specific or UE-specific, then at least one of the allocated CCs is deactivated, unless the CC allocation for the user equipment is completely reconfigured or the user equipment is handover. One CC that is not deactivated by the user equipment is called a Primary CC (PCC), and a CC that the base station can freely activate/deactivate is called a Secondary CC (SCC). PCC and SCC may be distinguished based on control information. For example, specific control information may be set to be transmitted and received only through a specific CC, and this specific CC may be referred to as PCC and the remaining CC(s) may be referred to as SCC(s).

Meanwhile, 3GPP NR uses the concept of a cell to manage radio resources. A cell is defined by a combination of DL resources and UL resources, that is, a combination of DL CC and UL CC. A cell may be configured with DL resources alone, or a combination of DL resources and UL resources. If carrier aggregation is supported, the linkage between the carrier frequency of the DL resource (or DL CC) and the carrier frequency of the UL resource (or UL CC) may be indicated by system information. In the case of user equipments that are in the RRC_CONNECTED state but not configured for carrier aggregation or that do not support carrier aggregation, there is only one serving cell configured with PCell.

As mentioned above, the term "cell" used in carrier aggregation is distinguished from the term "cell" which refers to a certain geographical area in which a communication service is provided by one base station or one antenna group. In order to distinguish between a cell referring to a certain geographical area and a cell of carrier aggregation, in the present invention, a cell of a carrier aggregation is referred to as a CC, and a cell of a geographical area is referred to as a cell.

Figure 10:
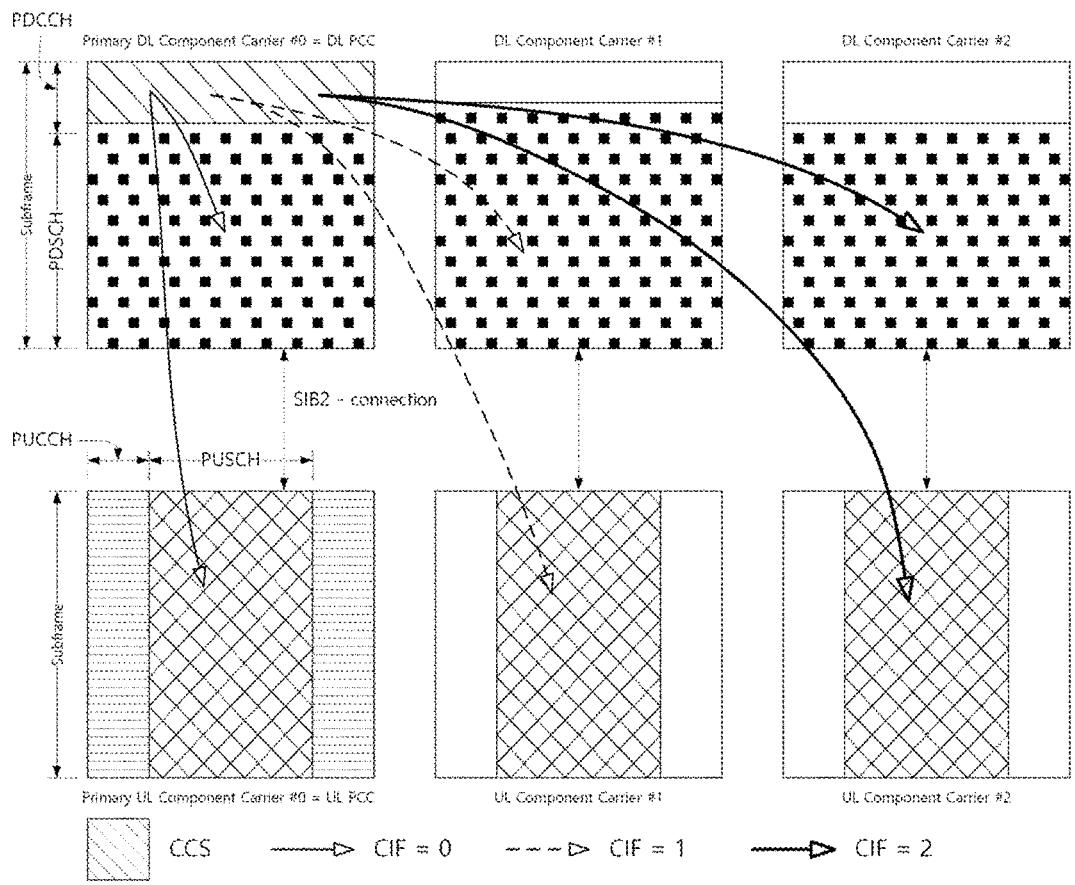
FIG. 10 is a diagram illustrating an example in which a cross carrier scheduling technique is applied.

FIG. 10 is a diagram showing an example in which a cross carrier scheduling technique is applied. In particular, in FIG. 10, the number of allocated cells (or component carriers) is 3, and cross carrier scheduling technique is performed using CIF as described above. Here, it is assumed that the DL cell #0 is a DL primary component carrier (i.e., Primary Cell (PCell)), and it is assumed that the remaining component carriers #1 and #2 are secondary component carriers (i.e., Secondary Cell (SCell)).

The present invention proposes a method of effectively managing UL resources for a primary component carrier (primary component carrier or primary cell or PCell) or a secondary component carrier (secondary component carrier or secondary cell or SCell) during a carrier aggregation operation of the user equipment. Hereinafter, the case where the user equipment operates by aggregating two component carriers is described, but it is obvious that the present invention can also be applied to the case of aggregating three or more component carriers.

FIGS. 9 to 10 exemplarily illustrate a subframe structure of a 3GPP LTE-A system, but the present invention may also be applied to a 3GPP NR system. In the 3GPP NR system, the subframes in FIGS. 9 to 10 may be replaced with slots.

Hereinafter, the present invention will be described. In order to facilitate understanding of the description, each content is described by separate embodiments, but each embodiment may be used in combination with each other.

Embodiment 1: Slot Configuration and Signaling for the Same

Figures 11, 12:
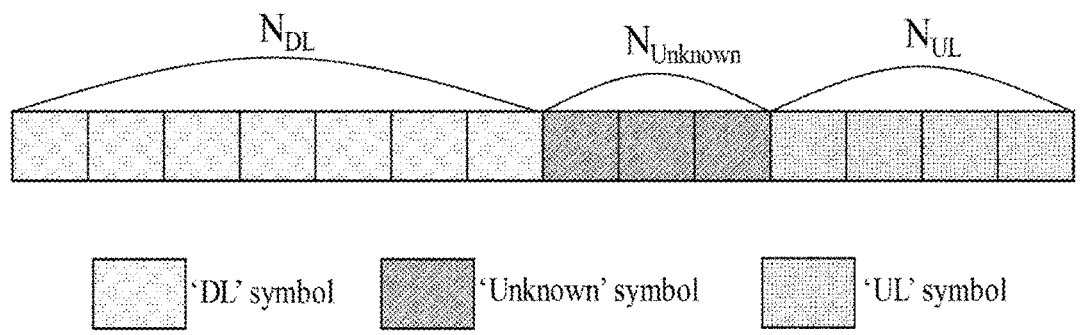
FIG. 11 is a diagram illustrating a slot configuration possible in a time division multiple access.
FIG. 12 is a diagram illustrating a slot configuration possible in a time division multiple access.

FIGS. 11 to 12 illustrate an example of a slot configuration in a mobile communication system using TDD.

In the 3GPP NR system, the base station can flexibly change the configuration of the slot according to the traffic of users, and configure the UE with information on the configuration of the slot (simply, slot-format information (SFI)) through an RRC signal or indicate it through an Layer 1 (L1) (e.g., PDCCH) signal. Herein, the information on the configuration of the slot indicates configuration information about symbols in a slot. In this case, the symbol means an OFDM symbol, and the OFDM symbol includes a CP-OFDM symbol or a DFT-s-OFDM symbol (or an SC-FDM (A) symbol). Referring to FIGS. 11 to 12, each symbol in the slot may be configured to one of a downlink (DL) symbol, an uplink (UL) symbol, and an Unknown symbol. In this case, the Unknown symbol means a symbol that is neither a DL symbol nor a UL symbol, and the usage, transmission direction, or symbol type (e.g., DL, UL, and X) thereof can be changed (where X represents Unknown). For example, the Unknown symbol is a symbol that is neither a DL symbol nor an UL symbol, and may be changed into a DL symbol, an UL symbol, or an Unknown symbol. Some/all of the Unknown symbols in the slot may be used as a gap for DL-UL switching, or may be used for purposes other than the gap. The Unknown symbol may also be represented as a Flexible symbol, and in this specification, the Flexible symbol and the Unknown symbol are mixed with each other.

Referring to FIG. 11, a slot may include a plurality of symbols, and each symbol may be a DL symbol, an Unknown symbol, or an UL symbol. The slot may include 14 symbols as shown in FIG. 2, but the number of symbols is assumed to be 7 for convenience of description. The Unknown in FIG. 11 may be understood as a symbol for guaranteeing a DL-UL switching gap. In the case of FIG. 11, 8 slot formats may be defined. Slot configuration 0 consists of all downlink OFDM symbols. Slot configuration 1 consists of 6 downlink symbols and 1 Unknown symbol. Slot configuration 2 consists of 5 downlink symbols, 1 Unknown symbol, and 1 uplink symbol. Slot configuration 3 consists of 4 downlink symbols, 1 Unknown symbol, and 2 uplink symbols. Slot configuration 4 consists of 3 downlink symbols, 1 Unknown symbol, and 3 uplink symbols. Slot configuration 5 consists of 2 downlink symbols, 1 Unknown symbol, and 4 uplink symbols. Slot configuration 6 consists of 1 downlink symbol, 1 Unknown symbol, and 5 uplink symbols. Slot configuration 7 consists of 7 uplink symbols. In the present invention, for convenience of description, the slot configuration 0 is referred to as a DL-only slot and the slot configuration 7 is referred to as a UL-only slot. The slot structure of FIG. 11 may be extended to a slot consisting of 12 or 14 OFDM symbols. In addition, in the slot structure of FIG. 11, one slot may include one or more Unknown symbols.

Hereinafter, based on the slot structure of FIG. 12, a method that a base station indicates configuration information of a slot to a UE will be described.

As the first method of informing the UE of configuration information of a slot, the base station may inform the UE of semi-static DL/UL allocation information. In this case, the semi-static DL/UL allocation information includes information on the DL/UL configuration in the slot, which is referred to as semi-static slot-format information (semi-static SFI). The base station may transmit the semi-static DL/UL allocation information (or semi-static SFI) cell-specifically (e.g., transmit through system information block or cell-specific RRC information) or transmit it through UE-specific RRC signal. When the UE receives the semi-static DL/UL allocation information (or semi-static SFI), the UE can identify the slot configuration of the next slot(s). The semi-static SFI may include slot configuration information for a set of slots corresponding to a slot configuration period, and the slot configuration information may be repeatedly applied in units of set of slots. The semi-static DL/UL allocation information (or semi-static SFI) includes information about slot configuration, for example, whether each symbol in the slot is a downlink (hereinafter, DL) symbol, an uplink (hereinafter, UL) symbol, or an Unknown symbol that is neither the downlink symbol nor the uplink symbol. For reference, the UE may assume that a symbol for which semi-static DL/UL allocation information (or semi-static SFI) is not indicated is indicated as 'Unknown'.

According to an embodiment of the present invention, as a method of signaling semi-static DL/UL allocation information (or semi-static SFI), the number of DL symbols, i.e., $N_{DL}$ in each slot may be informed with an assumption by the base station and the UE that a configuration of one slot always has the order of DL symbol, Unknown symbol and UL symbol. The UE may identify the number of Unknown symbols, i.e., $N_{unknown}$ in the slot through other RRC signals. The UE may obtain the number of UL symbols in the slot as max (0, $N_{symbol}-N_{DL}-N_{unknown}$). Here, $N_{symbol}$ is the total number of symbols included in one slot, and max (x, y) is a function that returns a larger value between x and y. The number of Unknown symbols configured through the other RRC signals may be the same as the number of symbols corresponding to the GAP for DL-UL switching of the UE. For reference, if the number of bits required to indicate semi-static DL/UL allocation information (or semi-static SFI) of one slot in this manner is K, since a value $N_{DL}$ can have is one of 0, 1, ..., 14 when $N_{symbol}=14$, it may be satisfied that K=4.

According to an embodiment of the present invention, as another method of signaling semi-static DL/UL allocation information (or semi-static SFI), the number of DL symbols, i.e., $N_{DL}$ and the number of Unknown symbols, i.e., $N_{unknown}$ in each slot may be informed with an assumption by the base station and the UE that a configuration of one slot always has the order of DL symbol, Unknown symbol and UL symbol. The UE may obtain the number of UL symbols in the slot as max (0, $N_{symbol}-N_{DL}-N_{unknown}$). Here, $N_{symbol}$ is the total number of symbols included in one slot, and max (x, y) is a function that returns a larger value between x and y. Assuming that the base station uses two $N_{Unknown}$ values, if the number of bits required to indicate semi-static DL/UL allocation information (or semi-static SFI) of one slot in this manner is K, since 4 bits are required to indicate $N_{DL}$ which can have a value among 0, 1, ..., 14 when $N_{symbol}=14$ and 1 bit is required to indicate two $N_{Unknown}$ values, it may be satisfied that K=5.

According to an embodiment of the present invention, as yet another method of signaling semi-static DL/UL allocation information (or semi-static SFI), the number of DL symbols, i.e., $N_{DL}$ and the number of UL symbols, i.e., $N_{UL}$ in each slot may be informed with an assumption by the base station and the UE that a configuration of one slot always has the order of DL symbol, Unknown symbol and UL symbol. The UE may obtain the number of Unknown symbols in the slot as max (0, $N_{symbol}-N_{DL}-N_{UL}$). Here, $N_{symbol}$ is the total number of symbols included in one slot, and max (x, y) is a function that returns a larger value between x and y. If the number of bits required to indicate semi-static DL/UL allocation information (or semi-static SFI) of one slot in this manner is K, assuming that the base station uses a value one of 0, 1, . . . , 14 as $N_{DL}$ and a value one of 0, 1, . . . , 14 as $N_{UL}$ when $N_{symbol}=14$, then it may be satisfied that K=8.

As still another method of signaling semi-static DL/UL allocation information (or semi-static SFI), X and Y which correspond to the number of DL symbols and the number of UL symbols may be informed with an assumption by the base station and the UE that a configuration of one slot always has the order of DL symbol, Unknown symbol and UL symbol. In addition, 1 bit may indicate either a UL-centric slot format or a DL-centric slot format. Here, the range of values of X may be greater than the range of values of Y. For example, X may have a value of $X_{min} \sim N_{symbol}$, and Y may have a limited value such as $0 \sim Y_{max}$. In this case, $X_{min}$ is a number greater than or equal to 0 and less than or equal to $N_{symbol}$. Preferably, $X_{min}=7$. Here, $Y_{max}$ may be greater than or equal to 0 and less than or equal to $X_{min}$. Preferably $Y_{max}=7$. If the additional 1 bit indicate a DL-centric slot, then $N_{DL}=X$ and $N_{UL}=Y$. If the additional 1 bit indicates a UL-centric slot, then $N_{DL}=Y$ and $N_{UL}=X$. The UE may obtain the number of Unknown symbols in the slot as max (0, $N_{symbol}$ $N_{DL}-N_{UL}$). Here, $N_{symbol}$ is the total number of symbols included in one slot, and max (x, y) is a function that returns a larger value of x and y. If the number of bits required to indicate semi-static DL/UL allocation information (or semi-static SFI) of one slot in this manner is K, assuming that X=7, 8, 9, 10, 11, 12, 13, 14 and Y=0, 1, 2, 3, 4, 5, 6, 7 when $N_{symbol}=14$, since 3 bits are required for each case and 1 bit is required to indicate to determine whether it is DL-centric or UL-centric, it may be satisfied that K=7.

According to an embodiment of the present invention, as yet still another method for signaling semi-static DL/UL allocation information (or semi-static SFI), the starting time and the length of symbols occupied by Unknown symbols in a slot may be informed with an assumption by the base station and the UE that a configuration of one slot always has the order of DL symbol, Unknown symbol and UL symbol. Specifically, it can be assumed that the number of symbols in the slot is $N_{symbol}$, and $N_{start}$ is the position of the OFDM symbol where the Unknown symbol starts within the slot, and $L_{symbols}$ is the number of consecutively assigned Unknown symbols. In addition, it is assumed that the position of the OFDM symbol starts from 0. A symbol indication value (SIV) for indicating information to which an Unknown symbol is allocated in one slot may be determined as follows.

If $(L_{symbols}-1) \leq \text{floor}(N_{symbol}/2)$ $SIV=N_{symbol}*(L_{symbols}-1)+N_{start}$ else $SIV=N_{symbol}*(N_{symbol}-L_{symbols}+1)+(N_{symbol}-1-N_{start})$ where $L_{symbols} \geq 1$ and shall not exceed $N_{symbol}-N_{start}$   [Equation 1]

Here, floor (x) is a function that returns the largest integer less than or equal to x. In addition, the SIV value may have a value between 0 and $N_{symbol}*(N_{symbol}+1)/2-1$. For example, if a slot has 14 symbols and all of them are Unknown symbols, $N_{start}=0$ and $L_{symbols}=14$, so SIV=27. If the Unknown symbols are located at OFDM symbols 4, 5 and 6, SIV=32 since $N_{start}=4$ and $L_{symbols}=3$. The SIV values between $0 \sim N_{symbol}*(N_{symbol}+1)/2-1$ assumes that there is at least one unknown symbol within one slot, and it cannot indicate a DL-only slot (i.e., a slot in which all symbols are DL symbols) and a UL-only slot (i.e., a slot in which all symbols are UL symbols).

On the other hand, by adding an additional value to the SIV value, it is possible to indicate that one slot is composed of all DL symbols or all UL symbols. For example, $SIV=N_{symbol}*(N_{symbol}+1)/2$ can be indicated to indicate a slot consisting of all DL symbols, and $SIV=N_{symbol}*(N_{symbol}+1)/2+1$ can be indicated to indicate a slot consisting of all UL symbols. As another example, $SIV=N_{symbol}*(N_{symbol}+1)/2$ can be indicated to indicate a slot consisting of all UL symbols, and $SIV=N_{symbol}*(N_{symbol}+1)/2+1$ can be indicated to indicate a slot consisting of all DL symbols. In this scheme, the SIV ranges from 0 to $N_{symbol}*(N_{symbol}+1)/2+1$. Thus, the required number of bits is ceil ($\log_2 (N_{symbol}*(N_{symbol}+1)/2+2)$) bits. Here, ceil (x) is a function that returns the smallest integer greater than or equal to x. Therefore, if $N_{symbol}=14$, then 7 bits are required.

Meanwhile, some of the SIV values between 0 and $N_{symbol}*(N_{symbol}+1)/2-1$ may be interpreted to indicate that one slot is composed of all DL symbols or all UL symbols. For example, an SIV value indicating that the first OFDM symbol of a slot is Unknown and all other symbols are UL may be interpreted as indicating a slot consisting of all UL symbols. In addition, an SIV value indicating that the last OFDM symbol of a slot is Unknown and all other symbols are DL may be interpreted as indicating a slot consisting of all DL symbols.

When the slot configuration is indicated by using the SIV scheme, a position of a symbol where Unknown can be located may be limited as a method for reducing the bits used for the SIV. For example, when there are total $N_{symbol}$ symbols in one slot, Unknown may be limited to be located only between OFDM symbol A and OFDM symbol B. Accordingly, the SIV scheme may indicate the start position and the length of the Unknown symbol within B−A+1 symbols between the OFDM symbol A and the OFDM symbol B. For example, when A=6 and B=11, the SIV value may be expressed from 0 to 20, and 5 bits are required.

When the slot configuration is indicated by using the SIV scheme, the granularity of a symbol occupied by Unknown may be limited as a method for reducing the bits used for the SIV. In the above description, the symbol occupied by Unknown was in units of one symbol. This can be increased in units of P symbols. The SIV may indicate the starting position and the consecutive number of P Unknown symbol groups. For example, if P=2, the number of bits required for SIV can be reduced to 5 bits.

As another method for signaling semi-static DL/UL allocation information (or semi-static SFI), the slot may be divided into two sub-slots, and the base station and the UE may assume that a configuration of one slot always has the order of DL symbol, Unknown symbol and UL symbol. The SIV scheme may be used as a method for indicating the configuration of each sub-slot. That is, it is possible to indicate the start and end positions of the Unknown symbols in each sub-slot. Specifically, it can be assumed that the number of symbols in a sub-slot is $N_{sub-symbol}$, and $N_{sub-start}$ is the position of the OFDM symbol where the Unknown symbol starts within the sub-slot, and $L_{sub-symbols}$ is the number of consecutively assigned OFDM symbols. In addition, it is assumed that the position of the OFDM symbol starts from 0. A value, SIV, for indicating information to which an Unknown symbol is allocated in one sub-slot may be determined as follows.

If $(L_{sub\text{-}symbols}-1) \leq \text{floor}(N_{sub\text{-}symbol}/2)$ $$SIV = N_{sub\text{-}symbol} * (L_{sub\text{-}symbols}-1) + N_{sub\text{-}start}$$

else $$SIV = N_{sub\text{-}symbol} * (N_{sub\text{-}symbol} - L_{sub\text{-}symbols} + 1) + (N_{sub\text{-}symbol} - 1 - N_{sub\text{-}start})$$

where $L_{sub\text{-}symbols} \geq 1$ and shall not exceed $N_{sub\text{-}symbol} - N_{sub\text{-}start}$. [Equation 2]

Here, the SIV value may have a value between 0 and $N_{sub\text{-}symbol} * (N_{sub\text{-}symbol}+1)/2-1$. The SIV values between 0 and $N_{sub\text{-}symbol} * (N_{sub\text{-}symbol}+1)/2-1$ assume that there is at least one unknown symbol within one sub-slot.

On the other hand, by adding an additional value to the SIV value, it is possible to indicate that one sub-slot is composed of all DL symbols or all UL symbols. For example, $SIV = N_{sub\text{-}symbol} * (N_{sub\text{-}symbol}+1)/2$ can be indicated to indicate a sub-slot consisting of all DL symbols, and $SIV = N_{sub\text{-}symbol} * (N_{sub\text{-}symbol}+1)/2+1$ can be indicated to indicate a sub-slot consisting of all UL symbols. As another example, $SIV = N_{sub\text{-}symbol} * (N_{sub\text{-}symbol}+1)/2$ can be indicated to indicate a sub-slot consisting of all UL symbols, and $SIV = N_{sub\text{-}symbol} * (N_{sub\text{-}symbol}+1)/2+1$ can be indicated to indicate a sub-slot consisting of all DL symbols. Therefore, the number of bits required to indicate the format of the sub-slot is $N_{sub\text{-}symbol} * \text{ceil}(\log_2(N_{sub\text{-}symbol} * (N_{sub\text{-}symbol}+1)/2+2))$ bits. Here, ceil (x) is a function that returns the smallest integer greater than or equal to x. Thus, if $N_{symbol}=14$ and $N_{sub\text{-}symbol}=7$, then 5 bits per sub-slot are required and 10 bits are required for one slot.

Meanwhile, some of the SIV values between 0 and $N_{sub\text{-}symbol} * (N_{sub\text{-}symbol}+1)/2-1$ may be interpreted to indicate that one sub-slot is composed of all DL symbols or all UL symbols. For example, an SIV value indicating that the first OFDM symbol of a sub-slot is Unknown and all other symbols are UL may be interpreted as indicating a sub-slot consisting of all UL symbols. In addition, an SIV value indicating that the last OFDM symbol of a sub-slot is Unknown and all other symbols are DL may be interpreted as indicating a sub-slot consisting of all DL symbols.

When one slot is composed of two sub-slots, slot configuration information of one slot may be represented and transmitted as configuration information of two sub-slots. That is, if SIV representing configuration information of the first sub-slot is referred to as SIV1 and SIV representing configuration information of the second sub-slot is referred to as SIV2, the UE may identify configuration information of all slots through SIV1 and SIV2. For reference, SIV1 and SIV2 may be jointly encoded and transmitted. As an example of joint encoding, slot configuration information may be expressed in the form of $SIV_{joint\text{-}encoding} = SIV1 * Q + SIV2$. In this case, Q may be one greater than the largest one of the valid SIV2 values. The UE may obtain SIV2 through the remainder of dividing $SIV_{joint\text{-}encoding}$ by Q, and obtain SIV1 through $(SIV_{joint\text{-}encoding} - SIV2)/Q$.

In the above description, SIV indicates the start and end symbols of the Unknown symbols. In the same manner, the last DL symbol and the first UL symbol in a slot may be indicated by the SIV scheme.

As the second method of informing the UE of configuration information of a slot, SFI which is information on whether the symbols in a slot are downlink (DL) symbols, uplink (UL) symbols, or an Unknown symbols that is neither the downlink symbol nor the uplink symbol may be delivered through the GC-PDCCH. In this case, the GC-PDCCH with SFI may be scrambled with a new GC-RNTI to distinguish it from the existing GC-PDCCH. For convenience, this is referred to as SFI-RNTI. Hereinafter, the SFI transmitted through the GC-PDCCH is referred to as Dynamic SFI from GC-PDCCH or SFI_GC-PDCCH.

Figure 13:
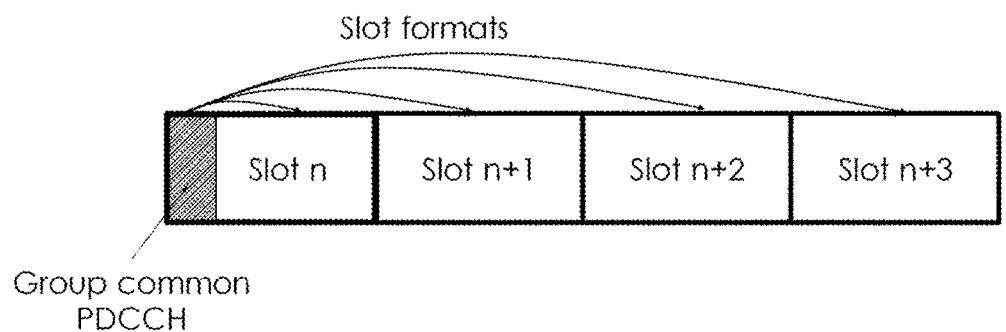
FIG. 13 illustrates indicating multiple slot configuration through a group common (GC) PDCCH in a time division multiple access.

Referring to FIG. 13, the base station may change the slot configuration (or slot format) using the L1 signal, and may transmit information on the changed slot configuration (i.e., dynamic SFI) to the UE through the GC-PDCCH. The UE may receive the slot configuration information from the GC-PDCCH, and may transmit and receive wireless signals according to the slot configuration information. The slot configuration information may carry information about the configuration of the current slot in which the SFI_GC-PDCCH is detected. In addition, the slot configuration information may transmit not only the configuration of the current slot in which the SFI_GC-PDCCH is detected, but also information on the configuration of the next slot(s) at once. Further, the slot configuration information may transmit information on how many next slots have the same configuration with the configuration of the current slot, or may deliver configuration information of the current slot and the next slot.

In order to inform the UE of the slot format through the SFI_GC-PDCCH, the base station may inform the UE of slot formats that can be indicated by the SFI_GC-PDCCH in advance. In this case, the slot formats that can be indicated by the SFI_GC-PDCCH may be provided to the UE using a UE-specific RRC signal. In other words, the mapping table of slot formats for the UE to receive the SFI_GC-PDCCH to identify the slot format may be configured in advance by the UE-specific RRC signal. As a method of informing the UE of the slot formats that can be indicated by the SFI_GC-PDCCH through the UE-specific RRC signal, whether the symbol is a DL symbol, a UL symbol, or an Unknown symbol may be indicated for each symbol. Alternatively, the SIV scheme indicating the slot configuration information in the semi-static DL/UL allocation (or semi-static SFI) scheme described above may be used. In another manner, as a method of information the UE of the slot formats that can be indicated by the SFI_GC-PDCCH through the UE-specific RRC signal, DL/UL may be indicated for symbols indicated as Unknown in the semi-static DL/UL allocation (or semi-static SFI). For example, if five 'Unknown' symbols are indicated in the semi-static DL/UL allocation (or semi-static SFI), the SFI_GC-PDCCH may indicate DL, UL or 'Unknown' for the five 'Unknown' symbols. In addition, the slot format of the SFI_GC-PDCCH may be pre-defined between the base station and the UE.

Table 3 exemplifies an SFI_GC-PDCCH that the base station can indicate to the UE. In Table 3, D denotes a DL symbol, U denotes a UL symbol, and X denotes an Unknown symbol. As shown in Table 3, a maximum of two DL/UL switching may be allowed in one slot.

TABLE 3

| index | \multicolumn{14}{c}{Symbol number in a slot} |
| --- | --- | --- | --- | --- | --- | --- | --- | --- | --- | --- | --- | --- | --- | --- |
|  | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | X | U | D | D | D | D | D | X | U | U |
| 47 | D | D | X | U | U | U | U | D | X | U | U | U | U | U |
| 48 | D | X | U | U | U | U | U | D | X | U | U | U | U | U |
| 49 | D | D | D | D | X | X | U | D | D | D | D | X | X | U |
| 50 | D | D | X | X | U | U | U | D | D | X | X | U | U | U |
| 51 | D | X | X | U | U | U | U | D | X | X | U | U | U | U |
| 52 | D | X | X | X | X | X | U | D | X | X | X | X | X | U |
| 53 | D | D | X | X | X | X | U | D | D | X | X | X | X | U |
| 54 | X | X | X | X | X | X | X | D | D | D | D | D | D | D |
| 55 | D | D | X | X | X | U | U | U | D | D | D | D | D | D |
| 56~255 | \multicolumn{14}{c}{Reserved} |

SFI_GC-PDCCH may include information on a slot configuration of one or more slots.

When the SFI_GC-PDCCH includes one slot configuration, the SFI_GC-PDCCH may include/indicate 'Slot_index_offset' and 'Slot_format_index'. If the SFI_GC-PDCCH indicates Slot_index_offset=k and Slot_format_index=i, the UE may interpret the SFI_GC-PDCCH as follows. If the SFI_GC-PDCCH is received in slot n, then slot n+k follows slot format i. Here, the slot format i means the i-th slot format of a plurality of slot formats previously designated by the RRC signal. 'Slot_index_offset' may not be indicated by the SFI_GC-PDCCH and may be configured in advance in the RRC layer. The UE may use the 'slot_index_offset' value configured in advance by the RRC layer to interpret the SFI_GC-PDCCH.

When the UE indicates the plurality of slot configuration information, the SFI_GC-PDCCH may include/indicate 'Slot_numbers' and one 'Slot_format_index'. If the SFI_GC-PDCCH indicates Slot_numbers=k and Slot_format_index=i, the UE may interpret the SFI_GC-PDCCH as follows. If the SFI_GC-PDCCH is received in slot n, then k slots from slot n follow slot format i. Here, the slot format i means the i-th slot format of a plurality of slot formats previously designated by the i-th slot format of Table 3 or the RRC signal.

When the UE indicates the plurality of slot configuration information, the SFI_GC-PDCCH may include/indicate a plurality of 'Slot_format_index's. If the SFI_GC-PDCCH indicates values corresponding to Slot_format_index $[i_1, i_2, \ldots, i_j]$, the UE may interpret the SFI_GC-PDCCH as follows. If the SFI_GC-PDCCH is received in slot n, then slots from slot n to slot n+k−1 follow slot format $i_1$, slot format $i_2, \ldots$, and slot format $i_j$ sequentially. Here, the slot formats $i_1, \ldots, i_j$ mean $i_1$-th, $\ldots, i_j$-th slot formats of Table 3 or $i_1$-th, $\ldots, i_j$-th slot formats among a plurality of slot formats previously designated by the RRC signal.

When the UE indicates the plurality of slot configuration information, the SFI_GC-PDCCH may include/indicate 'Slot_numbers' and a plurality of 'Slot_format_index's. If the SFI_GC-PDCCH indicates Slot_numbers=k, and values corresponding to Slot_format_index $[i_1, i_2, \ldots, i_j]$, the UE may interpret the SFI_GC-PDCCH as follows. If the SFI_GC-PDCCH is received in slot n, then [slot format $i_1$, slot format $i_2, \ldots$, slot format $i_j$] is repeated k times from slot n to slot n+j*k−1. In another interpretation, when j is a divisor of k, [slot format $i_1$, slot format $i_2, \ldots$, slot format $i_j$] is repeated k/j times from slot n to slot n+k−1. Here, the slot formats $i_j$ mean $i_1$-th, $\ldots, i_j$-th slot formats of Table 3 or $i_1$-th, $\ldots, i_j$-th slot formats among a plurality of slot formats previously designated by the RRC signal.

When the UE indicates the plurality of slot configuration information, the SFI_GC-PDCCH may include/indicate 'Slot_numbers' and a plurality of 'Slot_format_index'. If the SFI_GC-PDCCH indicates Slot_numbers=k and Slot_format_index=$[i_1, i_2, \ldots, i_j]$, the UE may interpret the SFI_GC-PDCCH as follows. If the SFI_GC-PDCCH is received in slot n, then slot n through slot n+k−1 follow slot format $i_1$, slot n+k through slot n+2*k−1 follow slot format $i_2, \ldots$, slot n+(j−1)*k through slot n+j*k−1 follow slot format $i_1$. In another interpretation, when j is a divisor of k, slot n through slot n+k/j−1 follow slot format $i_1$, slot n+k/j through slot n+2*k/j−1 follow slot format $i_2, \ldots$, slot n+(j−1)*k/j through slot n+k−1 follow slot format Here, the slot formats $i_1, \ldots, i_j$ mean $i_1$-th, $\ldots, i_j$-th slot formats of Table 3 or $i_1$-th, $\ldots, i_j$-th slot formats among a plurality of slot formats previously designated by the RRC signal.

When the UE indicates the plurality of slot configuration information, the SFI_GC-PDCCH may include/indicate a plurality of 'Slot_format_index' and a plurality of 'Applied_slot_format_index'. If the SFI_GC-PDCCH indicates Slot_format_index=$[i_1, i_2, \ldots, i_j]$ and Applied_slot_format_index=$[a(1), a(2), \ldots, a(j)]$, the UE may interpret the SFI_GC-PDCCH as follows. If the SFI_GC-PDCCH is received in slot n, then slot n follows slot format $i_{a(1)}$, slot n+1 follows slot format $i_{a(2)}, \ldots$, slot n+k−1 follows slot format $i_{a(k)}$. Here, $a(1), \ldots, a(k)$ may have a value one of $1, \ldots, j$. Here, the slot formats $i_1, \ldots, i_j$ mean $i_1$-th, $\ldots, i_j$-th slot formats of Table 3 or $i_1$-th, $\ldots, i_j$-th slot formats among a plurality of slot formats previously designated by the RRC signal.

When the UE indicates the plurality of slot configuration information, the SFI_GC-PDCCH may include/indicate a plurality of 'Slot_format_index' and a plurality of 'Applied_slot_index'. If the SFI_GC-PDCCH indicates Slot_format_index=$[i_1, i_2, \ldots, i_j]$ and Applied_slot_index=$[b(1), b(2) \ldots, b(j)]$, the UE may interpret the SFI_GC-PDCCH as follows. If the SFI_GC-PDCCH is received in slot n, then slot n+b(1) follows slot format $i_1$, slot n+b(2) follows slot format $i_2, \ldots$, slot n+b(j) follows slot format Here, b(1), $\ldots$, b(j) are sequentially increased and each has a non-negative integer value. That is, $b(1)<b(2)<\ldots<b(j)$. In addition, the slot formats $i_1, \ldots, i_j$ mean $i_1$-th, $\ldots, i_j$-th slot formats of Table 3 or $i_1$-th, $\ldots, i_j$-th slot formats among a plurality of slot formats previously designated by the RRC signal.

When the UE indicates the plurality of slot configuration information, the SFI_GC-PDCCH may include/indicate a plurality of 'Slot_format_index' and a plurality of 'Applied_slot_index'. If the SFI_GC-PDCCH indicates Slot_format_index=$[i_1, i_2, \ldots, i_j]$ and Applied_slot_index=$[b(1), b(2), \ldots, b(j)]$, the UE may interpret the SFI_GC-PDCCH as follows. If the SFI_GC-PDCC is received in slot n, then slot n+b(1) follows slot format $i_1$, slot n+b(1)+b(2) follows slot format $i_2, \ldots$, slot n+b(1)+b(2)+ $\ldots$ +b(j) follows slot format $i_j$. Here, each of $b(1), \ldots, b(k)$ has one of non-negative integer values. In another interpretation, if the SFI_GC-PDCC is received in slot n, then slot n−1+b(1) follows slot format $i_1$, slot n−1+b(1)+b(2) follows slot format $i_2, \ldots$, slot n−1+b(1)+b(2)+ $\ldots$ +b(j) follows slot format Here, each of b(1), $\ldots$, b(k) has a natural value. The slot formats $i_1, \ldots i_j$ mean $i_1$-th, $i_j$-th slot formats of Table 3 or $i_1$-th, $\ldots, i_j$-th slot formats among a plurality of slot formats previously designated by the RRC signal.

In the above method, Slot_numbers may be indicated by the RRC signal and may not be included in the SFI_GC-PDCCH. In this case, when the UE receives the SFI_GC-PDCCH, the UE may identify the slot configuration information using 'Slot_numbers' obtained through the RRC signal. Alternatively, Slot_numbers may be determined according to the period in which the SFI_GC-PDCCH is transmitted. For example, if the UE monitors the GC-PDCCH through which the Dynamic SFI is transmitted every 4 slots, Slot_numbers may be 4 slots.

The above methods can be described by replacing the slot with a slot including at least one unknown symbol configured in the semi-static SFI. In other words, the slot formats indicated by the SFI_GC-PDCCH may be sequentially applied to slots including at least one unknown symbol configured in the semi-static SFI.

As the third method of informing the UE of configuration information of the slot, the configuration of the scheduled slot can be identified using the DCI of the US-PDCCH. For example, if the DCI includes DL signal or channel (e.g., PDSCH or CSI-RS) scheduling information, the UE may assume that the symbols for which the DL signal or channel is scheduled in the slot are DL symbols. Although not limited thereto, the DCI may include information on the start position and a length of the PDSCH. In addition, when the DCI includes UL signal or channel (e.g., PUSCH or SRS) scheduling information, the UE may assume that symbols for which the UL signal or channel is scheduled in the slot are UL symbols. Although not limited thereto, the DCI may include information on the start position and the length of the PUSCH. The (DL/UL grant) DCI may be a DCI scrambled with C-RNTI. Hereinafter, the slot configuration information transmitted through the US-PDCCH is referred to as Dynamic SFI from US-PDCCH or SFI_US-PDCCH. The SFI_US-PDCCH may provide configuration information for the OFDM symbol(s) scheduled in the slot. In the present specification, a signal and a channel may be described separately to help the understanding of the present invention, but the signal generally includes a signal transmitted through a channel, and a signal/channel may be collectively referred to as a signal.

Figure 14:
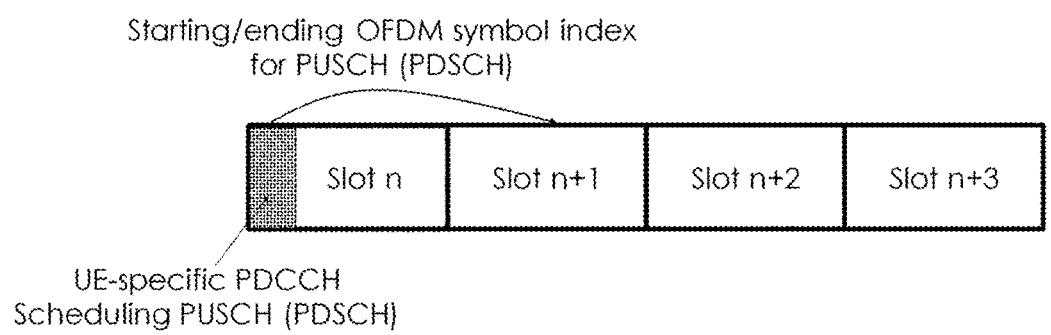
FIG. 14 is a block diagram illustrating a configuration of slots scheduling in a UE-specific PDCCH carrying scheduling information in a time division multiple access.

Referring to FIG. 14, the base station may indicate the start OFDM symbol index and the end OFDM symbol index of the PDSCH or information capable of indicating the above information in the SFI_US-PDCCH carrying downlink scheduling information. When the UE successfully receives the SFI_US-PDCCH, the UE may identify the start OFDM symbol index and the end OFDM symbol index of the PDSCH or information capable of indicating the above information, and may receive the PDSCH by rate-matching according to the scheduling information. Referring to FIG. 14, a slot in which a PDSCH for a UE is scheduled may be slot n, which is the same slot as an SFI_US-PDCCH transmission slot. In addition, the slot in which the PDSCH for the UE is scheduled may be the n+k-th (where k is an integer greater than or equal to 1) slot after the SFI_US-PDCCH is transmitted, or slots from the n-th slot in which the SFI_US-PDCCH is transmitted up to the n+L−1-th slot (where L denotes the number of slots in which PDSCH allocated to the UE is transmitted when assuming slot aggregation). The index of the slot in which the PDSCH for the UE is scheduled may be transmitted in the SFI_US-PDCCH scheduling the PDSCH. Accordingly, the UE may assume that the symbol to which the PDSCH is allocated is a DL symbol.

Referring to FIG. 14, the base station may indicate the start OFDM symbol index and the end OFDM symbol index of the PUSCH or information capable of indicating the above information in the SFI_US-PDCCH carrying uplink scheduling information. When the UE successfully receives the SFI_US-PDCCH, the UE may identify the start OFDM symbol index and the end OFDM symbol index of the PUSCH or information capable of indicating the above information, and may receive the PUSCH by rate-matching according to the scheduling information. Referring to FIG. 14, a slot in which a PUSCH for a UE is scheduled may be slot n, which is the same slot as a slot in which SFI_US-PDCCH is transmitted. In addition, the slot in which the PUSCH for the UE is scheduled may be the n+k-th (where k is an integer greater than or equal to 1) slot after the SFI_US-PDCCH is transmitted, or slots from the n+k-th (where k is an integer greater than 0) slot in which the SFI_US-PDCCH is transmitted up to n+k+L−1 (where L denotes the number of slots in which PUSCH allocated to the UE is transmitted when assuming slot aggregation). The index of the slot in which the PUSCH for the UE is scheduled may be transmitted in the SFI_US-PDCCH scheduling the PUSCH. Therefore, the UE may assume that the symbol to which the PUSCH is allocated is a UL symbol.

As another example, the base station may transmit a part of the slot configuration information through the SFI_GC-PDCCH, and transmit the remaining part through the SFI_US-PDCCH carrying scheduling information. The UE may identify the slot format/configuration when the UE receives the SFI_GC-PDCCH and receives the SFI_US-PDCCH. Specifically, the configurable slot configuration indication information is divided into two steps and transmitted. In the first step (i.e., group common), a partial set of the entire configuration may be indicated, and a specific configuration in the set may be indicated in the second step. Referring to FIG. 11, the base station may bundle eight slot configurations two by two and transmit four slot configuration information through an SFI_GC-PDCCH, and may transmit one of the two slot configurations through an SFI_US-PDCCH. The UE may identify the entire slot configuration by using slot configuration information transmitted by bundle received in the SFI_GC-PDCCH and information indicating one of the two slot configurations received in the SFI_US-PDCCH. Through the above scheme, control overhead of transmitting slot configuration information through SFI_GC-PDCCH and SFI_US-PDCCH can be reduced.

The UE transmits an uplink signal earlier than a downlink signal due to a propagation delay. This is called as a timing advance (TA) and a value for the TA may be set through an RRC signal. Therefore, when the uplink symbol is placed immediately after the downlink symbol, the UE needs to simultaneously receive the downlink symbol and transmit the uplink symbol. In order to solve this problem, the UE needs a GAP symbol for DL-to-UL switching between the downlink symbol and the uplink symbol. The GAP symbol may be represented as an Unknown symbol. Therefore, if a slot is configured to the UE without an Unknown symbol between a DL symbol and un UL symbol, an Unknown symbol should be inserted into the slot.

Figure 15:
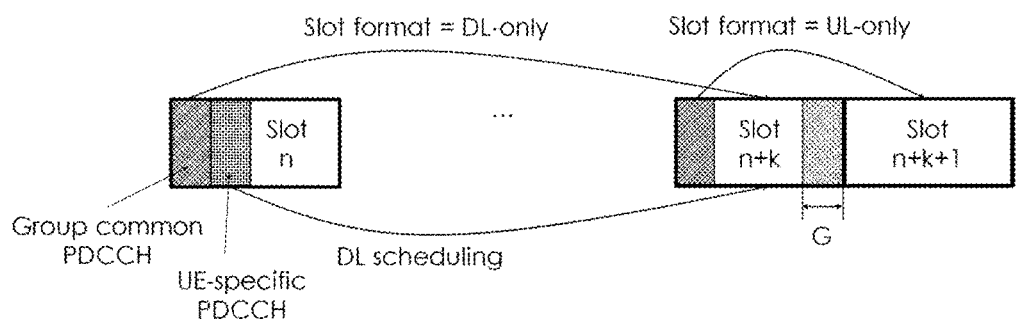
FIG. 15 illustrates that a user scheduled as DL-only according to an embodiment of the present invention identifies a slot configuration using a group common PDCCH of a scheduled slot in order to confirm whether the next slot is UL-only.
Figure 15:
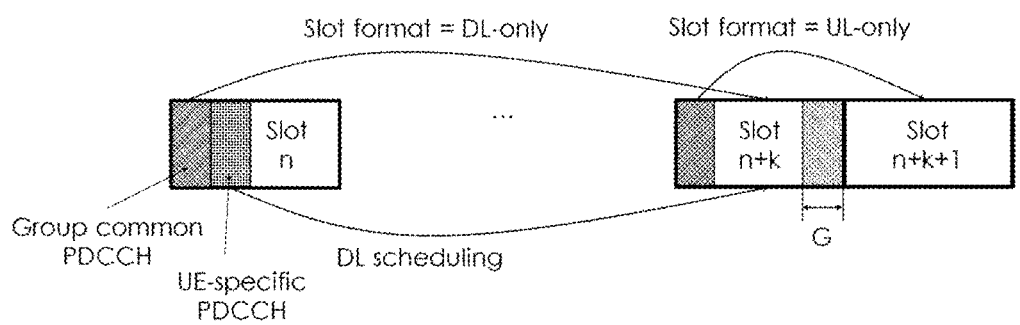
Figure 16:
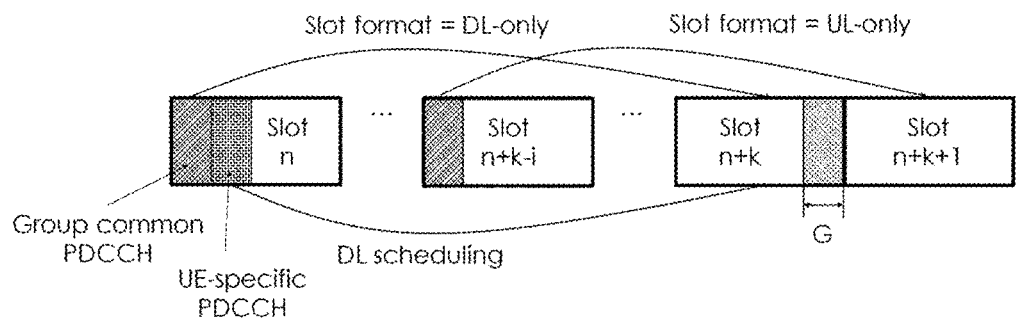
FIG. 16 illustrates that a user scheduled as DL-only according to an embodiment of the present invention identifies a slot configuration using a previous group common PDCCH closest to the scheduled slot in order to confirm whether the next slot is UL-only.

Referring to FIGS. 15 and 16, when a UE allocated with a DL-only slot (e.g., slot n+k) identifies that the next slot (e.g., slot n+k+1) is configured as a UL-only slot, the last G OFDM symbols of the DL-only slot may be punctured or not received. Here, G is a gap between the DL and the UL and may be a different value for each UE or cell, and may be a value previously known to the UE and the base station. G may be represented by the number of 01-DM symbols or a predetermined time interval.

Figure 17:
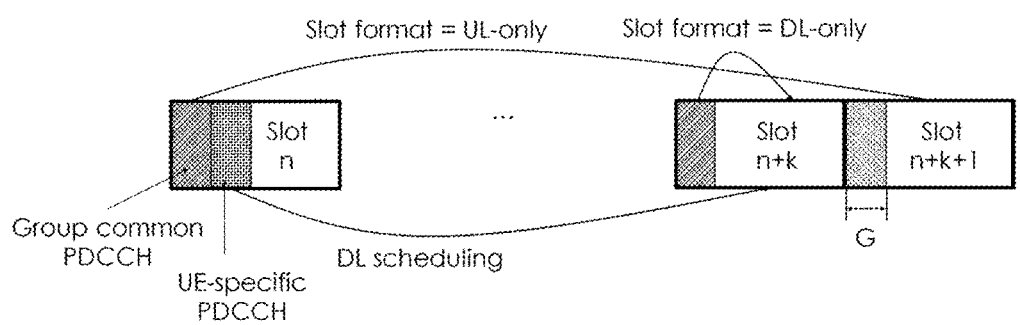
FIG. 17 illustrates that a user scheduled as UL-only according to an embodiment of the present invention identifies a slot configuration using a group common PDCCH of a previous slot of the scheduled slot in order to confirm whether the previous slot is DL-only.

Referring to FIG. 17, UL-only may be allocated to the UE as a configuration of a future slot (e.g., slot n+k+1) through a GC-PDCCH or a US-PDCCH containing scheduling information at a time point (e.g., slot n) of scheduling. Then, the GC-PDCCH may be transmitted/received in the slot (e.g., slot n+k) immediately before the allocated UL-only slot. In this case, the GC-PDCCH of the slot (e.g., slot n+k) immediately before the UL-only slot may indicate the slot configuration before the UL-only slot, and the UE may use the slot configuration information of the GC-PDCCH received in the slot (e.g., slot n+k) immediately before the UL-only slot in order to identify whether the slot (e.g., slot n+k) immediately before the UL-only slot is a DL-only slot.

Figure 18:
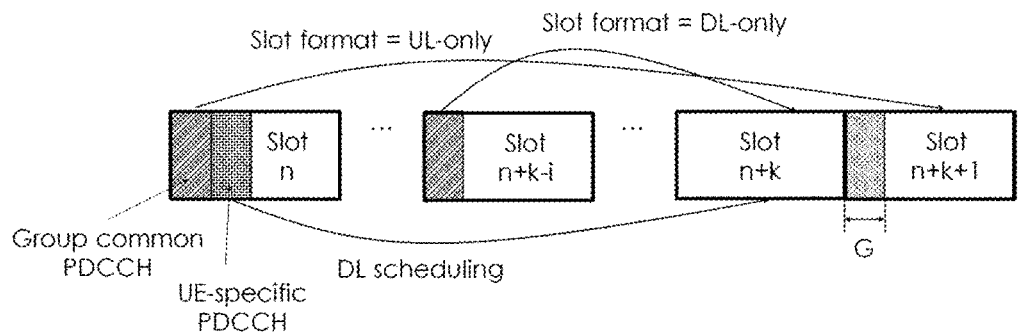
FIG. 18 illustrates that a user scheduled as UL-only according to an embodiment of the present invention identifies a slot configuration using a previous group common PDCCH closest to the scheduled slot in order to confirm whether the previous slot is DL-only.

Referring to FIG. 18, UL-only may be allocated to the UE as a configuration of a future slot (e.g., slot n+k+1) through a GC-PDCCH or a US-PDCCH containing scheduling information at a time point (e.g., slot n) of scheduling. Then, the GC-PDCCH may be transmitted/received in at least one (e.g., slot n+k$_j$) among the slots (e.g., slots n+k, n+k+1, . . . ) immediately before the allocated UL-only slot. In this case, the GC-PDCCH may indicate the slot configuration immediately before the UL-only slot (e.g., slot n+k), and the UE may use the slot configuration information of the GC-PDCCH received in the most adjacent slot before the UL-only slot in order to identify whether the slot (e.g., slot n+k) immediately before the UL-only slot is a DL-only slot.

Referring to FIG. 17 and FIG. 18, when a UE allocated with a UL-only slot identifies that the previous slot is configured as a DL-only slot, the first G OFDM symbols of the UL-only slot may be punctured or not received. Here, G is a gap between the DL and the UL and may be a different value for each UE or cell, or may be a different value for each cell, and may be a value previously known to the UE and the base station. G may be represented by the number of OFDM symbols or a predetermined time interval. For example, when G has a different value for each UE, G may be determined using a TA value set between the base station and the UE. The G value of the UE having a small TA value may be given by one OFDM symbol, and the G value of the UE having a large TA value may be given by two OFDM symbols.

Embodiment 2: Override Slot Configuration Information

As described above, there may be three methods of informing the UE of slot configuration information, (i)

semi-static SFI, (ii) SFI_GC-PDCCH, and (iii) SFI_US-PDCCH. As described above, semi-static SFI is slot configuration information configured by an RRC signal, and SFI_GC-PDCCH and SFI_US-PDCCH are slot configuration information indicated by an L1 signal. The semi-static SFI may include information indicating the symbols of the slot as DL symbol, UL symbol, or Unknown symbol. The SFI_GC-PDCCH may include information indicating symbols of the slot as DL symbol, UL symbol, or Unknown symbol. The SFI_US-PDCCH may include information indicating symbols of the slot as DL symbol or UL symbol. When the UE receives the RRC signal and the L1 signal, the UE should determine that the symbols of the slot are which one among DL symbol, UL symbol, and Unknown symbol, and determine whether the signal transmission is available according to the determined symbols.

In the present invention, the downlink symbol and the uplink symbol configured in the semi-static SFI may not be indicated to other directions or indicated as Unknown by SFI_GC-PDCCH or SFI_US-PDCCH. However, the Unknown symbol configured in the semi-static SFI may be indicated to another direction by SFI_GC-PDCCH or SFI_US-PDCCH. Accordingly, the problem to be solved in the present invention relates to a symbol configured as Unknown in the semi-static SFI, unless otherwise specified.

Override between SFI_GC-PDCCH

One problem to be solved by the present invention relates to a method for a UE to interpret a plurality of SFI_GC-PDCCHs when configuration information for one slot is configured to be received in a plurality of SFI_GC-PDCCHs.

Figure 19:
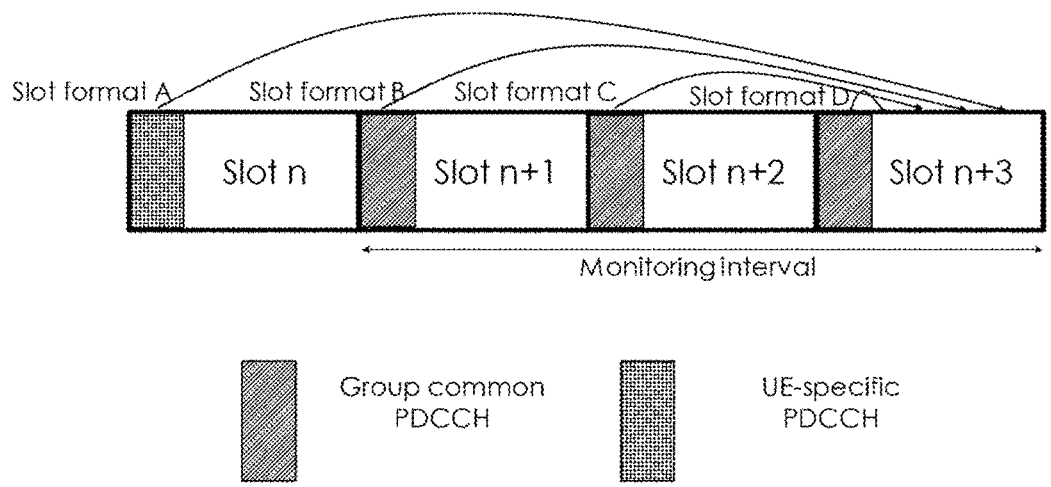
FIG. 19 illustrates a slot configuration determination of a scheduled UE.

Referring to FIGS. 13 and 19, the base station may transmit, through the SFI_GC-PDCCH, (i) slot configuration information for the current slot only, (ii) configuration information for the current slot and the next slot, or (iii) slot configuration information for the current slot and future N slots. The UE may be configured to identify the configuration of the current slot or the next N slots after the current slot upon reception of the SFI_GC-PDCCH according to the slot configuration information transmitted through the SFI_GC-PDCCH. Here, N is an integer greater than or equal to 1. N may be dynamically changed, set through the RRC, or dynamically indicated by the base station to the UE in a set configured by the RRC. Referring to FIG. 19, when SFI_GC-PDCCH carries configuration information of a plurality of slots, slot configuration information of one slot may be transmitted by a plurality of SFI_GC-PDCCHs. According to an embodiment of the present invention, when the UE receives a plurality of SFI_GC-PDCCHs regarding configuration information of one slot from the base station, the base station and the UE may operate as follows.

A downlink transmission may be received or an uplink transmission may be performed by determining the DL symbol, the UL symbol, or the Unknown symbol by using the information of the SFI_GC-PDCCH which was most recently received among the plurality of SFI_GC-PDCCHs. In other words, when one of SFI_GC-PDCCH among the plurality of SFI_GC-PDCCHs is successfully received, the DL symbol, the UL symbol, or the Unknown symbol may be determined using the information of the corresponding SFI_GC-PDCCH. That is, the UE may assume that the plurality of SFI_GC-PDCCHs indicate the same configuration of DL symbol, UL symbol, or Unknown symbol for one slot.

A downlink transmission may be received or an uplink transmission may be performed by determining the DL symbol, the UL symbol, or the Unknown symbol by using the information of the SFI_GC-PDCCH configured to be received most recently among a plurality of SFI_GC-PDCCHs. In other words, when the most recent SFI_GC-PDCCH among the plurality of SFI_GC-PDCCHs is successfully received, the DL symbol, the UL symbol, or the Unknown symbol may be determined using the information of the corresponding SFI_GC-PDCCH. The UE may assume that the DL symbol, the UL symbol, or the Unknown symbol indicated by the previous SFI_GC-PDCCH can be changed in the subsequent SFI_GC-PDCCH.

For example, when receiving GC-PDCCH for changing slot configuration information in two consecutive slots or slots of consecutive periods, there may be a case where one is received and the other is not received. For example, 1) among the two slots, the SFI_GC-PDCCH may not be received in the preceding slot while the SFI_GC-PDCCH is receive in the subsequent slot, or 2) conversely, among the two slots, the SFI_GC-PDCCH may be received in the preceding slot while the SFI_GC-PDCCH is not receive in the subsequent slot. In this case, the UE may utilize slot configuration information indicated by the successfully received SFI_GC-PDCCH for the UE operation. Meanwhile, in the case of 1) and 2), the UE may assume that it has failed to receive the slot configuration information from the base station. Accordingly, the UE may perform scheduled downlink reception or uplink transmission using the slot configuration information currently assumed by the UE without changing/updating the slot configuration information. Alternatively, in the case of 1) and 2), the downlink reception or uplink transmission of the UE may be performed in the following three ways as in the case of consecutively receiving the SFI_GC-PDCCH regarding the change of the slot configuration information from the base station on the basis of the slot in which the SFI_GC-PDCCH is received.

From the next slot of the slot in which the GC-PDCCH is received, the base station may perform downlink transmission or uplink reception using the changed slot configuration information, and the UE may perform downlink reception and uplink transmission by assuming the changed slot configuration information.

Starting from the slot of the next period of the slot in which the GC-PDCCH is received in a consecutive transmission interval which is set periodically, the base station may perform downlink transmission or uplink reception using the changed slot configuration information, and the UE may perform downlink reception and uplink transmission by assuming the changed slot configuration information.

Starting from the slot in which the GC-PDCCH is received, the base station may perform downlink transmission or uplink reception using the changed slot configuration information, and the UE may perform downlink reception and uplink transmission by assuming the changed slot configuration information.

Override between SFI_GC-PDCCH and SFI_US-PDCCH

In the proposal of the present invention, the slot configuration information may be transmitted in SFI_GC-PDCCH and/or SFI_US-PDCCH. Another problem to be solved by the present invention is related to the operation of a UE when the UE receives the SFI_GC-PDCCH and SFI_US-PDCCH, but the slot configuration information indicated by the SFI_GC-PDCCH and the slot configuration information indicated by the SFI_US-PDCCH are not identical to each other.

Referring to FIGS. 13 and 14, the UE may identify the configuration of the slot through the slot configuration information (e.g., symbol configuration information in the slot) of the SFI_GC-PDCCH (e.g., FIG. 13), and may identify the configuration of the scheduled slot using scheduling information (e.g., a DL/UL scheduled OFDM symbol set) of the SFI_US-PDCCH (e.g., FIG. 14). The slot configurations obtained through the two pieces of information on the same slot may or may not be identical.

On the other hand, if the slot configuration information transmitted in the SFI_GC-PDCCH and the slot configuration information transmitted in the SFI_US-PDCCH do not match with each other (for the scheduled symbols), the UE may prioritize the SFI_US-PDCCH and discard the slot configuration information transmitted in the successfully received SFI_GC-PDCCH. That is, the UE may assume that slot configuration information in the SFI_GC-PDCCH is not detected (e.g., skips/cancels the operation after detecting the SFI_GC-PDCCH), and may perform downlink reception or uplink transmission according to the scheduling information and the slot configuration information in the SFI_US-PDCCH. That is, regardless of whether the SFI_GC-PDCCH collides with the SFI_US-PDCCH, the UE may always perform PUSCH transmission or PDSCH reception as scheduled through the SFI_US-PDCCH. Meanwhile, the present method may be applied in symbol units. For example, the UE may assume that SFI_GC-PDCCH is not detected only for the collision symbol.

Alternatively, if the scheduling information received from the SFI_US-PDCCH is not the same as the slot configuration information received from the SFI_GC-PDCCH (for the scheduled symbols), the UE may ignore the scheduling information by the SFI_US-PDCCH and may not perform uplink transmission (e.g., PUSCH) or downlink transmission (e.g., PDSCH) according to the corresponding scheduling.

For example, if the PDSCH reception interval (e.g., OFDM symbol) indicated by the scheduling information of the SFI_US-PDCCH does not match the DL configuration according to the slot configuration information of the SFI_GC-PDCCH, the UE may determine that the scheduling information received from the SFI_US-PDCCH is not identical to the (slot configuration) information received from the SFI_GC-PDCCH. For example, referring to FIGS. 11 and 14, in case that the SFI_GC-PDCCH indicates the slot configuration 3, only when the SFI_US-PDCCH indicates that the end position of the PDSCH is the fourth OFDM symbol, the slot configuration information of the SFI_GC-PDCCH and the scheduling information of the SFI_US-PDCCH may be determined to match with each other, and the UE may perform PDSCH reception according to the scheduling information of the SFI_US-PDCCH.

Similarly, if the PUSCH transmission interval (e.g., OFDM symbol) indicated by the scheduling information of the SFI_US-PDCCH does not match the UL configuration according to the slot configuration information of the SFI_GC-PDCCH, the UE may determine that the scheduling information received from the SFI_US-PDCCH is not identical to the (slot configuration) information received from the SFI_GC-PDCCH. For example, referring to FIGS. 11 and 14, in case that the SFI_GC-PDCCH indicates the slot configuration 3, only when the SFI_US-PDCCH indicates that the end position of the PDSCH is the sixth OFDM symbol, the slot configuration information of the SFI_GC-PDCCH and the scheduling information of the SFI_US-PDCCH may be determined to match with each other, and the UE may perform PUSCH transmission according to the scheduling information of the SFI_US-PDCCH.

As another example, if the start position, the length, or the end position of the OFDM symbol indicated by the DL scheduling information of the SFI_US-PDCCH is not included in the DL configuration according to the slot configuration information of the SFI_GC-PDCCH and overlaps with an Unknown symbol, the UE may determine that the scheduling information received from the SFI_US-PDCCH is not identical to the information received from the SFI_GC-PDCCH. For example, when the SFI_GC-PDCCH indicates that downlink DL transmission is configured with the fourth OFDM symbol and the SFI_US-PDCCH indicates that the PDSCH is present in the seventh OFDM symbol beyond the corresponding interval, the UE may not perform the PDSCH reception (e.g., skip/cancel the receiving operation).

Similarly, if the start position, the length, or the end position of the OFDM symbol indicated by the UL scheduling information of the SFI_US-PDCCH is not included in the UL configuration according to the slot configuration information of the SFI_GC-PDCCH and overlaps with an Unknown symbol, the UE may determine that the scheduling information received from the SFI_US-PDCCH is not identical to the information received from the SFI_GC-PDCCH. For example, when the SFI_GC-PDCCH indicates slot configuration 3 of FIG. 11 and the SFI_US-PDCCH indicates the start position of the PUSCH as the fifth OFDM symbol, the UE may not transmit the PUSCH (e.g., skip/cancel the receiving operation).

For convenience of description, hereinafter, "the case where the scheduling information received from the SFI_US-PDCCH is not identical to the (slot configuration) information received from the SFLGC-PDCCH" may be expresses that "(slot configuration) violation" occurs.

Figure 20:
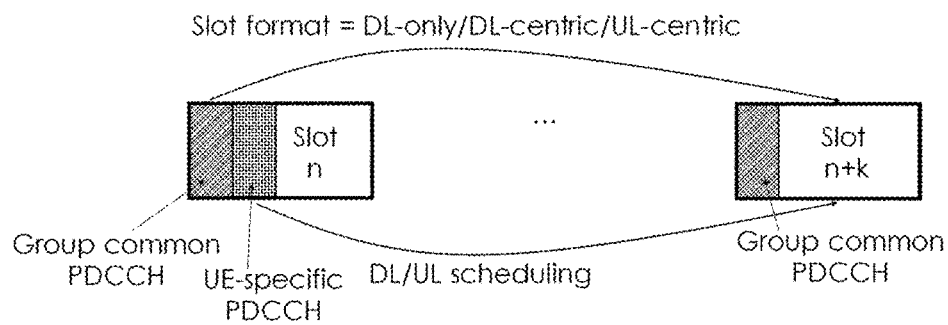
FIG. 20 is a block diagram illustrating of identifying a scheduled slot structure using a group common PDCCH of the scheduled slot in the case of cross slot scheduling according to an embodiment of the present invention.

Referring to FIG. 20, when the base station transmits an SFI_US-PDCCH to the UE in the n-th slot and the SFI_US-PDCCH allocates a PDSCH in the (n+k)-th slot (where k is an integer greater than or equal to 1), the UE, which has been allocated the PDSCH from the SFI_US-PDCCH, should be able to determine whether the above-described slot configuration is violated in order to determine whether the PDSCH is received. As an example of the present invention, if the SFI_GC-PDCCH is transmitted in a downlink scheduled slot, the UE may determine whether the violation occurs by using the slot configuration information of the SFI_GC-PDCCH and the scheduling information of the SFI_US-PDCCH. In FIG. 20, when the SFI_US-PDCCH is transmitted in the slot n and the PDSCH transmission is scheduled in the slot n+k, the UE may determine whether the violation occurs by using the SFI_GC-PDCCH received in the slot n+k.

Figure 21:
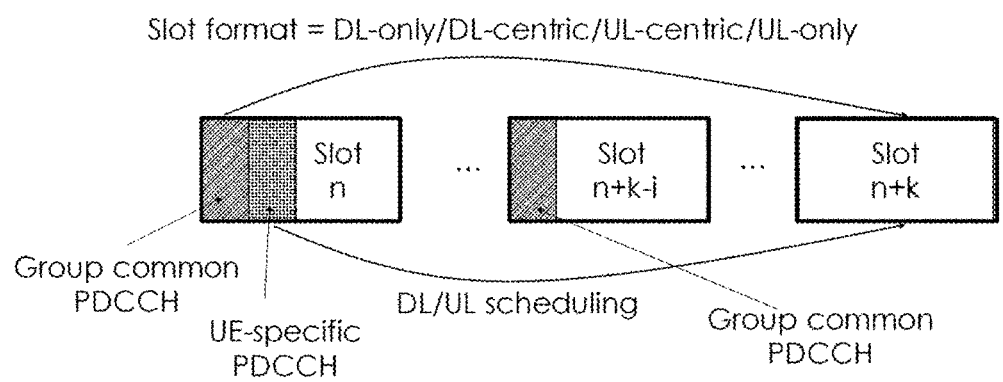
FIG. 21 is a block diagram illustrating of identifying a scheduled slot structure using a previous group common PDCCH closest to the scheduled slot in case of cross slot scheduling according to an embodiment of the present invention.

Referring to FIG. 21, when the SFI_GC-PDCCH is not transmitted or received in a slot in which a PUSCH (or PDSCH) is scheduled (i.e., UL-only slot case), the UE may determine whether the scheduled slot is violated by using slot configuration information of the most recently received SFI_GC-PDCCH and scheduling information of the SFI_US-PDCCH. As shown in FIG. 21, when slot n through slot n+k are scheduled, SFI_GC-PDCCH is received in slot n+k−i, and SFI_GC-PDCCH is not received in slot n+k−i+1 to slot n+k, then the UE may determine whether the slot n+k−i+1 to slot n+k are violated using the SFI_GC-PDCCH received in the slot n+k−i.

The UE may be allocated DL-only as a configuration of the future slot (e.g., slot n+k) through SFI_GC-PDCCH or SFI_US-PDCCH including scheduling information at a scheduled time (e.g., slot n), and the SFI_GC-PDCCH may be transmitted/received in the allocated DL-only slot (e.g., slot n+k). In this case, the SFI_GC-PDCCH of the DL-only slot may indicate the slot configuration after the DL-only slot, and the UE may use slot configuration information of the SFI_GC-PDCCH to identify whether the next slot (e.g., slot n+k+1) immediately after the DL-only is a UL-only slot.

The UE may be allocated DL-only as a configuration of the future slot (e.g., slot n+k) through GC-PDCCH or US-PDCCH including scheduling information at a scheduled time (e.g., slot n), and the GC-PDCCH may not be transmitted/received in the allocated DL-only slot (e.g., slot n+k). In this case, the GC-PDCCH received in the most adjacent slot (e.g., slot n+k−i) before the DL-only slot may indicate the slot configuration after the DL-only slot, and the UE may use slot configuration information of the GC-PDCCH to identify whether the next slot (e.g., slot n+k+1) immediately after the DL-only is a UL-only slot.

When a cross-slot scheduling is configured, an operation of a UE that receives UL (or DL) scheduling information from a base station is as follows. When the UE receives scheduling information (i.e., US-PDCCH) for a specific slot, in order to check whether the configuration of the corresponding slot is changed, the UE monitors GC-PDCCH from the subsequent slot of a slot in which the US-PDCCH is received from the base station to the scheduled slot. The monitored slots are referred to as monitoring interval. If the UE does not receive the GC-PDCCH during the monitoring interval, the UE may perform PUSCH transmission (or PDSCH reception) in the scheduled slot according to the scheduling information of the US-PDCCH. If the UE receives one or more GC-PDCCHs during the monitoring interval, the UE may perform or may not perform (e.g., skip/cancel the corresponding operation) PDSCH reception and PUSCH transmission according to the slot configuration indicated by the most recently received GC-PDCCH (in reference to the scheduled slot) and the scheduling information.

Figure 22:
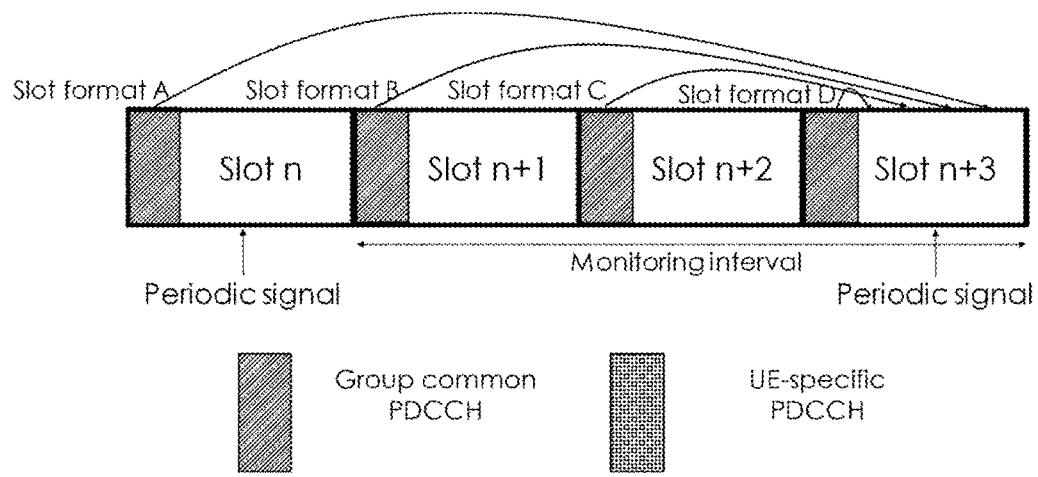
FIG. 22 illustrates a slot configuration determination when a UE that periodically transmits and receives a signal does not have scheduling information.
Figure 23:
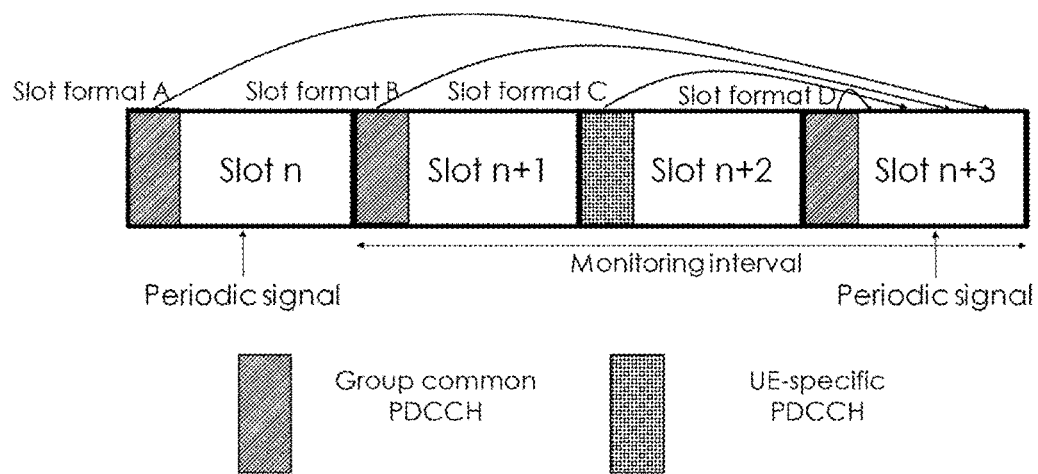
FIG. 23 illustrates a slot configuration determination when a UE that periodically transmits and receives a signal has scheduling information.

FIGS. 19, 22 and 23 illustrate an operation of a UE receiving scheduling information. The UE may be scheduled for PDSCH reception or PUSCH transmission in slot n+3 through US-PDCCH in slot n. In this case, the US-PDCCH may indicate that the slot configuration of the slot n+3 is A. The UE may set slots from a slot after receiving the US-PDCCH to the scheduled slot, that is, slot n+1, slot n+2, and slot n+3 as the monitoring interval. The UE may monitor the GC-PDCCH during the monitoring interval. In this case, GC-PDCCH for transmitting slot configuration information of slot n+3 may be received in slot n+1, slot n+2, and slot n+3, respectively. In this case, the GC-PDCCH of slot n+1, slot n+2, and slot n+3 may indicate the slot configuration of slot n+3 as slot format B, slot format C, and slot format D, respectively. In this case, the UE may determine the information most adjacent to slot n+3, that is, the slot configuration of slot n+3 as the slot format D. Accordingly, the UE may or may not perform PDSCH reception or PUSCH transmission (e.g., skip/cancel the corresponding operation) in slot n+3 based on (i) slot configuration according to slot format D and (ii) scheduling information received in slot n. If the GC-PDCCH is not received during the monitoring interval, the UE may perform PDSCH reception or PUSCH transmission in slot n+3 according to the information scheduled in slot n.

As an example of performing or not performing PDSCH reception or PUSCH transmission according to the scheduling information, when the PDSCH (PUSCH) is scheduled, the UE may perform PDSCH reception (or PUSCH transmission) if the OFDM symbol in which PDSCH (or PUSCH) is allocated is still configured as DL (or UL) in the most recently received GC-PDCCH within the monitoring interval. As another example of performing or not performing PDSCH reception or PUSCH transmission according to the scheduling information, the UE may perform PDSCH reception (or PUSCH transmission) if the slot configuration identified when the PDSCH (or PUSCH) is scheduled and the slot configuration identified through GC-PDCCH most recently received within a monitoring interval are identical with each other, and otherwise, may not perform the PDSCH reception (or PUSCH transmission). If the slot configuration information of the GC-PDCCH and the US-PDCCH is different, UL transmission may be prohibited since it can generate an interference signal, and only DL reception may be allowed. Herein, the PDSCH/PUSCH scheduled through the US-PDCCH has been described as an example. However, the present invention can be applied to uplink/downlink control signals such as (non-)periodically transmitted and received reference signals, UCI, SRS, and the like. In this case, the same operation may be configured in units of an OFDM symbol or an RB in which a corresponding control signal is transmitted. In this case, the transmission of the nonperiodic signal may be scheduled through the US-PDCCH.

In another embodiment, slot configuration information may be transmitted along with downlink or uplink scheduling information through the US-PDCCH. In this case, the slot determination method of the UE is as follows.

Figure 24:
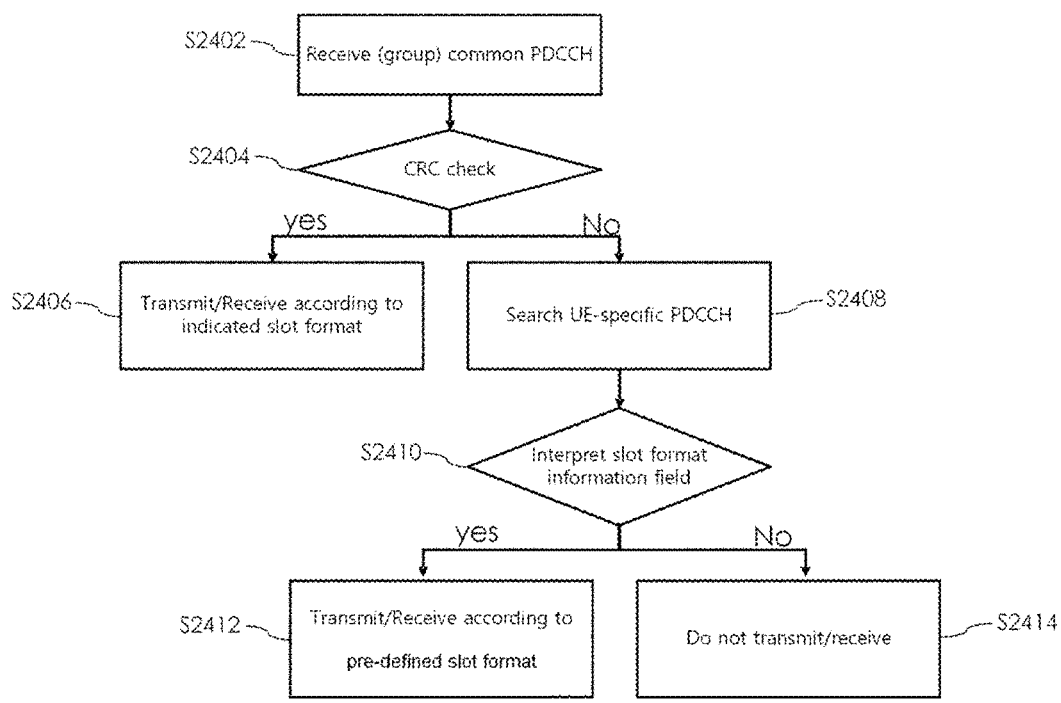
FIG. 24 is a block diagram illustrating a procedure of obtaining slot configuration information according to an embodiment of the present invention.

FIG. 24 exemplarily illustrates an operation in which slot configuration information is included in the US-PDCCH. When the slot format of FIG. 11 is informed, the bit size of the slot configuration information in the US-PDCCH may be 3 bits. On the other hand, the format/configuration of the slot is not limited to only DL and UL, and there may be configurations such as DL, UL, any, sidelink, blank, and the like. In this case, the bit size of the slot configuration information may be determined depending on the number of slot configuration information. Referring to FIG. 24, if the reception/detection of the GC-PDCCH (slot configuration information) is successful through the CRC check (S2402, 52404, yes), the UE(s) may perform uplink transmission and downlink reception in the corresponding slot according to the slot configuration information of the GC-PDCCH without using slot configuration information (e.g., 3-bit information) in the US-PDCCH. (S2406). Meanwhile, if the reception/detection of the GC-PDCCH is failed through the CRC check (S2402, 52404, no), but the CRC check of the US-PDCCH is successful (S2408), then the UE may identify the uplink/downlink/Unknown configuration of the symbols in the slot by using slot configuration information (e.g., 3) in the US-PDCCH (S2410, yes), and may perform uplink transmission and downlink reception in the corresponding slot (S2412). If the slot configuration information cannot be read from the US-PDCCH, the UE may not perform uplink transmission and downlink reception in the corresponding slot (S2414). On the other hand, unlike the example of the figure, the UE may identify the slot configuration by receiving only the US-PDCCH, without receiving the GC-PDCCH (slot configuration information). That is, if the US-PDCCH (slot configuration information) is successfully received/detected, the UE may not receive the GC-PDCCH (slot configuration information). In this case, not receiving the GC-PDCCH (slot configuration information) means that skipping the decoding of the GC-PDCCH or skipping/canceling an operation according to the slot configuration information even though the GC-PDCCH is successfully detected (for a symbol set scheduled by US-PDCCH (slot configuration information)). In addition, when the GC-PDCCH (slot configuration information) has configuration information regarding a plurality of slots, not receiving the GC-PDCCH may be applied only to slots scheduled by the US-PDCCH.

Meanwhile, slot configuration information in the US-PDCCH through which uplink or downlink scheduling information is transmitted may be determined according to the number of slot configurations that the base station can transmit. In more detail, the slot configuration information transmitted on the US-PDCCH may be the same as the slot configuration information transmitted on the GC-PDCCH. Referring to FIG. 11, slot configuration information in the GC-PDCCH may indicate one of eight slot configurations, and slot configuration information in the US-PDCCH may carry the same information. On the other hand, through the slot configuration information in the US-PDCCH, the number of cases less than the number of cases that can be transmitted in the GC-PDCCH may be transmitted. For example, referring to FIG. 11, the slot configuration information in the GC-PDCCH may indicate one of eight slot configurations, and the slot configuration information in the US-PDCCH may one of four slot configurations (e.g., specific four slot configurations among eight slot configurations 0 to 7) through two bits.

As another example, the slot configuration information in the US-PDCCH in which downlink scheduling information is transmitted may indicate a position where a downlink OFDM symbol ends in a slot. For example, when the base station uses the slot configuration 5, it can be informed that the downlink is transmitted up to the second OFDM symbol. A downlink scheduled UE may identify the ending time of the downlink OFDM symbol from the slot configuration information (e.g., 3 bits), and may successfully receive the downlink using the above information. In addition, an uplink scheduled UE may identify the ending time of the downlink OFDM symbol from the slot configuration information, and may identify the starting time of the uplink OFDM symbol according to the GP configuration.

In addition, the slot configuration information in the US-PDCCH in which uplink scheduling information is transmitted may indicate a position where an uplink OFDM symbol starts in a slot. For example, when using the slot configuration 5, it can be informed that the uplink transmission starts from the fourth OFDM symbol. An uplink scheduled UE may identify the starting time of the uplink OFDM symbol from the slot configuration information, and may use the information for uplink transmission. Similarly, a downlink scheduled UE may identify the starting time of the uplink OFDM symbol from the slot configuration information, and may identify the ending time of the downlink OFDM symbol according to the GP configuration.

When the base station and the UE identifies the semi-static SFI, the above-described slot configuration information may indicate, through 1 bit, whether the slot configuration used by the base station is identical to the semi-static SFI. If the slot configuration information is 0, it may indicate that the slot configuration used by the base station is identical to the semi-static SFI, and if the slot configuration information is 1, it may indicate that the slot configuration used by the base station is different from the semi-static SFI. The UE may determine whether to perform an operation according to the information scheduled by the US-PDCCH according to the slot configuration information. If the slot configuration information is 0, since the slot configuration used by the base station is identical to the semi-static SFI, the UE may perform scheduled uplink transmission or downlink reception based on the semi-static SFI. If the slot configuration information is 1, since the slot configuration used by the base station is different from the semi-static SFI, the UE may not perform scheduled uplink transmission or downlink reception.

When the base station and the UE identifies the semi-static SFI, the above-described slot configuration information may be determined according to the semi-static SFI. For example, when the semi-static SFI represents the slot configuration information i, and the slot configuration information for informing the four different slot configurations in the US-PDCCH is 2-bit information, 00 may represent slot configuration information i, 01 may represent slot configuration information $i+j_1$, 10 may represent slot configuration information $i+j_2$, and 11 may represent slot configuration $i+j_3$. Here, $j_1$, $j_2$, and $j_3$ are used to indicate different slot configuration information, and may be predetermined according to the semi-static SFI and configuration information. That is, four different slot format information is indicated, one of which can be set to be identical to the semi-static SFI (bit 00). The UE may perform uplink transmission or downlink reception scheduled on the US-PDCCH using semi-static SFI. As another example, instead of informing slot configuration information, a method of designating an increase and a decrease with respect to the number of symbols of DL or UL may be considered. That is, the present operation is an operation of changing the slot configuration in comparison with the slot configuration indicated by the semi-static SFI, and may specify, for example, an increase of DL. As an example, when the semi-static SFI is DL(a)/Unknown(1)/UP(6-a), the base station may have four options of 1 increase/2 increase/1 decrease/as is for a. The base station may flexibly change the number of DL/ULs, rather than changing the predefined slot format and configuration information, by transmitting the selected option to the UE through 2-bit information.

When the base station and the UE identifies the semi-static SFI, the slot configuration information may be determined according to the operation of the UE indicated by the US-PDCCH and the semi-static SFI. For example, the US-PDCCH may indicate the UE whether downlink reception or uplink transmission according to scheduling information can be performed assuming semi-static SFI. In more detail, when 1-bit slot configuration information in the US-PDCCH is set to 0, assuming the semi-static SFI, a downlink reception operation or an uplink transmission operation may be performed according to scheduling information of the US-PDCCH. On the other hand, if the 1-bit slot configuration information in the US-PDCCH is set to 1, the UE may perform nothing for downlink reception and uplink transmission regardless of the scheduling information of the US-PDCCH.

Referring to FIG. 11, when the slot configuration configured in the semi-static SFI is 4 and the base station uses the slot configuration 5, the uplink scheduled UE may perform uplink transmission using the 5th, 6th, and 7th OFDM symbols. In this case, although the base station has allocated the fourth OFDM symbol to the uplink, the UE may use it as a DL-UL switching gap. Accordingly, in this case, the base station may set the 1-bit slot configuration information in the US-PDCCH to 0, so that the UE performs uplink transmission in the corresponding slot, and the base station receives the corresponding uplink from the UE. However, when the slot configuration configured in the semi-static SFI is 4 and the base station uses the slot configuration 3, the uplink scheduled UE may not be able to transmit with the slot configuration configured in the semi-static SFI. Therefore, in this case, the base station may set the 1-bit slot configuration information in the US-PDCCH to 1, so that the UE does not transmit via uplink in the corresponding slot. Referring to FIG. 11, when the slot configuration configured in the semi-static SFI is 4 and the base station uses the slot configuration 3, the downlink scheduled UE may perform downlink reception using the second and third OFDM symbols. In this case, the base station has allocated the fourth OFDM symbol to the downlink, but the UE may ignore it and perform reception. Accordingly, in this case, the base station may set the 1-bit slot configuration information in the US-PDCCH to 0, so that the UE performs downlink reception in the corresponding slot, so that the UE can perform downlink reception from the base station. However, when the slot configuration configured in the semi-static SFI is 4 and the base station uses the slot configuration 5, the downlink scheduled UE cannot perform downlink reception. In this case, the base station may set the 1-bit slot configuration information in the US-PDCCH to 1, so that the UE does not perform the reception via downlink in the corresponding slot.

When the base station and the UE identify the semi-static SFI, the slot configuration information in the US-PDCCH may be determined according to whether the US-PDCCH is related to uplink transmission or downlink transmission, and semi-static SFI. For example, the downlink scheduled UE may be informed of only the slot configuration for monitoring an interval (e.g., UL) for which downlink transmission should not be monitored when it follows the semi-static SFI, and the uplink scheduled UE may be informed of only the slot configuration for transmitting in an interval (e.g., DL) for which uplink transmission should not be performed when it follows the semi-static SFI. For example, referring to FIG. 11, if slot configuration 4 is used as the slot configuration configured in the semi-static SFI, only slot configuration information for slot configurations 5, 6 and 7 may be transmitted to the uplink scheduled UE, and only slot configuration information for slot configurations 0, 1 and 2 may be transmitted to the downlink scheduled UE. According to the present scheme, the size of the required slot configuration information may vary according to the slot configuration configured in the semi-static SFI. In addition, the size of the required slot configuration information may vary according to uplink and downlink.

In order to inform the UE of the slot configuration, the US-PDCCH may be transmitted by scrambling with different RNTIs. One or more RNTIs may be allocated to inform one UE of a slot configuration, or several RNTIs may be generated using one allocated RNTI. For example, several RNTIs may be generated from one RNTI using inter-leavers having a predetermined pattern. In addition, several RNTIs may be generated from one RNTI using scrambles of a predetermined pattern. Patterns for generating an RNTI in the UE may be predetermined between the base station and the UE. The slot format and the configuration of the slot may be identified by detecting the US-PDCCH scrambled with a certain RNTI among different RNTIs.

The RNTI used in the present scheme may be determined according to the slot configuration. In this case, RNTI means a UE-specific RNTI defined to indicate the slot configuration information. Referring to FIGS. 5 and 11, the base station may scramble the US-PDCCH by selecting one of eight RNTIs according to the current slot configuration. For example, the RNTI used for the US-PDCCH scheduling the downlink may be determined according to the position where the downlink OFDM symbol ends. In addition, the RNTI used for the PDCCH scheduling the uplink may be determined according to the position where the uplink OFDM symbol starts. In addition, in this scheme, the RNTI may be determined according to the slot configuration configured in the semi-static SFI. When the base station and the UE identify the slot configuration configured in the semi-static SFI, referring to FIGS. 5 and 11, the RNTI may be determined according to the relative difference between the current slot configuration of the base station and the slot configuration configured in the semi-static SFI. For example, when the slot configuration configured in semi-static SFI is slot configuration i and four RNTIs are valid, the first RNTI may indicate slot configuration i which is configured in the semi-static SFI, the second RNTI may indicate slot configuration. $i+j_1$, the third RNTI may indicate the slot configuration $i+j_2$, and the fourth RNTI may indicate the slot configuration $i+j_3$. Here, $j_1$, $j_2$, and $j_3$ may be predetermined to indicate different slot configurations. That is, four different slot format information is indicated and one of them may be set to be identical to the semi-static SFI (e.g., bit 00). When the BS and the UE identify the slot configuration configured in the semi-static SFI, in this scheme, the RNTI may be determined according to the operation of the UE informed by the US-PDCCH and the slot configuration configured in the semi-static SFI. For example, when two RNTIs are valid, when the first RNTI is used, the operation scheduled in the US-PDSCH may be performed by assuming the slot configuration configured in the semi-static SFI, and when the second RNTI is used, the operation scheduled in the US-PDSCH may not be performed. As another example, instead of informing slot configuration information, an increase and a decrease with respect to the number of symbols of DL or UL may be designated. That is, the operation is for changing the slot format in comparison with the semi-static SFI and may specify, for example, an increase of DL. As an example, when the semi-static SFI is DL(a)/Unknown(1)/UP(6-a), the base station may have four options of 1 increase/2 increase/1 decrease/as is for a. The base station may flexibly change the number of DL/ULs, rather than changing the predefined slot format and configuration information, by transmitting one of the four option to the UE through 2-bit information.

Figures 25, 26:
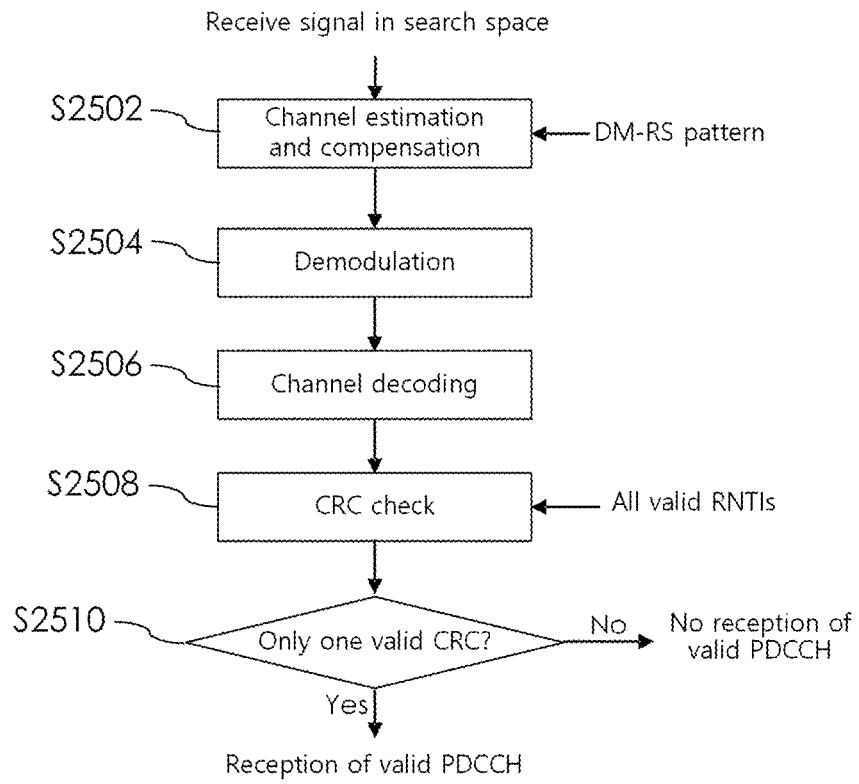
FIG. 25 is a block diagram illustrating a procedure for receiving a PDCCH including slot configuration information according to an embodiment of the present invention.
FIG. 26 is a diagram illustrating a case where a base station and a user equipment use different slot configurations in a time division multiple access.

FIG. 25 is a block diagram of a receiver when a slot configuration is informed using RNTI. The receiver may include a step of estimate and compensate the channel using the DM-RS pattern (S2502); a step of (QPSK) demodulation (S2504); a step of channel decoding (S2506); a step of checking the CRC with all possible RNTIs (S2508); and a step of determining the success of PDCCH decoding according to the CRC check (S2510). The receiver checks the CRC using all valid RNTIs to indicate the slot configuration. At this time, if only one CRC is valid and all other CRCs are invalid, slot configuration information and corresponding operation may be identified from the RNTI which provided the valid CRC. In this case, RNTI means a UE-specific RNTI defined to indicate the slot configuration information.

FIG. 26 illustrates a situation that may occur when the slot configuration used by the base station and the slot configuration used by the UE are different. In FIG. 26, an actual slot format is a slot configuration actually used by the base station, and a UE decision is a slot configuration recognized by the UE. As described above, the base station may transmit a GC-PDCCH (dynamic SFI) to inform the UE(s) of the slot configuration. However, a specific UE may fail to receive the GC-PDCCH (dynamic SFI) transmitted from the base station. In this case, the UE may not identify whether the base station has transmitted the GC-PDCCH to indicate the slot configuration, the UE may operate in the slot configuration that the base station is expected to use.

Referring to FIG. 26(a), when the base station uses slot configuration 2 and the UE uses slot configuration 0 (see FIG. 11), the downlink scheduled UE receives a signal by determining that all the slots are downlink OFDM symbols. Therefore, since the UE receives a signal even in two OFDM symbols not allocated to the downlink, the probability of failing to decode the downlink signal is increased, and the UE energy is wasted. In addition, when the log likelihood ratio (LLR) values corresponding to two OFDM symbols not allocated to the downlink are stored in the soft buffer, performance degradation may occur when retransmission is performed. In addition to the above problems, resource consumption for downlink retransmission may occur. Referring to FIG. 26(b), when the base station uses slot configuration 4 and the UE uses slot configuration 5 (see FIG. 11), the uplink scheduled UE starts uplink transmission from the fourth OFDM symbol. However, since the uplink transmission is performed from the fifth OFDM symbol according to the slot configuration of the base station, the base station cannot receive an uplink signal due to the incorrect uplink transmission of the UE. In addition, since an erroneous uplink signal is transmitted to the GP for preventing downlink-uplink interference, interference may occur in the neighboring UE receiving the downlink, thereby degrading downlink reception performance of the neighboring UE.

As an example for solving the above-described problems, if the UE does not successfully receive the slot configuration information transmitted on the GC-PDCCH (i.e., the GC-PDCCH is not detected), the UE may not perform transmission on the scheduled uplink symbol, may not receive scheduled downlink symbol, or may not perform both uplink transmission and downlink reception. When the user does not receive the downlink scheduled downlink symbol, the base station may transmit information again through HARQ retransmission. When the user does not transmit the uplink scheduled uplink symbol, the base station may transmit uplink scheduling information again to allow the UE to perform uplink transmission. However, the above-described scheme does not use resources allocated in the scheduled slots, resulting in waste of resources, and additional delay time occurs because a retransmission or rescheduling scheme is required.

As another example, the base station and the UE may define a semi-static SFI to be used in advance. If the UE successfully receives the slot configuration information transmitted through the GC-PDCCH (i.e., the GC-PDCCH is detected), the UE may operate according to the indicated slot format. On the other hand, if the UE does not successfully receive the slot configuration information transmitted through the GC-PDCCH (i.e., the GC-PDCCH is not detected), the UE may perform uplink transmission or downlink reception according to the semi-static SFI.

Override Between SFI and Periodic Signal #1

One of the problems to be solved by the present invention relates to a method of determining whether to transmit/receive a periodic signal configured by RRC to a UE, that is, an operation of a UE for determining a direction of a symbol using information on slot configuration of SFI_GC-PDCCH. The problem addressed here includes a case where the reception of the SFI_GC-PDCCH fails. In addition, the problem addressed here is when the UE does not receive the SFI_US-PDCCH.

The periodic signal collectively refers to all DL/UL signals configured to be periodically transmitted by the higher layer (e.g., RRC). In the 3GPP NR system, a periodically transmitted UL signal configured in the RRC layer includes a periodic sounding reference signal (SRS), a scheduling request (SR), a periodic CSI, a semi-persistent PUSCH (SPS-PUSCH), and the like. Further, in the 3GPP NR system, a periodically transmitted DL signal includes a channel state information reference signal (CSI-RS), an SPS-PDSCH, and the like. The SR and the periodic CSI are transmitted through PUCCH. Specifically, the base station may inform the UE of the slot-period/offset and the transmission resource (e.g., OFDM symbol(s) in the slot) of the periodic signal through the RRC signal.

Unlike when receiving scheduling information through the SFI_US-PDCCH, for a UE configured to transmit or receive a periodic signal, there is no SFI_US-PDCCH to obtain slot configuration information with regard to a slot in which transmission/reception of the scheduled signal when the information scheduled for the UE is not present. Therefore, when scheduling information is not received through the SFI_US-PDCCH, a UE operation for performing periodic UL transmission or periodic DL reception needs to be defined. In addition, a method for determining the slog configuration to determine whether to perform, by the UE configured to perform transmission/reception periodically without scheduling information, transmission of a periodic signal or reception of a periodic signal in a slot (hereinafter, referred to as a periodic slot) configured to transmit/receive periodically.

An operation of a UE that periodically performs transmission/reception without receiving scheduling information through SFI_US-PDCCH is as follows. First, the UE may define slots from a slot for transmitting/receiving a periodic signal of the current period to a slot for transmitting/receiving a periodic signal of the next period as a monitoring interval. The UE may identify the monitoring interval through the RRC signal or may determine it according to the period in which the SFI_GC-PDCCH is transmitted. Next, the UE may monitor the SFI_GC-PDCCH including the slot configuration information for the transmission/reception slot of the next period during the monitoring interval. For example, when the UE is configured to periodically transmit an uplink signal (e.g., periodic SRS, SR, periodic CSI, SPS-PUSCH) in a specific time-frequency resource (e.g., OFDM symbol(s)) (in each slot which is periodically configured), the UE may transmit the periodic signal in the time-frequency resource (in the corresponding slot) if the time-frequency resource of the periodic signal (in the slot which is periodically configured) is indicated as an uplink configuration through the SFI_GC-PDCCH. On the other hand, when the UE is configured to periodically transmit an uplink signal (e.g., periodic SRS, SR, periodic CSI, SPS-PUSCH) in a specific time-frequency resource (e.g., OFDM symbol(s)) (in each slot which is periodically configured), the UE may not transmit the periodic signal in the time-frequency resource (in the corresponding slot) (e.g., skip/cancel the transmission operation) if the time-frequency resource of the periodic signal (in the slot which is periodically configured) is indicated as not an uplink configuration (e.g., downlink (DL) symbol or Unknown symbol) through the SFI_GC-PDCCH. Similarly, when the UE is configured to periodically transmit a downlink signal (e.g., CSI-RS, SPS-PDSCH) in a specific time-frequency resource (e.g., OFDM symbol(s)) (in each slot which is periodically configured), the UE may receive the periodic signal in the time-frequency resource (in the corresponding slot) if the time-frequency resource of the periodic signal (in the slot which is periodically configured) is indicated as a downlink configuration through the SFI_GC-PDCCH. On the other hand, when the UE is configured to periodically receive a downlink signal (e.g., CSI-RS, SPS-PDSCH) in a specific time-frequency resource (e.g., OFDM symbol(s)) (in each slot which is periodically configured), the UE may not receive the periodic signal in the time-frequency resource (in the corresponding slot) (e.g., skip/cancel the transmission operation) if the time-frequency resource of the periodic signal (in the slot which is periodically configured) is indicated as not a downlink configuration (e.g., uplink (UL) symbol or Unknown symbol) through the SFI_GC-PDCCH. In addition, when the UE does not receive the SFI_GC-PDCCH for the time-frequency resource (e.g., OFDM symbol(s)) of the periodic signal (in a periodically configured slot) (i.e., if the SFI_GC-PDCCH is not detected) the UE may not transmit the periodic signal (e.g., skip/cancel transmission operation). In this case, the specific time-frequency resource includes uplink and downlink transmission/reception resources in an OFDM symbol and/or RB unit. For example, the specific time-frequency resource may be defined as a specific OFDM symbol or OFDM symbol set in a slot.

As another example, the UE may perform transmission/reception of a signal (i.e., a periodic signal) originally configured to periodically perform regardless of reception/confirm of the GC-PDCCH during the monitoring interval. In this case, the UE may transmit/receive some/all of the periodic signals, for example, signals having high importance such as RS, ACK/NACK, SRS, and the like, without checking slot configuration information (e.g., SFI_GC-PDCCH). In this case, the UE may perform the transmission/reception operation on the assumption that the base station properly performs scheduling for transmission and reception of the corresponding periodic signal, so that no collision occurs.

Furthermore, the ACK/NACK (of the periodic signal) may be transmitted by the UE without always checking the slot configuration information of the GC-PDCCH. The PUCCH for transmitting ACK/NACK may be allocated to one or more last OFDM symbols in a slot, and the UE assumes that symbols corresponding to the PUCCH are allocated at least UL (regardless of the GC-PDCCH slot configuration information). Can always transmit PUCCH. In this case, the periodic ACK/NACK refers to ACK/NACK indicating whether the reception of the SPS-PDSCH configured to receive periodically.

FIG. 22 illustrates an operation of a UE when periodically transmitting and receiving in a state where scheduling information is not received for a certain period. Referring to FIG. 22, the UE may be configured to transmit and receive a periodic signal in slot n and slot n+3. In order to determine the possibility of periodic signal transmission and reception in slot n+3, a monitoring interval may be defined as slot n+1, slot n+2, and slot n+3. In this case, SFI_GC-PDCCH of slot n+1, slot n+2, and slot n+3 may indicate the slot configuration of slot n+3 as slot format B, slot format C, and slot format D, respectively. In this case, the UE determines that the slot configuration indicated by the SFI_GC-PDCCH transmitted in the slot closest to the periodic slot n+3 (that is, slot n+2) (that is, slot configuration D) is the slot configuration of slot n+3. Based on the slot configuration D, the periodic signal transmission/reception may be performed/not performed in the slot n+3.

Override Between SFI and Periodic Signal #2

One of the problems to be solved by the present invention relates to a method of determining whether to transmit/receive a periodic signal configured by RRC to a UE, that is, an operation of a UE for determining a direction of a symbol using information on slot configuration of SFI_US-PDCCH. In this case, a method of determining a configuration of the corresponding slot by a UE when a transmission of a downlink data channel or a downlink shared channel (e.g., PDSCH) or a transmission of an uplink data channel or an uplink shared channel (e.g., PUSCH) is scheduled in a slot (hereinafter, referred to as a periodic slot) in a slot for performing transmission or reception of a periodic signal (hereinafter, referred to as a periodic slot) is scheduled to a UE configured to perform transmission/reception of a periodic signal/channel from a base station will be described. The problem addressed here is that the UE is configured not to monitor GC-PDCCH (dynamic SFI) or is configured to monitor GC-PDCCH (dynamic SFI) but fails to receive it (e.g., failure to detect GC-PDCCH (dynamic SFI)).

The periodic signal collectively refers to all DL/UL signals configured to be periodically transmitted by the higher layer (e.g., RRC). In the 3GPP NR system, a periodically transmitted UL signal configured in the RRC layer includes a periodic SRS, an SR, a periodic CSI, an SPS-PUSCH, and the like. Further, in the 3GPP NR system, a periodically transmitted DL signal includes a CSI-RS, an SPS-PDSCH, and the like. The SR and the periodic CSI are transmitted through PUCCH. Specifically, the base station may inform the UE of the slot-period/offset and the transmission resource (e.g., OFDM symbol(s) in the slot) of the periodic signal through the RRC signal.

When the UE receives a US-PDCCH indicating scheduling for the same symbol as a symbol for transmitting/receiving a periodic signal/channel (in a periodically configured slot), the UE may determine the configuration of the periodic slot according to the most recently received slot configuration information among the GC-PDCCH(s) and SFI_US-PDCCH received in the monitoring interval. This is because the base station manages all transmission of periodic signal/channel, and also manages transmission of scheduling information (e.g., US-PDCCH), so that the base station scheduler may not schedule to perform different operations in the same slot. Therefore, the configuration of the periodic slot may be determined according to the most recently received slot configuration information among the most recently received SFI_GC-PDCCH(s) and SFI_US-PDCCH. The UE may determine whether the PDSCH reception (or PUSCH transmission) scheduled by SFI_US-PDCCH is possible according to the determined slot configuration to perform the corresponding PDSCH reception (or PUSCH transmission). Also, the UE may determines whether the periodic signal/channel transmission or reception is possible to perform transmission/reception or the periodic signal/channel.

In this case, whether the PDSCH reception (or PUSCH transmission) is possible (in a slot in which periodic signal transmission and reception are scheduled) may be determined as follows.

If the US-PDCCH is received more recently than the GC-PDCCH, the UE may perform PDSCH reception (or PUSCH transmission) scheduled by the US-PDCCH (i.e., DCI).

If there is a GC-PDCCH received more recently than the US-PDCCH, when the OFDM symbol(s) to which the PDSCH (or PUSCH) is allocated by the scheduling information of the US-PDCCH is configured with DL (or UL) by the slot configuration information of the GC-PDCCH most recently received within the monitoring interval, the UE may perform the PDSCH reception (or PUSCH transmission).

If the slot configuration received by the UE when the PDSCH (or PUSCH) is scheduled through the US-PDCCH is identical to the slot configuration received by the UE through slot configuration information of the GC-PDCCH most recently received in the monitoring interval, the UE may perform the PDSCH reception (or PUSCH transmission). Otherwise, the UE may not perform the PDSCH reception (or PUSCH transmission) (e.g., skip/cancel the related operation).

In addition, as an example of determining whether transmission/reception of a periodic signal/channel is possible (in a slot which is periodically configured), if the UL/DL direction of the OFDM symbol(s) to which the transmission/reception of the periodic signal/channel is allocated is identical to the slot configuration received by the UE through the slot configuration information of the most recently received GC-PDCCH in the monitoring interval or the UL/DL direction of the OFDM symbol(s) received by the UE through US DCI (i.e., US-PDCCH), the UE may perform the transmission/reception of the periodic signal/channel (in the corresponding slot). Otherwise, the UE may not perform the transmission/reception of the periodic signal/channel (in the corresponding slot).

FIG. 23 illustrates an operation when a UE configured to transmit/receive periodic signal/channel receives scheduling information from a base station. Referring to FIG. 23, the UE may be configured to transmit/receive periodic signal/channel in slot n and slot n+3, and receive a US-PDCCH indicating scheduling information of slot n+3 in slot n+2. In order to determine whether to perform transmission/reception of a periodic signal/channel in slot n+3 and whether to perform the UE operation according to scheduling information, the slot configuration of the slot n+3 may be determined according to slot configuration based on a US-PDCCH transmitted in the slot closest to the slot n+3 among the GC PDCCHs received in slot n+1 through slot n+3 and the US-PDCCH received in slot n+2 or based on the slot configuration information of the GC-PDCCH. In FIG. 23, the GC-PDCCH (i.e., SFI) of slot n+3 indicates the slot configuration closest to the slot n+3. Accordingly, when the GC-PDCCH (i.e., SFI) is received in the slot n+3, the UE may determine the slot configuration of the slot n+3 according to the slot configuration information (e.g., the slot format D) of the GC-PDCCH.

When PDSCH or PUSCH is scheduled in a specific slot (i.e., periodic slot) configured to transmit/receive periodic signal/channel, a specific signal/channel of some/all of the periodic signals/channels may be transmitted/received without checking slot configuration information for the corresponding scheduling. In this case, the UE may perform a transmission/reception operation of the specific periodic signal/channel by assuming that the base station properly performs scheduling for transmission/reception of the corresponding periodic signal/channel so that collision does not occur. In this case, the specific periodic signal/channel may include signals having high importance such as a synchronization signal (SS: PSS, SSS)/PBCH block, an RS (e.g., CSI-RS, Phase Tracking RS, Tracking RS), an ACK/NACK transmission channel, an SR transmission channel, and a beam recovery request (BR), and an SRS. The specific periodic signal/channel may include all or a subset of the SS, RS, ACK/NACK transmission channel, SR transmission channel, BR transmission channel, and SRS. For example, the specific periodic signal/channel may include ACK/NACK transmission channels. In this case, the ACK/NACK transmission channel may be configured to be received by the UE without checking the slot configuration information. The PUCCH for transmitting ACK/NACK may be always allocated to one or more last OFDM symbols in a slot. For example, the PUCCH (e.g., ACK/NACK) may be allocated to the last one OFDM symbol, the last two OFDM symbols, or 4 to 14 OFDM symbols from the last one. The UE may always transmit the PUCCH assuming that OFDM symbols corresponding to the PUCCH are allocated at least UL. In this case, the periodic ACK/NACK refers to ACK/NACK indicating whether the reception of the SPS PDSCH configured to receive periodically is successful. Also, for example, the specific periodic/signal channel may incldue an SS, PBCH or SSB transmitted from the base station. In this case, the UE may always receive the SS/PBCH block without checking the slot configuration information.

Override Between SFI and Periodic Signal #3

One of the problems to be solved by the present invention relates to a method of determining whether to transmit/receive a periodic signal configured by RRC to a UE, that is, an operation of a UE for determining a direction of a symbol using information on slot configuration of SFI_GC-PDCCH and information on slot configuration of SFI_US-PDCCH.

The periodic signal collectively refers to all DL/UL signals configured to be periodically transmitted by the higher layer (e.g., RRC). In the 3GPP NR system, a periodically transmitted UL signal configured in the RRC layer includes a periodic SRS, an SR, a periodic CSI, an SPS-PUSCH, and the like. Further, in the 3GPP NR system, a periodically transmitted DL signal includes a CSI-RS, an SPS-PDSCH, and the like. The SR and the periodic CSI are transmitted through PUCCH. In addition, a signal which is configured to the UE through the RRC signal transmitted from the base station and configured to be periodically received by the UE through downlink may include a periodic CSI-RS, a semi-persistent CSI-RS, a tracking RS (TRS) or phase tracking RS, SPS-PDSCH or the like. Specifically, the base station may inform the UE of the slot-period/offset and the transmission resource (e.g., OFDM symbol(s) in the slot) of the periodic signal through the RRC signal.

If a symbol in which a signal (i.e., a periodic signal) (e.g., CSI-RS, SPS-PDSCH) configured to be periodically received by the UE in a slot is located is indicated as a DL symbol through a semi-static DL/UL allocation (i.e., semi-static SFI), the UE may receive the signal configured to be periodically received in the corresponding slot. If the symbol(s) in which the signal configured to be periodically received by the UE is located in the slot is indicated as Unknown symbol(s) in the semi-static DL/UL allocation (i.e., semi-static SFI), conditions for the UE to receive the periodic signal in the corresponding slot include: 1) receiving the SFI_GC-PDCCH for the symbol on which the periodic signal is received, and the corresponding SFI_GC-PDCCH indicates the symbol(s) as a DL symbol, or 2) regardless of receiving the SFI_GC-PDCCH, the symbol(s) in which the signal configured to be periodically received is received is indicated as a DL symbol through the SFI_US-PDCCH. In the case of 1), regardless of whether the SFI_US-PDCCH is detected, the UE may receive a periodic signal in the corresponding slot. In the case of 2), if the symbol(s) in which the signal configured to be periodically received is received is indicated as a DL symbol through the SFI_US-PDCCH, even if the SFI_GC-PDCCH is not received (that is, the SFI_GC-PDCCH is not detected), the UE may receive a periodic signal in the corresponding slot. For reference, the UE may determine whether the symbol in which the signal configured to be periodically received is received is a DL symbol through scheduling information of DL data (e.g., PDSCH) received through the SFI_US-PDCCH. On the contrary, conditions for the UE not to receive the signal configured to be periodically received in the slot may include: 1) receiving the SFI_GC-PDCCH for the symbol in which the signal configured to be periodically received is received, and the corresponding SFI_GC-PDCCH indicates the symbol as an Unknown symbol or a UL symbol, or 2) being failed to receive the SFI_GC-PDCCH, or 3) not receiving information indicating that the symbol in which the signal configured to be periodically received is received is a DL symbol from the SFI_US-PDCCH. Considering the override situation between the SFI_GC-PDCCH, SFI_US-PDCCH and the periodic signal, the case of 1) may mean a case where reception of the SFI_US PDCCH has failed, the case of 2) may mean a case where reception of both the SFI_GC-PDCCH and SFI_US-PDCCH has failed, and the case of 3) may mean a case where reception of the SFI_GC-PDCCH has failed.

A signal which is configured to the UE through the RRC signal transmitted from the base station and is periodically transmitted through uplink includes a periodic SRS, a semi-persistent SRS, and a periodic PUCCH and SPS-PUSCH for CSI reporting. The periodic PUCCH may be piggybacked into a PUSCH scheduled by the US-PDCCH. Through the RRC signal transmitted from the base station, the operation for the UE (or user) configured to transmit the periodic signal to transmit the periodic signal is as follows. If a symbol in which a signal configured to be periodically transmitted by the UE in a slot is located is indicated as a UL symbol through a semi-static DL/UL allocation (i.e., semi-static SFI), the UE may transmit the signal (e.g., periodic SRS, semi-persistent SRS, CSI, SPS-PUSCH) configured to be periodically transmitted in the corresponding slot. In addition, if the symbol in which the signal configured to be periodically transmitted by the UE is located in the slot is indicated as an Unknown symbol in the semi-static DL/UL allocation (i.e., semi-static SFI), conditions for the UE to transmit the signal configured to be periodically transmitted in the corresponding slot include: 1) receiving the SFI_GC-PDCCH for the symbol in which the signal configured to be periodically transmitted is transmitted, and the corresponding SFI_GC-PDCCH indicates the symbol as a UL symbol, or 2) regardless of receiving the SFI_GC-PDCCH, the symbol in which the signal configured to be periodically transmitted is transmitted is indicated as a UL symbol through the SFI_US-PDCCH. For reference, a symbol in which UL data (e.g., PUSCH) is scheduled or a UL control signal (e.g., PUCCH) is scheduled through the SFI_US-PDCCH may be determined as a UL symbol. In the case of 1), regardless of whether the SFI_US-PDCCH is detected, the UE may transmit a periodic signal in the corresponding slot. In the case of 2), if the symbol(s) in which the signal configured to be periodically received is received is indicated as a UL symbol through the SFI_US-PDCCH, even if the SFI_GC-PDCCH is not received (that is, the SFI_GC-PDCCH is not detected), the UE may transmit a periodic signal in the corresponding slot. On the contrary, conditions for the UE not to transmit the signal configured to be periodically transmitted in the slot may include: 1) receiving the SFI_GC-PDCCH for the symbol in which the signal configured to be periodically transmitted is transmitted, and the corresponding SFI_GC-PDCCH indicates the symbol as an Unknown symbol or a DL symbol, or 2) being failed to receive the SFI_GC-PDCCH, or 3) not receiving information indicating that the symbol in which the signal configured to be periodically transmitted is transmitted is a UL symbol from the SFI_US-PDCCH or US-PDCCH. Considering the override situation between the SFI_GC-PDCCH, SFI_US-PDCCH and the periodic signal, the case of 1) may mean a case where reception of the SFI_US PDCCH has failed, the case of 2) may mean a case where reception of both the SFI_GC-PDCCH and SFI_US-PDCCH has failed, and the case of 3) may mean a case where reception of the SFI_GC-PDCCH has failed.

Embodiment 3: Overall Operation Related to the Slot Configuration

Hereinafter, as a method of informing configuration information of a slot, a method of determining, by a UE, symbols in a slot as DL/UL/Unknown when there is a semi-static SFI, SFI_GC-PDCCH, SFI_US-PDCCH, or a part thereof will be explained. In the following description, the expression that the SFI is 'Nothing' means that the base station did not transmit the SFI or the UE did not receive it (e.g., PDCCH missing, PDCCH detection failed). In addition, the expression that the SFI is 'Anything' means that some slot configuration information is transmitted through the SFI. Unless otherwise specified, SFI="Anything" includes SFI="Nothing."

A preferred embodiment of the present invention is shown in Table 4. Referring to Table 4, the UE may determine the format/configuration for each symbol in the slot as follows. First, the UE may determine the DL/UL/Reserved symbol with the following priority.

Semi-static SFI>Dynamic SFI from US-PDCCH>Dynamic SFI from GC-PDCCH

The UE may determine the Unknown symbol with the following priority.

Dynamic SFI from US-PDCCH>Dynamic SFI from GC-PDCCH>Semi-static SFI

More specifically, referring to Table 4, the UE may determine and define the format/configuration of symbols in the slot according to the slot configuration information and the following symbol determination rule.

DL/UL/Reserved symbol configured by semi-static SFI is not changed.

Unknown symbol configured by semi-static SFI or a symbol not configured by semi-static SFI can be modified by the symbol configuration of SFI_GC-PDCCH or SFI_US-PDCCH.

If the SFI_GC-PDCCH and SFI_US-PDCCH indicate the same symbol configuration with respect to an unknown symbol configured by semi-static SFI or a symbol not configured by semi-static SFI, the UE may follow the symbol configuration of SFI_GC-PDCCH and SFI_US-PDCCH.

If the SFI_GC-PDCCH and SFI_US-PDCCH indicate different symbol configurations with respect to an unknown symbol configured by semi-static SFI or a symbol not configured by semi-static SFI, the UE may always determine the corresponding symbol by giving priority to the SFI_US-PDCCH.

TABLE 4

| Semi-static SFI | Dynamic SFI from GC-PDCCH | Dynamic SFI from UE-specific PDCCH | UE behavior |
|---|---|---|---|
| DL/UL/Reserved | Anything | Anything | DL/UL/Reserved |
| Unknown | Nothing | Nothing | Unknown |
| Unknown/Nothing | DL/UL/Unknown | Nothing | DL/UL/Unknown |
| Unknown/Nothing | Anything | DL/UL | DL/UL |

If the SFI_GC-PDCCH and SFI_US-PDCCH indicate the same symbol configuration with respect to an unknown symbol configured by semi-static SFI or a symbol not configured by semi-static SFI, the UE may follow the symbol configuration of SFI_GC-PDCCH and SFI_US-PDCCH.

If the SFI_GC-PDCCH and SFI_US-PDCCH indicate different symbol configurations with respect to an unknown symbol configured by semi-static SFI or a symbol not configured by semi-static SFI, the UE may determine the corresponding symbol by giving priority to the most recently received one between the SFI_GC-PDCCH and the SFI_PS-PDCCH. When the SFI_GC-PDCCH and the SFI_US-PDCCH are received at the same time, the UE may always expect a slot format having the same symbol configuration. Accordingly, although the SFI_GC-PDCCH and the SFI_US-PDCCH are received at the same time, when different symbol configurations are indicated, the UE may determine it as an error case.

TABLE 5

| Semi-static SFI | Dynamic SFI from GC-PDCCH | Dynamic SFI from UE-specific PDCCH | UE behavior |
|---|---|---|---|
| DL/UL/Reserved | Anything | Anything | DL/UL/Reserved |
| Unknown | Nothing | Nothing | Unknown |
| Unknown/Nothing | DL/UL/Unknown | Nothing | DL/UL/Unknown |
| Unknown/Nothing | Nothing | DL/UL | DL/UL |
| Unknown/Nothing | DL/UL/Unknown | Nothing | DL/UL/Unknown |
| Unknown/Nothing | Same symbol direction (DL or UL) | | Follow the same direction (DL or UL) |
| Unknown/Nothing | Different symbol direction | | If Dynamic SFI from GC-PDCCH and Dynamic SFI from UE-specific PDCCH are the same time, Error case Otherwise, Follow the latest signaling |

Referring to Table 5, the UE may determine the format/configuration for each symbol in the slot as follows. First, the priority of DL/UL/Reserved and the priority of Unknown are configured differently, and the UE may determine the DL/UL/Reserved symbol with the following priority. —Semi-static SFI>Dynamic SFI from GC-PDCCH=Dynamic SFI from US-PDCCH In addition, the UE may determine the Unknown symbol with the following priority.

Dynamic SFI from GC-PDCCH=Dynamic SFI from US-PDCCH>Semi-static SFI

Here, '=' represents the same priority. The priorities between the SFIs indicated by '=' may be determined differently according to the time that the UE receives the SFI. For example, the recently received SFI may have the higher priority.

More specifically, referring to Table 5, the UE may determine and define the format/configuration of symbols in the slot according to the slot configuration information and the following symbol determination rule.

DL/UL/Reserved symbol configured by semi-static SFI is not changed.

Unknown symbol configured by semi-static SFI or a symbol not configured by semi-static SFI can be modified by the symbol configuration of SFI_GC-PDCCH or SFI_US-PDCCH.

Referring to Table 6, the UE may determine the format/configuration for each symbol in the slot as follows. First, the UE may determine the DL/UL/Reserved symbol with the following priority.—Semi-static SFI>Dynamic SFI from GC-PDCCH>Dynamic SFI from US-PDCCH In addition, the UE may determine the Unknown symbol with the following priority.

Dynamic SFI from GC-PDCCH>Dynamic SFI from US-PDCCH>Semi-static SFI

More specifically, referring to Table 6, the UE may determine and define the format/configuration of symbols in the slot according to the slot configuration information and the following symbol determination rule.

DL/UL/Reserved symbol configured by semi-static SFI is not changed.

Unknown symbol configured by semi-static SFI or a symbol not configured by semi-static SFI can be modified by the symbol configuration of SFI_GC-PDCCH or SFI_US-PDCCH.

If the SFI_GC-PDCCH and SFI_US-PDCCH indicate the same symbol configuration with respect to an unknown symbol configured by semi-static SFI or a symbol not configured by semi-static SFI, the UE may follow the symbol configuration of SFI_GC-PDCCH and SFI_US-PDCCH.

If the SFI_GC-PDCCH and SFI_US-PDCCH indicate different symbol configurations with respect to an unknown symbol configured by semi-static SFI or a symbol not configured by semi-static SFI, the UE may always determine the corresponding symbol by giving priority to the SFI_GC-PDCCH.

TABLE 6

| Semi-static SFI | Dynamic SFI from GC-PDCCH | Dynamic SFI from UE-specific PDCCH | UE behavior |
|---|---|---|---|
| DL/UL/Reserved | Anything | Anything | DL/UL/Reserved |
| Unknown | Nothing | Nothing | Unknown |
| Unknown/Nothing | DL/UL/Unknown | Anything | DL/UL/Unknown |
| Unknown/Nothing | Nothing | DL/UL | DL/UL |

Reserved symbol configured by semi-static SFI is always Reserved symbol.

All the symbols except for the Reserved symbol configured by the semi-static SFI may be changed to a symbol of SFI_GC-PDCCH or SFI_US-PDCCH.

If the SFI_GC-PDCCH and SFI_US-PDCCH indicate the same symbol configuration with respect to all the symbols except for the Reserved symbol configured by the semi-static SFI, the UE may follow the symbol configuration of SFI_GC-PDCCH and SFI_US-PDCCH.

If the SFI_GC-PDCCH and SFI_US-PDCCH indicate different symbol configurations with respect to all the symbols except for the Reserved symbol configured by the semi-static SFI, the UE may always determine the corresponding symbol by giving priority to the SFI_US-PDCCH.

TABLE 7

| Semi-static SFI | Dynamic SFI from GC-PDCCH | Dynamic SFI from UE-specific PDCCH | UE behavior |
|---|---|---|---|
| Reserved | Anything | Anything | Reserved |
| DL/UL/Unknown | Nothing | Nothing | DL/UL/Unknown |
| DL/UL/Unknown | Nothing | DL/UL | DL/UL |
| DL/UL/Unknown | DL/UL/Unknown | Nothing | DL/UL/Unknown |
| DL/UL/Unknown | Same symbol direction (DL or UL) | | DL |
| DL/UL/Unknown | Different symbol direction | | If Dynamic SFI from GC-PDCCH and Dynamic SFI from UE-specific PDCCH are the same time, Error case Otherwise Follow the latest signaling |

Next, a case in which the priority of the "Reserved" symbol and the priority of the DL/UL/Unknown symbol are configured differently will be described. Referring to Table 7, the UE may determine the format/configuration for each symbol in the slot as follows. First, the UE may determine the Reserved symbol with the following priority.

Semi-static SFI>Dynamic SFI from GC-PDCCH=Dynamic SFI from US-PDCCH

In addition, the UE may determine the DL/UL/Unknown symbol with the following priority.

Dynamic SFI from GC-PDCCH=Dynamic SFI from US-PDCCH>Semi-static SFI

Here, '=' represents the same priority. The priorities between the SFIs indicated by '=' may be determined differently according to the time that the UE receives the SFI. For example, the recently received SFI may have the higher priority.

More specifically, referring to Table 7, the UE may determine and define the format/configuration of symbols in the slot according to the slot configuration information and the following symbol determination rule.

DL/UL/Reserved symbol configured by semi-static SFI is not changed.

Unknown symbol configured by semi-static SFI or a symbol not configured by semi-static SFI can be modified by the symbol configuration of SFI_GC-PDCCH or SFI_US-PDCCH.

Referring to Table 8, the UE may determine the format/configuration for each symbol in the slot as follows. First, the UE may determine the reserved symbol with the following priority.—Semi-static SFI>Dynamic SFI from GC-PDCCH=Dynamic SFI from UE-specific PDCCH In addition, the UE may determine the DL/UL/Unknown symbol with the following priority.

Dynamic SFI from UE-specific PDCCH>Dynamic SFI from GC-PDCCH>Semi-static SFI

More specifically, referring to Table 8, the UE may determine and define the format/configuration of symbols in the slot according to the slot configuration information and the following symbol determination rule.

Reserved symbol configured by semi-static SFI is always Reserved symbol.

All the symbols except for the Reserved symbol configured by the semi-static SFI may be changed to a symbol of SFI_GC-PDCCH or SFI_US-PDCCH.

If the SFI_GC-PDCCH and SFI_US-PDCCH indicate the same symbol configuration with respect to all the symbols except for the Reserved symbol configured by the semi-static SFI, the UE may follow the symbol configuration of SFI_GC-PDCCH and SFI_US-PDCCH.

If the SFI_GC-PDCCH and SFI_US-PDCCH indicate different symbol configurations with respect to all the symbols except for the Reserved symbol configured by the semi-static SFI, the UE may always determine the corresponding symbol by giving priority to the SFI_US-PDCCH.

TABLE 8

| Semi-static SFI | Dynamic SFI from GC-PDCCH | Dynamic SFI from UE-specific PDCCH | UE behavior |
|---|---|---|---|
| Reserved | Anything | Anything | Reserved |
| DL/UL/Unknown | Nothing | Nothing | DL/UL/Unknown |
| DL/UL/Unknown | Anything | DL/UL | DL/UL |
| DL/UL/Unknown | DL/UL/Unknown | Nothing | DL/UL/Unknown |

Referring to Table 9, the UE may determine the format/configuration for each symbol in the slot as follows. First, the UE may determine the reserved symbol with the following priority.—Semi-static SFI>Dynamic SFI from GC-PDCCH=Dynamic SFI from UE-specific PDCCH In addition, the UE may determine the DL/UL/Unknown symbol with the following priority.

Dynamic SFI from GC-PDCCH>Dynamic SFI from UE-specific PDCCH>Semi-static SFI

More specifically, referring to Table 9, the UE may determine and define the format/configuration of symbols in the slot according to the slot configuration information and the following symbol determination rule.

Reserved symbol configured by semi-static SFI is always Reserved symbol.

All the symbols except for the Reserved symbol configured by the semi-static SFI may be changed to a symbol of SFI_GC-PDCCH or SFI_US-PDCCH.

If the SFI_GC-PDCCH and SFI_US-PDCCH indicate the same symbol configuration with respect to all the symbols except for the Reserved symbol configured by the semi-static SFI, the UE may follow the symbol configuration of SFI_GC-PDCCH and SFI_US-PDCCH.

If the SFI_GC-PDCCH and SFI_US-PDCCH indicate different symbol configurations with respect to all the symbols except for the Reserved symbol configured by the semi-static SFI, the UE may always determine the corresponding symbol by giving priority to the SFI_GC-PDCCH.

TABLE 9

| Semi-static SFI | Dynamic SFI from GC-PDCCH | Dynamic SFI from UE-specific PDCCH | UE behavior |
|---|---|---|---|
| Reserved | Anything | Anything | Reserved |
| DL/UL/Unknown | Nothing | Nothing | DL/UL/Unknown |

TABLE 9-continued

| Semi-static SFI | Dynamic SFI from GC-PDCCH | Dynamic SFI from UE-specific PDCCH | UE behavior |
|---|---|---|---|
| DL/UL/Unknown | Nothing | DL/UL | DL/UL |
| DL/UL/Unknown | DL/UL/Unknown | Anything | DL/UL/Unknown |

In the methods that the UE determines the format/configuration for each symbol in the slot to identify the slot format in Table 4 to Table 9, the UE did not used the direction (e.g., DL, UL or sidelink (SL)) of the periodic signal/channel which is configured static or semi-static. If a periodic signal/channel configured to the UE statically or semi-statically exists, the UE may apply the following UE operations in addition to Table 4 to Table 9, respectively.—If the direction of the symbol to which the periodic signal/channel is allocated is identical to the symbol direction determined by the UE, the UE may transmit/receive the periodic signal/channel Otherwise (i.e., the symbol direction is different), the UE may not transmit/receive the periodic signal/channel (e.g., skip transmission/reception operations).

The UE operation for the periodic signal in Table 4 which is a preferred embodiment of the present invention is illustrated in Table 10.

TABLE 10

| Semi-static SFI | Dynamic SFI from GC-PDCCH | Dynamic SFI from UE-specific PDCCH | Periodic signal (Configured by RRC) | UE behavior for slot format | UE behavior for periodic signals |
|---|---|---|---|---|---|
| DL/UL/Reserved | Anything | Anything | DL/UL | DL/UL/Reserved Follow Semi-static SFI | receive or transmit the periodic signals |
| Unknown | Nothing | Nothing | DL/UL | Unknown Follow semi-static SFI | cancel periodic signals |
| Unknown | Unknown | Nothing | DL/UL | Unknwon Follow SFI_GC-PDCCH | cancel periodic signals |
| Unknown | DL/UL | Nothing | DL/UL | DL/UL Follow SFI_GC-PDCCH | receive or transmit periodic signals if direction is right |
| Unknown | DL/UL/Unknown | DL/UL | DL/UL | DL/UL Follow SFI_US-PDCCH with the highest priority and follow SFI_GC-PDCCH | receive or transmit periodic signals if direction is right |

As another example, the UE may determine the configuration information of the slot, by giving the top priority to the direction of the periodic signal/channel configured to the UE. That is, the UE may always transmit/receive the periodic signal/channel which is allocated statically or semi-statically without changing the direction of the periodic signal/channel which is statically or semi-statically allocated to the UE. In addition to the operations of the base station and the UE of Table 4 to Table 9, the symbol determination by the UE according to an embodiment of the present invention is as follows. The configuration of an OFDM symbol that does not overlap with the periodic signal/channel which is allocated statically or semi-statically can be found in Table 4 to Table 9. The configuration of an OFDM symbol that overlaps with the periodic signal/channel which is allocated statically or semi-statically may be always determined as a direction indicated by the periodic signal/channel which is allocated statically or semi-statically regardless of the UE operations of Table 4 to Table 9. For example, a symbol for transmitting a synchronization signal, PBCH, periodic CSI-RS, and the like may be always regarded as a DL symbol. In addition, a symbol for transmitting a physical random access channel (PRACH) and a periodic SRS may also be always regarded as a UL symbol. In addition, a symbol for transmitting a periodic PUCCH may also be always regarded as a UL symbol.

The UE may be configured to periodically monitor or receive a control resource set (CORESET) for receiving the US-PDCCH or GC-PDCCH. In this case, if it is determined that the configuration of the symbol in which the CORESET is transmitted is DL, the UE may be set to monitor or receive the CORESET. Additionally, even when the configuration of the symbol in which the CORESET is transmitted is determined to be Unknown in the semi-static SFI, the UE may be configured to monitor or receive the CORESET.

Next, a method of determining slot configuration information when a UE monitors a GC-PDCCH every specific period and the symbol to be monitored is an UL symbol or an Unknown in the SFI_GC-PDCCH will be described.

For example, when the UE monitors the GC-PDCCH every specific period and the symbols corresponding to the monitoring CORESET are UL symbols (e.g., informed as UL in the semi-static SFI, informed as UL in the previously transmitted SFI_GC-PDCCH, or informed as UL in the previously transmitted SFI_US PDCCH), the UE may operate without expecting to receive the SFI_GC-PDCCH. That is, the UE may determine the slot configuration assuming the SFI_GC-PDCCH as 'Nothing' in the UE operations according to Table 4 to Table 9.

As another example, when the UE monitors the GC-PDCCH every specific period and the symbols corresponding to the monitoring CORESET are UL symbols (e.g., informed as UL in the semi-static SFI, informed as UL in the previously transmitted SFI_GC-PDCCH, or informed as UL in the previously transmitted SFI_US PDCCH), the UE may monitor the GC-PDCCH in the adjacent slot to receive the SFI_GC-PDCCH by assuming that the GC PDCCH is transmitted in the adjacent slot. Preferably, the adjacent slot may be the most adjacent common-search space in the future among the configured common-search spaces. Preferably, the adjacent slot may be indicated by the RRC signal or L1 signal. Referring to FIG. 27(a), the UE may be configured to monitor the SFI_GC-PDCCH every 4 slots. In this case, if the CORESET monitoring the SFI_GC-PDCCH in slot n+4 are UL symbols, the UE may monitor the SFI_GC-PDCCH in slot n+4+k (e.g., n+5) instead of slot n+4. Here, slot n+4+k represents a slot most adjacent to slot n+4 among slots including a DL symbol. Referring to FIG. 27(b), the UE may be configured to monitor the SFI_GC-PDCCH every 4 slots. In this case, if the CORESET monitoring the SFI_GC-PDCCH in slot n+4 are UL symbols, the UE may monitor the SFI_GC-PDCCH in slot n+4-k (e.g., slot n+3) instead of slot n+4. Here, slot n+4-k represents a slot most adjacent to slot n+4 among slots including a DL symbol.

Figure 27:
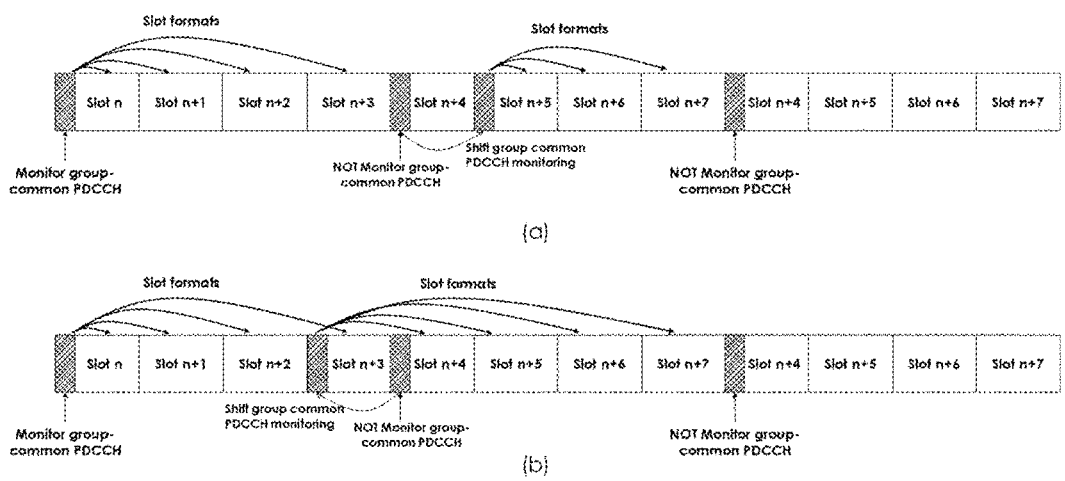
FIG. 27 illustrates changing a CORESET for monitoring a group common PDCCH according to an embodiment of the present invention.

If the slot to be monitored is changed, the UE may expect SFI_GC-PDCCH of different length. More specifically, the UE may assume that the number of slots applied by the slot configuration information of the SFI_GC-PDCCH is the same as the monitoring period. Referring to FIG. 27, if the UE is configured to monitor SFI_GC-PDCCH every 4 slots, the SFI_GC-PDCCH may have slot configuration information of 4 slots. If the slot to be monitored is changed and the UE receives the SFI_GC-PDCCH in the changed slot, the UE may monitor the GC PDCCH by assuming that slot configuration information corresponding to the number of slots from the changed slot to the next monitored slot is transmitted through the SFI_GC-PDCCH. Referring to FIG. 27(a), since the slot to be monitored is changed from slot n+4 to slot n+5, the UE may assume that slot configuration information for slot n+5, slot n+6 and slot n+7, that is, three slots is transmitted through the GC-PDCCH in slot n+5. Referring to FIG. 27(b), since the slot to be monitored is changed from slot n+4 to slot n+3, the UE may assume that slot configuration information for slot n+4, n+5, slot n+6 and slot n+7, that is, four slots is transmitted through the GC-PDCCH in slot n+3. In this case, since slot information for slot n+3 is expected to be received through SFI_GC-PDCCH in slot n, the SFI_GC-PDCCH transmitted in slot n+3 does not include slot information for slot n+3.

The UE may be configured to periodically monitor the SFI_GC-PDCCH. The UE expects that the SFI_GC-PDCCH will always be transmitted through the GC-PDCCH every monitoring period. When the UE monitors the GC-PDCCH every monitoring period, but if the UE fails to receive the GC-PDCCH, the UE may assume all the symbols in the slots indicated by the SFI_GC-PDCCH as 'Unknown' symbols. Accordingly, the UE may follow the UE operation when the SFI_GC-PDCCH indicates 'Unknown'. For example, referring to FIG. 27(a), if the reception of GC-PDCCH in slot n fails, the UE may assume that all the symbols in slot n to slot n+3 are 'Unknown' symbols.

The UE may be configured to periodically monitor the SFI_GC-PDCCH. In this case, the UE may receive, through RRC signaling, information on whether or not to expect that the GC-PDCCH is transmitted every monitoring period. Preferably, the information may be indicated by 1 bit in RRC signaling. If the UE is configured to expect that the GC-PDCCH is transmitted every monitoring period, the UE monitors the GC-PDCCH every monitoring period, and if the UE fails to receive the GC-PDCCH, the UE may assume all the symbols in the slots indicated by the SFI_GC-PDCCH as 'Unknown' symbols. Accordingly, the UE may follow the operation of the UE when the SFI_GC-PDCCH indicates 'Unknown' (see FIG. 10).

On the other hand, if the UE is configured that the GC-PDCCH is not always transmitted every monitoring period, the UE may monitor the GC-PDCCH every monitoring period, but if the UE fails to receive the GC-PDCCH, the UE may determine the configuration information of all the symbols in the slots indicated by the SFI_GC-PDCCH as 'Nothing'. Accordingly, the symbols in the corresponding slots follow the semi-static DL/UL allocation (i.e., semi-static SFI), symbol directions of periodically configured signals, symbol directions indicated by SFI_US-PDCCH or US-PDCCH (e.g., DL, UL, unknown, reserved, or guard period).

NR supports uplink transmission without UL grant. In this case, the base station may inform the UE of the resource capable of performing uplink transmission without the UL grant through the RRC or L1 signal (e.g., US-PDCCH). Informing the resource through the RRC may be called type-1, and informing that through the L1 signal may be called type-2. The UE may assume the uplink transmission resource informed by the type-1 transmission and the type-2 transmission as follows. The UE may always assume a symbol corresponding to the informed uplink resource regardless of the two types as a UL symbol. That is, the UL symbol is not changed by other slot configuration information, for example, information transmitted in SFI_US-PDCCH. Thus, the UL symbol may be regarded as the same as what is indicated as the UL symbol in the semi-static DL/UL allocation (i.e., semi-static SFI). As another method, the UE may assume that a symbol corresponding to an uplink resource indicated by type-1 is always a UL symbol. Meanwhile, if a symbol corresponding to an uplink resource indicated by type-2 is located in a resource indicated as Unknown in the semi-static DL/UL allocation, the uplink resource may be changed to a downlink or Unknown symbol by SFI_GC-PDCCH or SFI_US-PDCCH as same as a symbol in which a periodic signal is configured to be transmit by RRC. That is, the UE may perform the UE operation by regarding the symbols informed by type-1 transmission as UL symbols informed by the semi-static SFI, and regarding the symbols informed by type-2 transmission as symbols in which a periodic signal is configured to be transmitted/received (see Table 10).

A UE that is not in RRC connected mode (i.e., a UE attempting an initial cell connection or a UE attempting RRC reconnection) may assume a slot configuration as follows. First, if the reception of the synchronization signal, PBCH is not successful, the UE may assume that all the symbols of the cell are DL symbols. When the UE receives a PBCH and is allocated a CORESET for monitoring the PDCCH for scheduling the remaining minimum system information (RMSI), the UE may assume that the symbols allocated by the CORESET is downlink and the remaining symbols without the information are Unknown symbols. When the UE monitors CORESET and receives the PDCCH scheduling the RMSI, the UE may determine that the symbols indicated by the PDCCH are always DL symbols. When the UE receives the system information through the RMSI or is configured a PRACH resource for random access from the other system information thereafter, the UE may assume that the PRACH resource is a UL symbol. The UE may maintain the determination until receiving the semi-static DL/UL allocation information or the semi-static SFI information. The UE attempting RRC reconnection may already have semi-static DL/UL allocation information or semi-static SFI information configured for the UE. Accordingly, the UE attempting RRC reconnection may assume that the semi-static DL/UL allocation information or the semi-static SFI information is valid. The UE attempting RRC reconnection may always give the priority to the cell-specific new semi-static DL/UL allocation information or semi-static SFI information, even if it already has UE-specifically configured semi-static DL/UL allocation information or semi-static SFI information.

Figure 28:
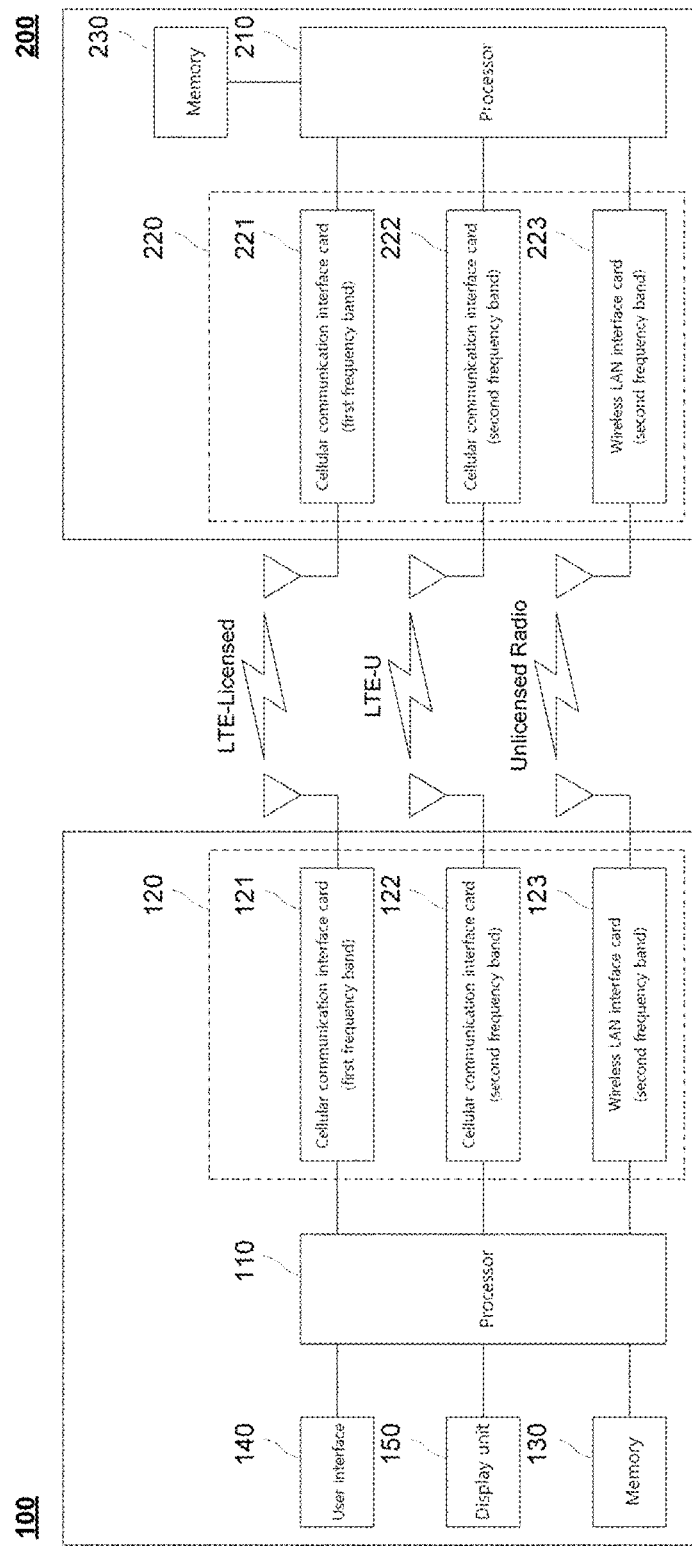
FIG. 28 is a block diagram illustrating configurations of a user equipment and a base station, respectively, according to an embodiment of the present invention.

FIG. 28 is a block diagram illustrating configurations of a user equipment and a base station according to an exemplary embodiment of the present invention.

As illustrated, the user equipment 100 according to an embodiment of the present invention may include a processor 110, a communication module 120, a memory 130, a user interface unit 140, and a display unit 150.

First, the processor 110 may execute various commands or programs and process internal data of the user equipment 100. In addition, the processor 100 may control an overall operation including each unit of the user equipment 100 and control data transmission and reception between the units. In this case, the processor 110 may be configured to perform an operation according to the embodiment described in the present invention. For example, the processor 110 may receive slot configuration information, determine a slot configuration based on the slot configuration information, and perform communication according to the determined slot configuration.

Next, the communication module 120 may be an integrated module that performs wireless communication using a wireless communication network and wireless LAN access using a wireless LAN. To this end, the communication module 120 may include a plurality of network interface cards such as the cellular communication interface cards 121 and 122 and the wireless LAN interface card 123 in an internal or external form. Although the communication module 120 is illustrated as an integrated module in the drawing, each network interface card may be independently arranged according to a circuit configuration or a purpose, unlike the drawing.

The cellular communication interface card 121 may transmit and receive a wireless signal with at least one of the base station 200, an external device, and a server by using a mobile communication network, and may provide the cellular communication service thorough the first frequency band based on a command of the processor 110. In this case, the wireless signal may include various types of data or information such as a voice call signal, a video call signal, a text/multimedia message, or the like. The cellular communication interface card 121 may include at least one NIC module using an LTE-Licensed frequency band. The at least one NIC module may independently perform cellular communication with at least one of the base station 200, an external device, and a server according to a cellular communication standard or protocol of a frequency band supported by the corresponding NIC module.

The cellular communication interface card 122 may transmit and receive a wireless signal with at least one of the base station 200, an external device, and a server by using a mobile communication network, and may provide the cellular communication service through the second frequency band based on a command of the processor 110. The cellular communication interface card 122 may include at least one NIC module using an LTE-Unlicensed frequency band. For example, the LTE-Unlicensed frequency band may be a band of 2.4 GHz or 5 GHz.

The wireless LAN interface card 123 transmits and receives a wireless signal with at least one of the base station 200, an external device, and a server through a wireless LAN connection, and provides a wireless LAN service by the second frequency band based on a command of the processor 110. The wireless LAN interface card 123 may include at least one NIC module using a wireless LAN frequency band. For example, the wireless LAN frequency band may be an Unlicensed radio band such as a band of 2.4 GHz or 5 GHz. The at least one NIC module may independently perform wireless communication with at least one of the base station 200, an external device, and a server according to a wireless LAN standard or protocol of a frequency band supported by the corresponding NIC module.

Next, the memory 130 stores a control program used in the user equipment 100 and various data according thereto. Such a control program may include a predetermined program necessary for the user equipment 100 to perform wireless communication with at least one of the base station 200, an external device, and a server.

Next, the user interface 140 includes various types of input/output means provided in the user equipment 100. That is, the user interface 140 may receive a user input using various input means, and the processor 110 may control the user equipment 100 based on the received user input. In addition, the user interface 140 may perform an output based on a command of the processor 110 using various output means.

Next, the display unit 150 outputs various images on the display screen. The display unit 150 may output various display objects such as a content executed by the processor 110 or a user interface based on a control command of the processor 110.

In addition, the base station 200 according to an embodiment of the present invention may include a processor 210, a communication module 220, and a memory 230.

First, the processor 210 may execute various commands or programs and process internal data of the base station 200. In addition, the processor 210 may control an overall operation including each unit of the base station 200 and control data transmission and reception between the units. In this case, the processor 210 may be configured to perform an operation according to the embodiment described in the present invention. For example, the processor 210 may signal slot configuration information and perform communication according to the signaled slot configuration.

Next, the communication module 220 may be an integrated module that performs wireless communication using a wireless communication network and wireless LAN access using a wireless LAN. To this end, the communication module 120 may include a plurality of network interface cards such as the cellular communication interface cards 221 and 222 and the wireless LAN interface card 223 in an internal or external form. Although the communication module 220 is illustrated as an integrated module in the drawing, each network interface card may be independently arranged according to a circuit configuration or a purpose, unlike the drawing.

The cellular communication interface card 221 may transmit and receive a wireless signal with at least one of above-described user equipment 100, an external device, and a server by using a mobile communication network, and may provide the cellular communication service thorough the first frequency band based on a command of the processor 210. In this case, the wireless signal may include various types of data or information such as a voice call signal, a video call signal, a text/multimedia message, or the like. The cellular communication interface card 221 may include at least one NIC module using an LTE-Licensed frequency band. The at least one NIC module may independently perform cellular communication with at least one of user equipment 100, an external device, and a server according to a cellular communication standard or protocol of a frequency band supported by the corresponding NIC module.

The cellular communication interface card 222 may transmit and receive a wireless signal with at least one of the user equipment 100, an external device, and a server by using a mobile communication network, and may provide the cellular communication service through the second frequency band based on a command of the processor 210. The cellular communication interface card 222 may include at least one NIC module using an LTE-Unlicensed frequency band. For example, the LTE-Unlicensed frequency band may be a band of 2.4 GHz or 5 GHz. According to an embodiment of the present invention, the at least one NIC module may independently perform cellular communication with at least one of the user equipment 100, an external device, and a server according to a cellular communication standard or protocol of a frequency band supported by the corresponding NIC module.

The wireless LAN interface card 223 transmits and receives a wireless signal with at least one of the user equipment 100, an external device, and a server through a wireless LAN connection, and provides a wireless LAN service by the second frequency band based on a command of the processor 210. The wireless LAN interface card 223 may include at least one NIC module using a wireless LAN frequency band. For example, the wireless LAN frequency band may be an Unlicensed radio band such as a band of 2.4 GHz or 5 GHz. The at least one NIC module may independently perform wireless communication with at least one of the user equipment 100, an external device, and a server according to a wireless LAN standard or protocol of a frequency band supported by the corresponding NIC module.

The user equipment 100 and the base station 200 illustrated in FIG. 28 are block diagrams according to an embodiment of the present invention, in which blocks shown separately represent logically distinguishing elements of a device. Therefore, the elements of the above-described device may be mounted in one chip or in a plurality of chips according to the design of the device. In addition, some components of the user equipment 100, for example, the user interface 140, the display unit 150, and the like, may be selectively provided in the user equipment 100. In addition, the user interface 140, the display unit 150, and the like, may be additionally provided in the base station 200 as necessary.

Although the methods and systems of the present invention have been described in connection with specific embodiments, some or all of their components or operations can be implemented using a computer system having a general purpose hardware architecture.

The foregoing description of the present invention is intended for exemplifications, and it will be understood by those skilled in the art that the present invention may be easily modified in other specific forms without changing the technical idea and or essential features of the present invention. Therefore, it should be understood that the embodiments described above are exemplary in all aspects and not restrictive. For example, each component described as a single type may be implemented in a distributed manner, and similarly, components described as distributed may be implemented in a combined form.

The scope of the present invention is shown by the following claims rather than the above description, and all changes or modifications derived from the meaning and scope of the claims and their equivalents should be construed as being included in the scope of the present invention.

INDUSTRIAL APPLICABILITY

The present invention can be applied to a wireless communication system and a communication device (e.g., user equipment, base station) for the same.

The invention claimed is:
1. A method for determining a reception of a downlink signal by a user equipment in a wireless communication system, the method comprising:
receiving configuration information, related to a signal, through a higher layer signal,
wherein the signal is configured to be received through a set of symbol within each of slots;
monitoring a physical downlink control channel (PDCCH) associated with a slot configuration of a slot to receive slot configuration information for the slot through which the signal is to be received,
wherein the slot configuration information includes slot format indicator(SFI) index value indicating slot format of the slot; and
performing a process for receiving the signal in the slot, wherein when the set of symbols within the slot is configured to be a flexible symbol by a higher layer, reception of the signal in the slot is selectively performed according to a slot format indicated by the SFI index value, wherein the flexible symbol is a symbol which can be re-configured to be a downlink symbol, an uplink symbol or a flexible symbol according to the SFI index of the PDCCH, and wherein whether the signal on the set of symbols is received by the UE is determined by a slot format of the set of symbols indicated by a user specific (US)-PDCCH, when a group common(GC)-PDCCH including the slot configuration information and the US-PDCCH including scheduling information on the set of symbols are detected in PDCCH monitoring occasions and the slot format on the set of symbols indicated by the SFI of the GC-PDCCH and the slot format on the set of symbols indicated by the US-PDCCH are different from each other.

2. The method of claim 1,
wherein the signal includes a channel status information reference signal (CSI-RS).

3. The method of claim 1,
wherein the PDCCH includes the GC-PDCCH, and
wherein when set of symbols within the slot is designated as the flexible symbol by the higher layer and the GC-PDCCH is not detected, the reception of the signal is not performed in the slot.

4. The method of claim 1,
wherein the PDCCH includes the GC-PDCCH, and
wherein the reception of the signal in the slot is skipped when the set of symbols within the slot is designated as the flexible symbol by the higher layer and the slot configuration information detected from the GC-PDCCH indicates the set of symbols as the flexible symbol by the SFI index value.

5. The method of claim 3,
wherein the reception of the signal in the slot is performed only when the slot configuration information detected from the GC-PDCCH indicates the set of symbols as the downlink symbol.

6. The method of claim 1, wherein the method further comprising:
receiving the US-PDCCH,
wherein when the set of symbols within the slot is designated as the flexible symbol by the higher layer and a downlink signal is scheduled for the set of symbols by the US-PDCCH, the reception of the signal in the slot is performed.

7. A user equipment used for a wireless communication system, the user equipment comprising:
a communication module; and
a processor,
wherein the processor is configured to:
receive configuration information, related to a signal through a higher layer signal,
wherein the signal is configured to be received through a set of symbol within each of slots;
monitor a physical downlink control channel (PDCCH) associated with a slot configuration of a slot to receive slot configuration information for the slot through which the signal is to be received,
wherein the slot configuration information includes slot format indicator(SFI) index value indicating slot format of the slot; and
perform a process for receiving the signal in the slot, wherein when the set of symbols within the slot is configured to be a flexible symbol by a higher layer, reception of the signal in the slot is selectively performed according to a slot format indicated by the SFI index value, wherein the flexible symbol is a symbol which can be re-configured to be a downlink symbol, an uplink symbol or a flexible symbol according to the SFI index of the PDCCH, and wherein whether the signal on the set of symbols is received by the UE is determined by a slot format of the set of symbols indicated by a user specific (US)-PDCCH, when a group common(GC)-PDCCH including the slot configuration information and the US-PDCCH including scheduling information on the set of symbols are detected in PDCCH monitoring occasions and the slot format on the set of symbols indicated by the SFI of the GC-PDCCH and the slot format on the set of symbols indicated by the US-PDCCH are different from each other.

8. The user equipment of claim 7,
wherein the signal includes a channel status information reference signal (CSI-RS).

9. The user equipment of claim 7,
wherein the PDCCH includes the GC-PDCCH, and
wherein when set of symbols within the slot is designated as the flexible symbol by the higher layer and the GC-PDCCH is not detected, the reception of the signal is not performed in the slot.

10. The user equipment of claim 7,
wherein the PDCCH includes the GC-PDCCH, and
wherein the reception of the signal in the slot is skipped when the set of symbols within the slot is designated as the flexible symbol by the higher layer and the slot configuration information detected from the GC-PDCCH indicates the set of symbols as the flexible symbol by the SFI index value.

11. The user equipment of claim 9,
wherein the reception of the signal in the slot is performed only when the slot configuration information detected from the GC-PDCCH indicates the set of symbols as the downlink symbol.

12. The user equipment of claim 7, wherein the processor is further configured to:
receive the US-PDCCH,
wherein when the set of symbols within the slot is designated as the flexible symbol by the higher layer and a downlink signal is scheduled for the set of symbols by the US-PDCCH, the reception of the signal in the slot is performed.

13. A method for determining a transmission of an uplink signal by a user equipment in a wireless communication system, the method comprising:
receiving configuration information, related to a signal through a higher layer signal,
wherein the signal is configured to be transmitted through a set of symbol within each of slots;
monitoring a physical downlink control channel (PDCCH) associated with a slot configuration of a slot to receive slot configuration information for the slot through which the signal is to be transmitted,
wherein the slot configuration information includes slot format indicator(SFI) index value indicating slot format of the slot; and
performing a process for transmitting the signal in the slot, wherein when the set of symbols within the slot is configured to be a flexible symbol by a higher layer, transmission of the signal in the slot is selectively performed according to a slot format indicated by the SFI index value, wherein the flexible symbol is a symbol which can be re-configured to be a downlink symbol, an uplink symbol or a flexible symbol according to the SFI index of the PDCCH, and wherein whether the signal on the set of symbols is received by the UE is determined by a slot format of the set of symbols indicated by a user specific (US)-PDCCH, when a group common(GC)-PDCCH including the slot configuration information and the US-PDCCH including scheduling information on the set of symbols are detected in PDCCH monitoring occasions and the slot format on the set of symbols indicated by the SFI of the GC-PDCCH and the slot format on the set of symbols indicated by the US-PDCCH are different from each other.

14. The method of claim 13, wherein the signal includes a sounding reference signal (SRS).

15. The method of claim 13, wherein the PDCCH includes the GC-PDCCH, and wherein when set of symbols within the slot is designated as the flexible symbol by the higher layer and the GC-PDCCH is not detected, the transmission of the signal is not performed in the slot.

16. The method of claim 13, wherein the PDCCH includes the GC-PDCCH having slot configuration information for the slot, and wherein the transmission of the signal in the slot is not performed when the set of symbols within the slot is designated as the flexible symbol by the higher layer and the slot configuration information detected from the GC-PDCCH indicates the set of symbols as the flexible symbol by the SFI index value.

17. The method of claim 15, wherein the transmission of the signal in the slot is performed only when the slot configuration information detected from the GC-PDCCH indicates the set of symbols as the downlink symbol.

18. The method of claim 13, the method further comprising:
receiving the US-PDCCH,
wherein when the set of symbols within the slot is designated as the flexible symbol by the higher layer and a downlink signal is scheduled for the set of symbols by the US-PDCCH the transmission of the signal in the slot is performed.

19. A user equipment used for a wireless communication system, the user equipment comprising:
a communication module; and
a processor,
wherein the processor is configured to:
receive configuration information, related to a signal through a higher layer signal,
wherein the signal is configured to be transmitted through a set of symbol within each of slots;
monitor a physical downlink control channel (PDCCH) associated with a slot configuration of a slot to receive slot configuration information for the slot through which the signal is to be transmitted, wherein the slot configuration information includes slot format indicator(SFI) index value indicating slot format of the slot; and
perform a process for transmitting the signal in the slot,
wherein when the set of symbols within the slot is configured to be a flexible symbol by a higher layer, transmission of the signal in the slot is selectively performed according to a slot format indicated by the SFI index value, wherein the flexible symbol is a symbol which can be re-configured to be a downlink symbol, an uplink symbol or a flexible symbol according to the SFI index of the PDCCH, and wherein whether the signal on the set of symbols is received by the UE is determined by a slot format of the set of symbols indicated by a user specific (US)-PDCCH, when a group common(GC)-PDCCH including the slot configuration information and the US-PDCCH including scheduling information on the set of symbols are detected in PDCCH monitoring occasions and the slot format on the set of symbols indicated by the SFI of the GC-PDCCH and the slot format on the set of symbols indicated by the US-PDCCH are different from each other.

20. The user equipment of claim 19, wherein the signal includes a sounding reference signal (SRS).

21. The user equipment of claim 19, wherein the PDCCH includes the GC-PDCCH, having a slot configuration for the slot, and wherein when set of symbols within the slot is designated as the flexible symbol by the higher layer and the GC-PDCCH is not detected, the transmission of the signal is not performed in the slot.

22. The user equipment of claim 19, wherein the PDCCH includes the GC-PDCCH having slot configuration information for the slot, and wherein the transmission of the signal in the slot is not performed when the set of symbols within the slot is designated as the flexible symbol by the higher layer and the slot configuration information detected from the GC-PDCCH indicates the set of symbols as the flexible symbol by the SFI index value.

23. The user equipment of claim 21, wherein the transmission of the signal in the slot is performed only when the slot configuration information detected from the GC-PDCCH indicates the set of symbols as the downlink symbol.

24. The user equipment of claim 19, wherein the processor is further configured to:
receive the US-PDCCH having uplink scheduling information,
wherein when the set of symbols within the slot is designated as the flexible symbol by the higher layer and a downlink signal is scheduled for the set of symbols by the US-PDCCH the transmission of the signal in the slot is performed.

25. The method of claim 1,
The reception of the signal in the slot is performed irrespective of the detection result of the PDCCH, when the first symbol set is designated as the uplink symbol by the higher layer, and
wherein the reception of the signal in the slot is not performed regardless of the detection result of the PDCCH when part or all of the first symbol set is designated as the downlink symbol by the higher layer.

* * * * *